United States Patent
Cao et al.

(10) Patent No.: US 10,673,593 B2
(45) Date of Patent: Jun. 2, 2020

(54) HARQ SIGNALING FOR GRANT-FREE UPLINK TRANSMISSIONS

(71) Applicants: Yu Cao, Kanata (CA); Liqing Zhang, Ottawa (CA); Jianglei Ma, Ottawa (CA)

(72) Inventors: Yu Cao, Kanata (CA); Liqing Zhang, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/799,157

(22) Filed: Oct. 31, 2017

(65) Prior Publication Data

US 2018/0123765 A1 May 3, 2018

Related U.S. Application Data

(60) Provisional application No. 62/459,949, filed on Feb. 16, 2017, provisional application No. 62/421,087, (Continued)

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1614* (2013.01); *H04L 1/1671* (2013.01);
(Continued)

(58) Field of Classification Search
CPC ... H04L 5/0055; H04L 1/1861; H04L 5/0048; H04L 5/0044; H04W 72/0413
(Continued)

(56) References Cited

U.S. PATENT DOCUMENTS

2009/0147688 A1 6/2009 Matsumoto et al.
2010/0118803 A1 5/2010 Ishii et al.
(Continued)

FOREIGN PATENT DOCUMENTS

CN 101374038 A 2/2009
CN 101855934 A 10/2010
(Continued)

OTHER PUBLICATIONS

3GPP TSG RAN WG1 Meeting #86 R1-167206,"HARQ timing relationships for grant-free transmission", Huawei, HiSilicon, Aug. 22-26, 2016, total 2 pages.
(Continued)

*Primary Examiner* — Inder P Mehra

(57) ABSTRACT

In a wireless communication system, a grant-free uplink transmission is an uplink transmission sent from a user equipment (UE) to a base station that does not need a dynamic and explicit scheduling grant from the base station. Systems and methods are disclosed for performing hybrid automatic repeat request (HARQ) for grant-free uplink transmissions. Signaling relating to the ACK/NACK for the HARQ, as well as signaling relating to configuring the UE for grant-free uplink transmission, is also disclosed.

26 Claims, 17 Drawing Sheets

Related U.S. Application Data filed on Nov. 11, 2016, provisional application No. 62/416,939, filed on Nov. 3, 2016.

(51) Int. Cl.
*H04L 1/16* (2006.01)
*H04W 72/04* (2009.01)

(52) U.S. Cl.
CPC .......... *H04L 1/1819* (2013.01); *H04L 1/1822* (2013.01); *H04L 1/1861* (2013.01); *H04L 1/1893* (2013.01); *H04L 1/1896* (2013.01); *H04L 1/1854* (2013.01); *H04L 5/0044* (2013.01); *H04L 5/0048* (2013.01); *H04W 72/0413* (2013.01)

(58) Field of Classification Search
USPC ........................................................ 370/329
See application file for complete search history.

(56) References Cited

U.S. PATENT DOCUMENTS

| | | | |
|---|---|---|---|
| 2011/0141952 | A1 | 6/2011 | Wang et al. |
| 2012/0113945 | A1* | 5/2012 | Moon ................... H04L 1/1861 370/329 |
| 2014/0075199 | A1* | 3/2014 | Hiwatari ................... H04L 9/14 713/176 |
| 2014/0140336 | A1 | 5/2014 | Callard et al. |
| 2014/0161068 | A1 | 6/2014 | Vrzic et al. |
| 2014/0192767 | A1 | 7/2014 | Au et al. |
| 2014/0254544 | A1 | 9/2014 | Kar et al. |
| 2015/0236823 | A1 | 8/2015 | Djukic et al. |
| 2015/0256316 | A1 | 9/2015 | Seo et al. |
| 2015/0365968 | A1 | 12/2015 | Kim et al. |
| 2016/0044656 | A1 | 2/2016 | Novak et al. |
| 2016/0119184 | A1 | 4/2016 | Soriaga et al. |
| 2016/0219627 | A1 | 7/2016 | Au et al. |
| 2016/0295607 | A1* | 10/2016 | Vajapeyam ........... H04W 24/08 |
| 2016/0353453 | A1 | 12/2016 | Au et al. |
| 2017/0019232 | A1* | 1/2017 | Seo ........................ H04L 1/1861 |
| 2017/0034845 | A1 | 2/2017 | Liu et al. |
| 2017/0164349 | A1 | 6/2017 | Zhu et al. |
| 2017/0187494 | A1* | 6/2017 | Tirronen ............... H04L 1/1671 |
| 2017/0257195 | A1 | 9/2017 | Maaref et al. |
| 2017/0289920 | A1 | 10/2017 | Liu et al. |
| 2017/0366324 | A1 | 12/2017 | Seo et al. |
| 2018/0146445 | A1* | 5/2018 | Lee ........................ H04W 56/00 |
| 2018/0159667 | A1 | 6/2018 | Li et al. |
| 2018/0352511 | A1 | 12/2018 | Martin et al. |
| 2018/0352582 | A1 | 12/2018 | Yi et al. |

FOREIGN PATENT DOCUMENTS

| | | |
|---|---|---|
| CN | 104685808 A | 6/2015 |
| CN | 104838713 A | 8/2015 |
| CN | 105284172 A | 1/2016 |
| EP | 2114029 A1 | 11/2009 |
| EP | 2929744 A1 | 10/2015 |
| JP | 2011511547 A | 4/2011 |
| KR | 20100014732 A | 2/2010 |
| WO | 2009096752 A1 | 8/2009 |
| WO | 2010130187 A1 | 11/2010 |
| WO | 2014110790 A1 | 7/2014 |

OTHER PUBLICATIONS

Huawei et al., "The retransmission and HARQ schemes for grant-free" 3GPP TSG RAN WG1 Meeting #86bis, R1-1608859, Oct. 14, 2016, 5 pages, Lisbon, Portugal.

Nokia Siemens Networks,"Remaining issues on uplink power control",3GPP TSG RAN WG1 #64 Meeting R1-111021, Taipei, Taiwan, Feb. 21-25, 2011, total 1 page.

KT Corp.,"PHICH for MTC UEs",3GPP TSG RAN WG1 Meeting #81 R1-153293,Fukuoka, Japan, May 25-29, 2015, total 2 pages.

Huawei, HiSilicon,"Uplink latency reduction for synchronized UEs",3GPP TSG-RAN WG2 Meeting #91 R2-153374, Beijing, China, Aug. 24-28, 2015, total 5 pages.

CMCC,"Discussion on issues related to PUSCH transmission for LAA",3GPP TSG RAN WG1 Meeting #84 R1-160495, St Julian's, Malta, Feb. 15-19, 2016, total 4 pages.

Huawei, HiSilicon, UL Grant-free transmission [online], 3GPP TSG RAN WG1 #88 R1-1701665, Feb. 6, 2017, total 17 pages.

LG Electronics, Discussion on URLLC UL transmission [online], 3GPP TSG RAN WG1 adhoc_NR_AH_1701 R1-1700513, Jan. 10, 2017, total 9 pages.

Intel Corporationr: "Retransmissions and repetitions for UL grant-free NQMA schemes,"3GPP Draft; R1-1609502, vol. RAN WG1, No. Lisbon, Portugal; Oct. 9, 2016, 6 pages.

NTT Docomo Et Al: "Discussion on C-RNTI handling for CA beyond 5CCs,"3GPP Draft; R2-154404; France, vol. RAN WG2, No. Malmoe, Sweden; Oct. 4, 2015, 6 pages.

Sunghyun Choi et al., "A Class of Adaptive Hybrid ARQ Schemes for Wireless Links", IEEE Transactions on Vehicular Technology, vol. 50, No. 3, May 2001, total 14 pages.

Lenovo, "Discussion on retransmission design for grant-free based ULtransmission", 3GPP TSG RAN WG1 Meeting#86bis R1-1609400, Lisbon, Portugal Oct. 10-14, 2016, total 3 pages.

\* cited by examiner

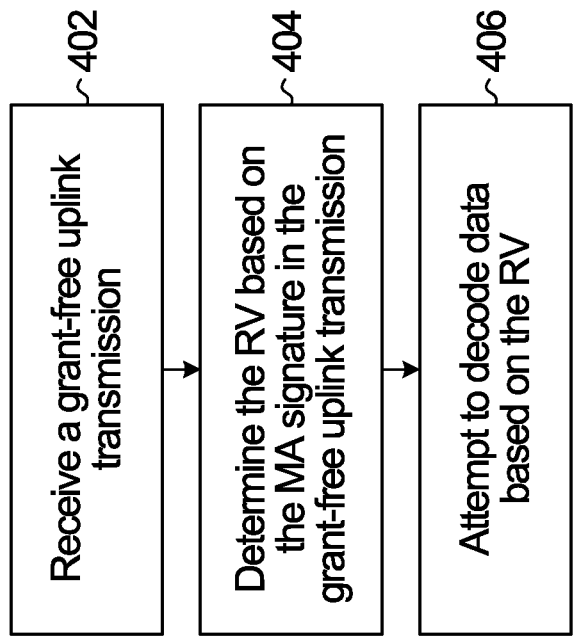

| MA Signature Index (m) \ GF Access Region (n) | 1 | 2 | 3 | 4 |
|---|---|---|---|---|
| 1 | Orthogonal Sequence A Time-frequency location i $(x,y) = (A,i)$ | Orthogonal Sequence A Time-frequency location ii $(x,y) = (A,ii)$ | Orthogonal Sequence A Time-frequency location iii $(x,y) = (A,iii)$ | Orthogonal Sequence A Time-frequency location iv $(x,y) = (A,iv)$ |
| 2 | Orthogonal Sequence B Time-frequency location i $(x,y) = (B,i)$ | Orthogonal Sequence B Time-frequency location ii $(x,y) = (B,ii)$ | Orthogonal Sequence B Time-frequency location iii $(x,y) = (B,iii)$ | Orthogonal Sequence B Time-frequency location iv $(x,y) = (B,iv)$ |
| 3 | Orthogonal Sequence C Time-frequency location i $(x,y) = (C,i)$ | Orthogonal Sequence C Time-frequency location ii $(x,y) = (C,ii)$ | Orthogonal Sequence C Time-frequency location iii $(x,y) = (C,iii)$ | Orthogonal Sequence C Time-frequency location iv $(x,y) = (C,iv)$ |
| 4 | Orthogonal Sequence D Time-frequency location i $(x,y) = (D,i)$ | Orthogonal Sequence D Time-frequency location ii $(x,y) = (D,ii)$ | Orthogonal Sequence D Time-frequency location iii $(x,y) = (D,iii)$ | Orthogonal Sequence D Time-frequency location iv $(x,y) = (D,iv)$ |

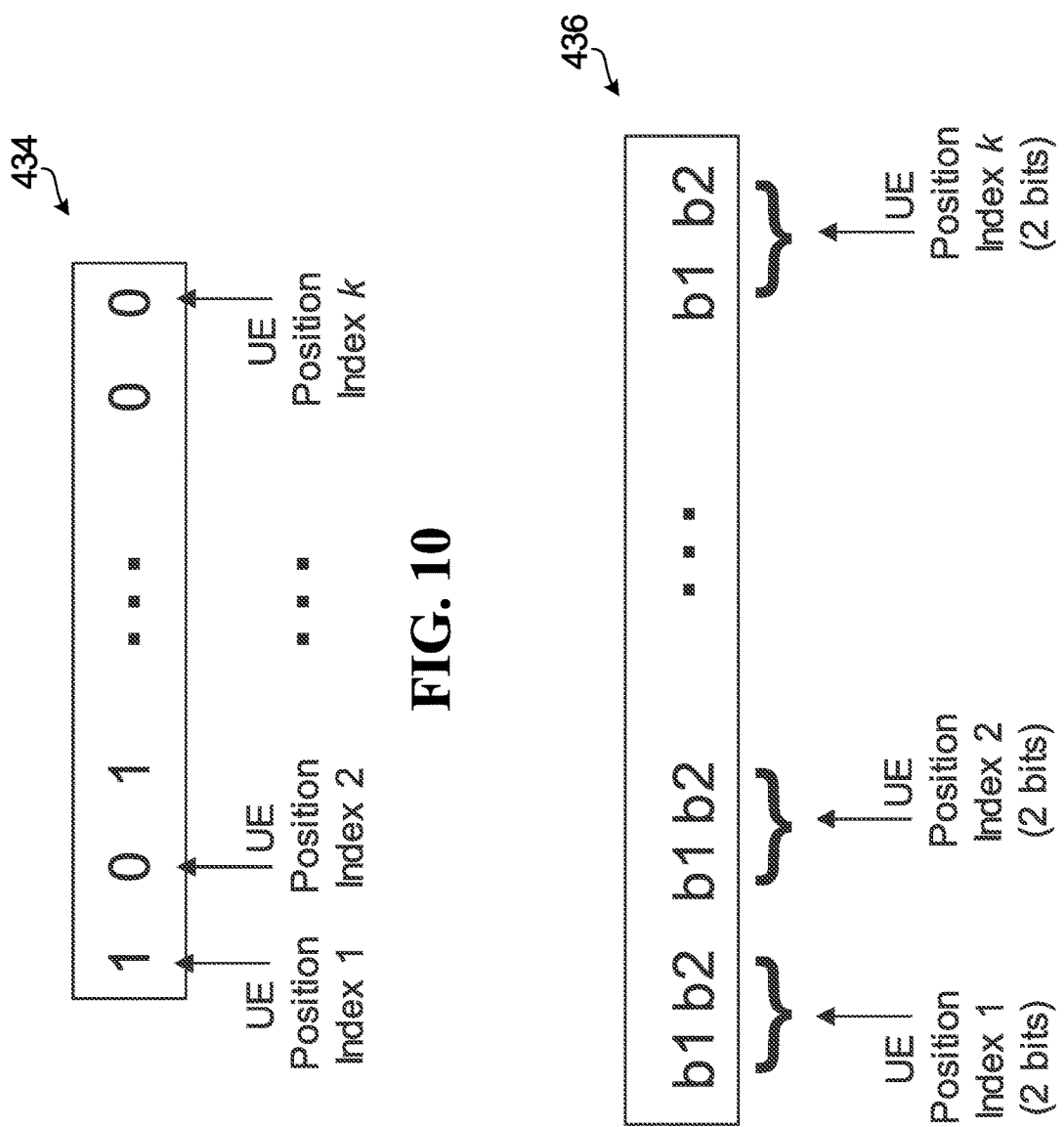

HARQ SIGNALING FOR GRANT-FREE UPLINK TRANSMISSIONS

PRIORITY

The present application claims priority to U.S. Provisional Patent Application Ser. No. 62/416,939 titled "HARQ Systems and Methods for Grant-Free Uplink Transmissions" filed Nov. 3, 2016, and to U.S. Provisional Patent Application Ser. No. 62/421,087 titled "HARQ Systems and Methods for Grant-Free Uplink Transmissions" filed Nov. 11, 2016, and to U.S. Provisional Patent Application Ser. No. 62/459,949 titled "HARQ Signaling for Grant-Free Uplink Transmissions" filed Feb. 16, 2017, all three of which are incorporated herein by reference.

FIELD

The present application relates to grant-free uplink transmissions.

BACKGROUND

In some wireless communication systems, a user equipment (UE) wirelessly communicates with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

Some wireless communication systems may support grant-based uplink transmissions. That is, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency-division multiple access (OFDMA) frame.

Some wireless communication systems may also or instead support grant-free uplink transmissions. That is, a UE may send uplink transmissions using certain uplink resources possibly shared with other UEs, without specifically requesting use of the resources and without specifically being granted the resources by the base station. A grant-free uplink transmission does not need a dynamic and explicit scheduling grant from the base station.

In some cases, when a UE sends a grant-free uplink transmission, the base station may not be able to decode the data in the uplink transmission.

SUMMARY

Hybrid automatic repeat request (HARQ) is a method in which data to be transmitted is encoded using an error correction code. Then, if the encoded data is corrupted during transmission and the receiver is unable to correct the errors, automatic repeat request (ARQ) is performed.

The HARQ signaling for grant-based uplink transmissions may not be available for grant-free uplink transmissions because grant-free uplink transmissions do not receive an explicit scheduling grant from the base station.

Systems and methods are disclosed herein for performing HARQ for grant-free uplink transmissions. Signaling relating to the ACK/NACK for the HARQ, as well as signaling relating to configuring a UE for grant-free uplink transmission, is also disclosed.

By using the systems and methods described herein, HARQ signaling for grant-free uplink transmissions may therefore be provided. In particular, some embodiments below provide support for ACK/NACK feedback for grant-free transmissions and retransmissions.

In one embodiment, there is provided a method performed by a base station. The method includes the base station receiving a first grant-free uplink transmission from a first UE. The method further includes the base station receiving a second grant-free uplink transmission from a second UE. The method further includes transmitting, to the first UE and to the second UE, a group ACK/NACK message indicating an ACK or a NACK corresponding to the first grant-free uplink transmission and an ACK or a NACK corresponding to the second grant-free uplink transmission. A base station configured to perform the method is also disclosed.

In another embodiment there is provided a method performed by a first UE. The method includes transmitting a first grant-free uplink transmission to a base station. The method further includes receiving a group ACK/NACK message indicating an ACK or a NACK corresponding to the first grant-free uplink transmission and an ACK or a NACK corresponding to a second grant-free uplink transmission from a second UE. A UE to perform the method is also disclosed.

BRIEF DESCRIPTION OF THE DRAWINGS

Embodiments will be described, by way of example only, with reference to the accompanying figures wherein:

FIGS. 4 and 5 illustrate tables showing example mappings between transmissions and MA signatures or physical resources;

FIG. 6 is a method performed by a base station, according to one embodiment;

FIG. 7 illustrates an example mapping between MA signature/grant-free access region and orthogonal sequence/time-frequency location of feedback;

FIGS. 10 to 13 illustrate examples of group ACK/NACKs;

DETAILED DESCRIPTION

For illustrative purposes, specific example embodiments will now be explained in greater detail below in conjunction with the figures.

Figure 1:
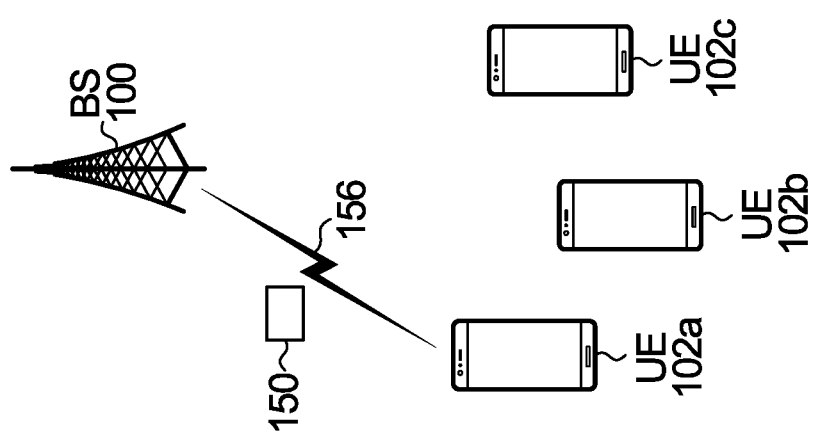
FIG. 1 is a block diagram of a base station and a plurality of UEs, according to one embodiment.

FIG. 1 is a block diagram of a base station 100 and a plurality of UEs 102a-c, according to one embodiment.

The word "base station" encompasses any device that wirelessly receives data in the uplink from UEs. Therefore, in some implementations, the base station 100 may be called other names, such as a transmit and receive point (TRP), a base transceiver station, a radio base station, a network node, a transmit/receive node, a Node B, an eNodeB (eNB), a gNB (sometimes called a "gigabit" Node B), a relay station, or a remote radio head. Also, in some embodiments, the parts of the base station 100 may be distributed. For example, some of the modules of the base station 100 may be located remote from the equipment housing the antennas of the base station 100, and may be coupled to the equipment housing the antennas over a communication link (not shown). Therefore, in some embodiments, the term base station 100 may also refer to modules on the network side that perform processing operations (e.g. decoding and message generation) that are not necessarily part of the equipment housing the antennas of the base station 100. The modules may also be coupled to other base stations.

In operation, UEs 102a-c may each send grant-free uplink transmissions to the base station 100. A grant-free uplink transmission is an uplink transmission that is sent using uplink resources not specifically granted to the UE by the base station 100. A grant-free uplink transmission does not need a dynamic and explicit scheduling grant from the base station 100.

Grant-free uplink transmissions are sometimes called "grant-less", "schedule free", or "schedule-less" transmissions, or transmissions without grant. Grant-free uplink transmissions from different UEs 102a-c may be transmitted using the same designated resources, in which case the grant-free uplink transmissions are contention-based transmissions. Grant-free uplink transmissions may be suitable for transmitting bursty traffic with short packets from the UEs 102a-c to the base station 100, and/or for transmitting data to the base station 100 in real-time or with low-latency. Examples of applications in which a grant-free uplink transmission scheme may be utilized include: massive machine type communication (m-MTC), ultra-reliable low latency communications (URLLC), smart electric meters, teleprotection in smart grids, and autonomous driving. However, grant-free uplink transmission schemes are not limited to these applications.

The uplink resources on which grant-free transmissions are sent will be referred to as "grant-free uplink resources". For example, the grant-free uplink resources may be a designated region in an OFDMA frame. The UEs 102a-c may use the designated region to send their grant-free uplink transmissions, but the base station 100 does not know which of the UEs 102a-c, if any, are going to send a grant-free uplink transmission in the designated region.

The grant-free uplink resources may be predefined, e.g. known in advance to both the UEs and the base station 100. The grant-free uplink resources may be static (never change), or the grant-free uplink resources may be configured semi-statically. A semi-static configuration means it is configured once and can only be updated/changed slowly, such as once in many frames or may only be updated as needed. A semi-static change differs from a dynamic change in that a semi-static change does not occur as often as a dynamic change. For example, a dynamic change/update may refer to a change every subframe or every few subframes, and a semi-static change may refer to a change that only occurs once every several OFDM frames, once every few seconds, or update only if needed.

In some embodiments, the grant-free uplink resources may be preconfigured, e.g. there may be a plurality of possible predefined grant-free uplink resource partitions, and the base station 100 or the network may semi-statically pick one of the predefined grant-free uplink resource partitions and signal to the UEs the grant-free uplink resource partition being used. In some embodiments, the base station 100 and/or the UEs may be configured during their manufacture to know which uplink resources to use as grant-free uplink resources, e.g. through predefined tables loaded during manufacture. In some embodiments, the grant-free uplink resources may be semi-statically configured, e.g. by using a combination of broadcast signalling, higher layer signalling (RRC signalling) and dynamic signalling (e.g. DCI) by the base station 100. By dynamically signaling the grant-free uplink resources, the base station 100 or network may adapt to the system traffic load of the UEs. For example, more grant-free uplink resources may be allocated when there are more UEs being served that may send grant-free uplink transmissions. In some embodiments, a control node (e.g. a computer) in the network may determine the grant-free uplink resources to be used. The network may then indicate the grant-free uplink resources to the base station and the UEs. In some embodiments, a UE operating in grant-free mode may be semi-statically configured to combine: 1) the RRC signaling information and the system information; or 2) the RRC signaling information and the DCI information; or 3) the RRC signaling information, the system information and the DCI information to determine an assigned transmission resource.

FIG. 1 illustrates a message 150 being sent by UE 102a in a grant-free uplink transmission over uplink channel 156. The message 150 is transmitted using a multiple access (MA) resource. A MA resource is comprised of a MA physical resource (e.g. a time-frequency block) and at least one MA signature. The MA signature may include (but is not limited to) at least one of the following: a codebook/codeword, a sequence, an interleaver and/or mapping pattern, a pilot, a demodulation reference signal (e.g. a reference signal for channel estimation), a preamble, a spatial-dimension, and a power-dimension. The term "pilot" refers to a signal that at least includes a reference signal, e.g. a demodulation reference signal. The reference signal may be the MA signature. In some embodiments, the pilot may include the demodulation reference signal, possibly along with a channel-estimation-oriented preamble, or a random access channel (LTE-like RACH) preamble.

In some embodiments, the uplink transmissions may use non-orthogonal multiple access (NOMA), such as: sparse code multiple access (SCMA), interleave-grid multiple access (IGMA), multi-user shared access (MUSA), low code rate spreading, frequency domain spreading, non-orthogonal coded multiple access (NCMA), pattern division multiple access (PDMA), resource spread multiple access (RSMA), low density spreading with signature vector extension (LDS-SVE), low code rate and signature based shared access (LSSA), non-orthogonal coded access (NOCA), interleave division multiple access (IDMA), repetition division multiple access (RDMA), or group orthogonal coded access (GOCA). Depending upon the multiple access method used, the MA signature may take different forms. The MA signature may relate to the specific format used for the multiple access method. For example, if SCMA is used, then the MA signature for the uplink transmission may be the SCMA codebook used for the uplink transmission. As another example, if IGMA is used, then the MA signature for the uplink transmission may be the IGMA's signature, interleaving pattern or grid mapping used for the uplink transmission.

Figure 2:
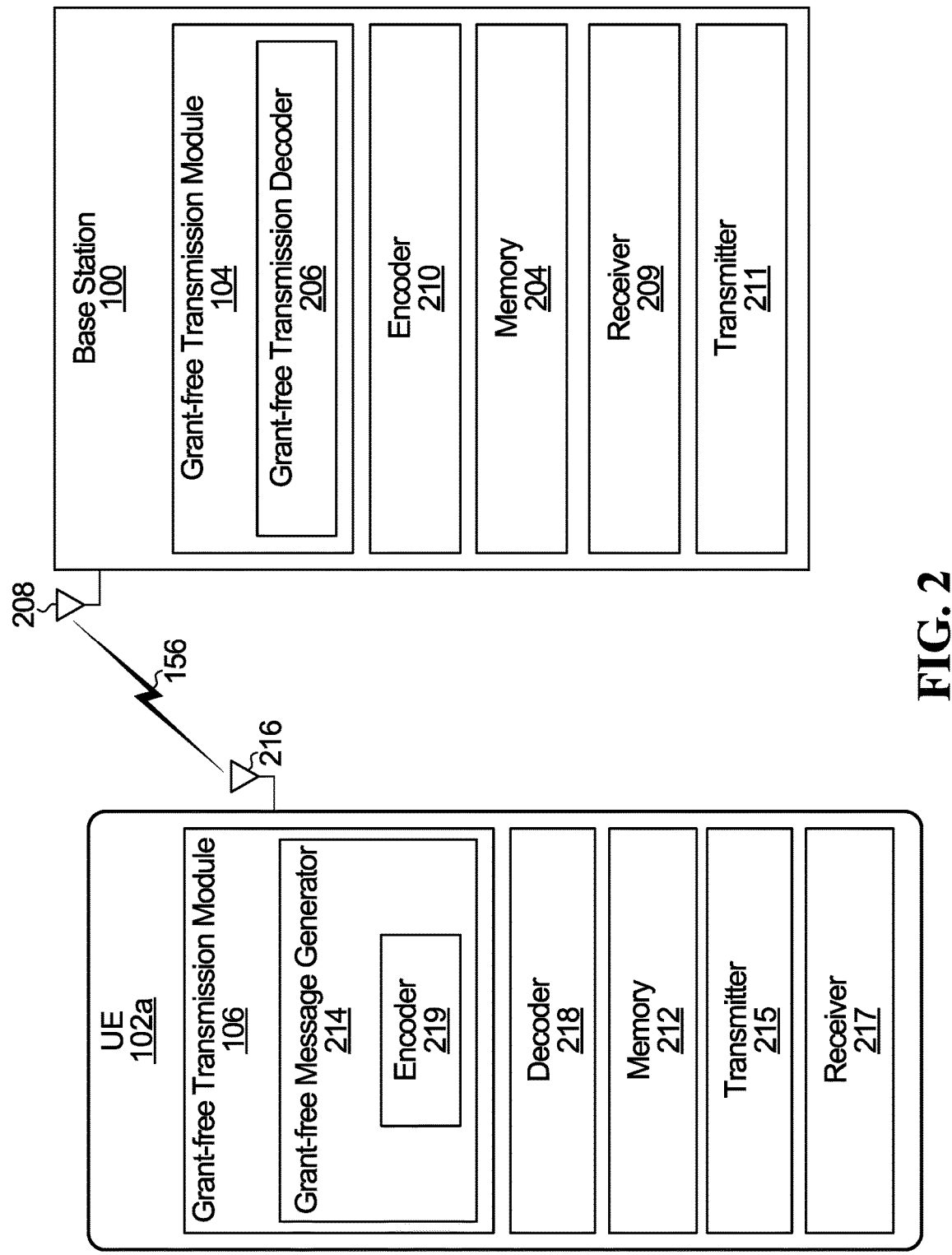
FIG. 2 is a block diagram showing a base station and UE in more detail, according to one embodiment.

FIG. 2 is a block diagram showing the base station 100 and UE 102a of FIG. 1 in more detail. The base station 100 includes a grant-free transmission module 104 for processing grant-free transmissions received from UEs 102a-c and for participating in the HARQ methods described herein relating to the received grant-free transmissions. For example, the grant-free transmission module 104 may include a grant-free transmission decoder 206. The base station further includes an encoder 210 for encoding information, such as downlink control information (DCI), destined for the UEs 102a-c. The base station 100 also includes a receiver 209 for receiving uplink transmissions from the UEs 102a-c, and a transmitter 211 for sending messages to the UEs 102a-c in the downlink. One or more antennas are coupled to the receiver 209 and transmitter 211. Only one antenna 208 is illustrated. The base station 100 further includes memory 204. The base station 100 further includes other components for operation, e.g. to implement the physical layer, but these have been omitted for the sake of clarity.

The grant-free transmission module 104 and its components (e.g. the grant-free transmission decoder 206), as well as the encoder 210 and processing components of the receiver 209 and transmitter 211, may be implemented by one or more processors that execute instructions that cause the one or more processors to perform the operations of the encoder 210, the receiver 209, the transmitter 211, and the grant-free transmission module 104 and its components. Alternatively, the encoder 210, the receiver 209, the transmitter 211, and the grant-free transmission module 104 and its components may be implemented using dedicated integrated circuitry, such as an application specific integrated circuit (ASIC), a graphics processing unit (GPU), or a programmed field programmable gate array (FPGA) for performing the operations of the encoder 210, the receiver 209, the transmitter 211, and the grant-free transmission module 104 and its components.

The UE 102a also includes a complementary grant-free transmission module 106 for generating and sending grant-free messages and for participating in the HARQ methods described herein related to the grant-free messages. For example, the grant-free transmission module 106 includes a grant-free message generator 214 for generating messages to be transmitted in grant-free uplink transmissions. Generating a grant-free message may include encoding, in encoder 219, the data to be transmitted in the message, and modulating the encoded data. The UE 102a further includes a decoder 218 for decoding information from the base station 100, e.g. for decoding DCI that was encoded by encoder 210. The UE 102a further includes a transmitter 215 for transmitting uplink transmissions and a receiver 217 for receiving messages from the base station 100 in the downlink. One or more antennas are coupled to the transmitter 215 and the receiver 217. Only one antenna 216 is illustrated. The UE 102a further includes memory 212. The UE 102a further includes other components for operation, e.g. to implement the physical layer, but these have been omitted for the sake of clarity.

The grant-free transmission module 106 and its components (e.g. the grant-free message generator 214), as well as the decoder 218 and processing components of the transmitter 215 and the receiver 217, may be implemented by one or more processors that execute instructions that cause the one or more processors to perform the operations of the decoder 218, the transmitter 215, the receiver 217, and the grant-free transmission module 106 and its components. Alternatively, the decoder 218, the transmitter 215, the receiver 217, and the grant-free transmission module 106 and its components may be implemented using dedicated integrated circuitry, such as an ASIC, GPU, or a programmed FPGA for performing the operations of the decoder 218, the transmitter 215, the receiver 217, and the grant-free transmission module 106 and its components.

Example Message Formats for Grant-Free Uplink Transmissions

Figure 3:
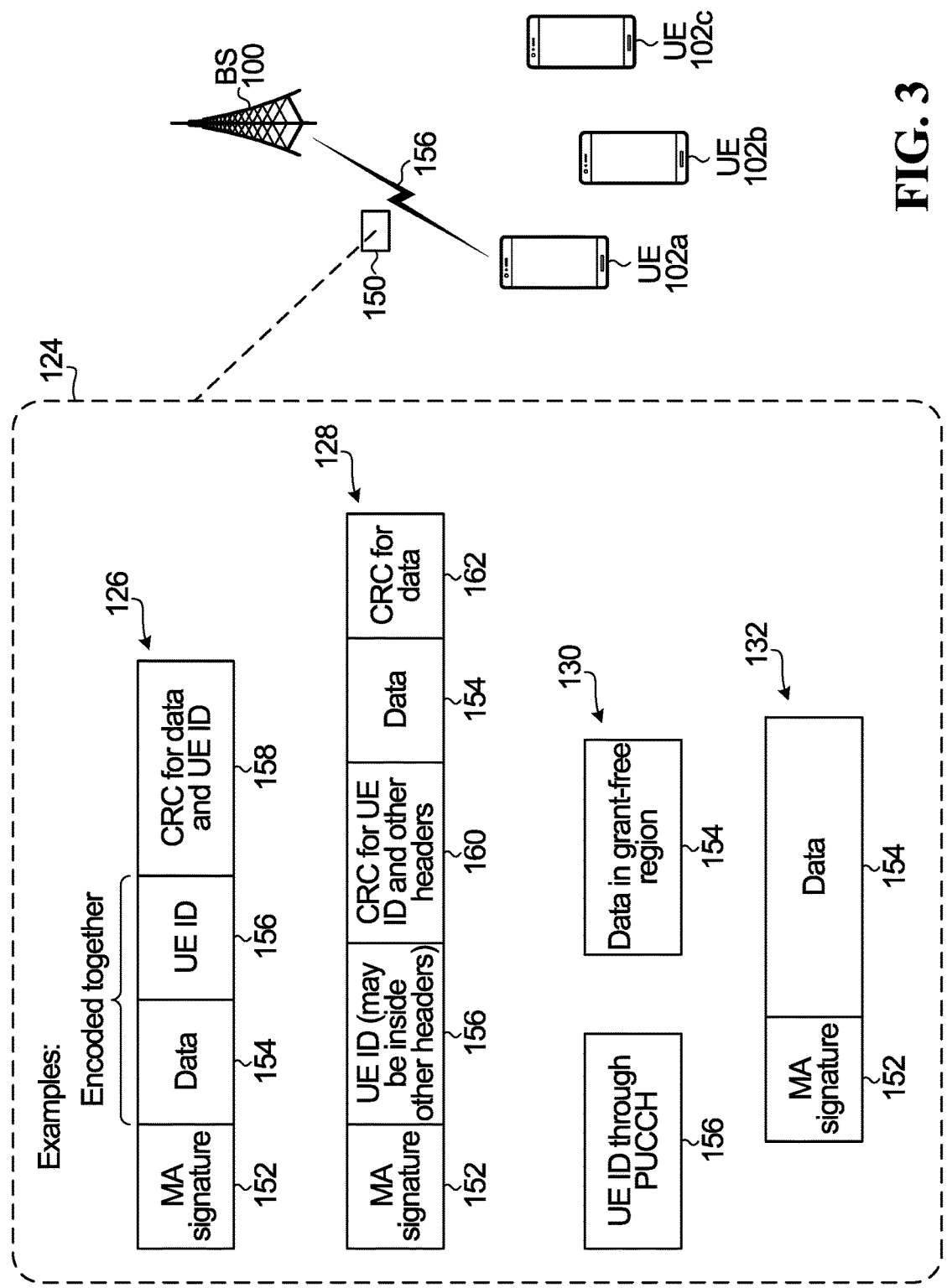
FIG. 3 illustrates example formats for a grant-free uplink transmission.

FIG. 3 illustrates example formats for the message 150 sent by UE 102a in the grant-free uplink transmission of FIG. 1. The example formats are shown in stippled bubble 124.

In example 126, the message 150 includes a MA signature 152, as well as data 154 and a UE ID 156. The UE ID 156 is information used by the base station 100 to identify the UE. In example 126, the data 154 and the UE ID 156 are encoded together, and a corresponding cyclic redundancy check (CRC) 158 is generated and included in the message 150. In some embodiments, the UE ID 156 is instead embedded (e.g. scrambled) in the CRC 158, which may reduce the payload size. If the UE ID 156 is embedded in the CRC 158, then the base station 100 needs to know the UE ID or perform blind detection using all potential UE ID's in order to decode the CRC 158.

Example 128 is a variation of example 126 in which the UE ID 156 is separately encoded from the data 154. Therefore, a separate CRC 160 is associated with the UE ID 156. In some embodiments, the UE ID 156 may be inside one or more other headers, in which case the CRC 160 is for the headers in which the CRC 160 is located. In example 128, the UE ID 156 may be transmitted with a lower modulation and coding scheme (MCS) than the data 154 in order to facilitate decoding of the UE ID 156. There may be situations in which the UE ID 156 is successfully decoded, but the data 154 is not successfully decoded.

In examples 126 and 128, the MA signature 152 is illustrated as occupying separate time-frequency resources from the data 154, e.g. at the start of the message 150. This may be the case if, for example, the MA signature 152 consists of a reference signal and/or a preamble. However, the MA signature 152 may instead be part of the transmission scheme itself, e.g. the codebook used or the mapping or interleaving pattern used, in which case the MA signature 152 would not occupy separate time-frequency resources from the data 154. Also, in embodiments in which the MA signature 152 does occupy separate time-frequency resources from the data 154, the resources do not necessarily have to be at the start of the message 150.

Example 130 in FIG. 1 shows a variation in which the UE ID 156 and the data 154 are transmitted through different resources. For example, the UE ID 156 may be transmitted as part of a control channel, such as a physical uplink control channel (PUCCH). The data 154 may be transmitted in a grant-free region of an uplink data channel. The MA signature is not illustrated in example 130, but the MA signature would be part of the data transmission.

In some other embodiments, the UE ID is not explicitly transmitted. For example, in some URLLC scenarios, based on the resource and reference signal configuration, detecting the reference signal along with the information about the grant-free resources may be enough to identify the UE. In this case, the UE ID does not need to be explicitly transmitted, and the base station can identify the UE after successfully detecting the reference signal. An example is shown at 132. Only the MA signature 152 and the data 154 are included in the message, not a UE ID. The UE ID can be determined based on the MA signature 152 and the grant-free uplink resources used to send the message.

When the UE sends message 150 to the base station 100, the base station 100 first attempts to detect the MA signature. MA signature detection may involve a blind detection process in which the MA signature is detected among all of the possible choices of MA signatures. Detecting the MA signature is referred to as activity detection. As an example, the MA signature in the grant-free uplink transmission may be a reference signal, and activity detection by the base station would therefore comprise detecting the reference signal in the grant-free uplink transmission. As another example, the MA signature in the grant-free uplink transmission may be a combination of the reference signal and the codebook or signature used by the UE in the grant-free uplink transmission, and activity detection by the base station would therefore comprise detecting the combination of the reference signal and codebook/signature used in the grant-free uplink transmission.

By successfully performing activity detection, the base station 100 knows that a UE has sent a grant-free uplink transmission. However, successful activity detection may or may not reveal the identity of the UE to the base station 100. If there is a unique mapping between a UE and an MA signature (e.g. for a given MA physical resource each UE has been assigned to use a different MA signature), then successful activity detection reveals the identity of the UE that sent the grant-free uplink transmission. Otherwise, in general, successful activity detection does not reveal the identity of the UE that sent the grant-free uplink transmission, although it may reveal that the UE is from a particular group of UEs, if different groups of UEs are assigned different MA signatures. In some embodiments, activity detection may further include obtaining the UE ID, e.g. if the UE ID is encoded separately from the data 154, as in example message 128.

After activity detection is successful, the base station 100 then attempts to perform channel estimation based on the MA signature and optionally additional reference signals multiplexed with the data message, and then decode the data 154. If data decoding is also successful, then the base station 100 can send an acknowledgement (ACK) to the UE in the downlink indicating that the base station 100 has successfully decoded the data 154. In embodiments in which successful activity detection does not reveal the identity of the UE, then successful decoding of the rest of the message 150 will reveal the identity of the UE, in which case the base station 100 will know the UE to which to send the ACK. If data decoding is not successful, then a negative acknowledgement (NACK) may be sent by the base station, possibly with a grant for a retransmission. As discussed in more detail later, in some embodiments a NACK is not sent if decoding of the data was unsuccessful. As also discussed in more detail later, in some embodiments, if a NACK is sent, the NACK may not necessarily include information that can uniquely identify the UE to which the NACK is being sent because the base station may not be able to uniquely identify the UE.

In one example, the MA signature 152 in example 126 is a reference signal. The base station 100 may first successfully perform activity detection by successfully decoding the reference signal sequence. The reference signal sequence may then be used by the base station 100 for channel estimation of the uplink channel 156. To facilitate successful decoding of the reference signal, the reference signal may be transmitted with a low MCS. Once the reference signal is successfully decoded and channel estimation performed, the base station 100 then decodes the payload having the data 154 and UE ID 156. The base station 100 can then read the UE ID 156 to be informed of which UE the grant-free transmission came from. The base station 100 can then send an ACK to the UE in the downlink indicating that the base station 100 has successfully decoded the data 154.

UE Identification by the Base Station

The grant-free uplink transmission may include a UE ID, e.g. UE ID 156 in FIG. 3. The UE ID is information used by the base station 100 to identify the UE.

In some embodiments, the UE ID may be a radio network temporary identifier (RNTI), or may be based on a RNTI.

In some embodiments, the UE ID may be an index. The index distinguishes the UE from other UEs that are also permitted to send grant-free uplink transmissions on the same grant-free uplink resources. For example, the index may distinguish the UE from other UEs that are also permitted to send grant-free uplink transmissions on a shared time-frequency region in the same time slot, transmission time interval (TTI), or subframe.

In some embodiments, the UE ID does not need to be identical or fixed across one cell or serving area. For example, if a particular UE is part of a group of ten UEs allowed to send grant-free uplink transmissions in uplink resource partition A, then the UE ID may be an index between 1 and 10, which distinguishes the UE from the other nine UEs in the group. The base station 100 uses the index and knowledge of which grant-free uplink resource partition was used to determine which particular UE sent the grant-free uplink transmission.

In some embodiments, for a given MA physical resource, the UEs using that MA physical resource for grant-free uplink transmissions are assigned different MA signatures. The base station 100 may then uniquely identify the UE that sent the grant-free uplink transmission based on the combination of the MA signature and the MA physical resource used.

In some embodiments, for a given MA physical resource, some of the UEs using that MA physical resource for grant-free uplink transmissions may use the same MA signature. A UE index may be assigned by the base station 100 to differentiate between UEs that use the same MA signature. For example, if two UEs both use the same MA signature, then one of the UEs may be assigned UE index "1" as their UE ID, and the other UE may be assigned UE index "2" as their UE ID. The indices "1" and "2" may be reused for other UEs sharing a same MA signature. Then, the base station 100 uses the combination of the MA physical resource, the MA signature, and the UE index to identify the UE that sent the grant-free uplink transmission.

In some embodiments, each UE may be assigned the use of a different MA signature that is known by the base station 100 and the UE. The assignment may change over time. For example, a UE may be assigned a first MA signature, and then at a later time the UE may be assigned another MA signature. The MA signature received and the time-frequency resource used may uniquely identify the UE.

In some embodiments, a particular UE may be assigned multiple MA signatures, e.g. a first MA signature for initial transmissions and a second MA signature for retransmissions. In some embodiments, the MA signature assigned to each UE of a group of UEs may change over time according to a hopping pattern. In some embodiments, the assignment of MA signatures to UEs may be reused or repeated for different UEs in different grant-free uplink resource partitions. For example, a first group of UEs may be assigned to a first partition of uplink resources for sending their grant-free uplink transmissions. Each UE of the first group of UEs may be assigned a different MA signature. A second group of UEs may be assigned to a second partition of uplink resources for sending their grant-free uplink transmissions. Each UE of the second group of UEs may be assigned a different MA signature. The MA signatures in the first group may overlap with the MA signatures in the second group, such that to uniquely identify the UE, the base station 100 must know both the MA signature of the uplink transmission and the partition of uplink resources used to send the grant-free uplink transmission. For example, the base station 100 may use the detected MA signature 152 and an index corresponding to the grant-free uplink resource partition used to check a lookup table to determine the identity of the UE that sent the grant-free uplink transmission.

In embodiments in which the base station 100 can determine the identity of the UE without the UE ID 156, then the UE ID 156 may not even need to be transmitted as part of the message 150.

In summary, various possibilities exist in implementation to allow for the base station 100 to uniquely identify the UE that sent the grant-free uplink transmission. For example, if only one UE is able to use a particular grant-free uplink resource, then the use of that grant-free uplink resource uniquely identifies the UE. As another example, when there is a unique mapping of MA signatures to UEs for a particular resource region, then the MA signature may uniquely identify a UE in that resource region. As another example, when a UE ID is present in the uplink message and successfully decoded by the base station, the UE ID itself may uniquely identify the UE, or the UE ID in combination with another piece of information (e.g. the grant-free uplink resource used) may uniquely identify the UE.

HARQ for Grant-Free Uplink Transmissions

HARQ may be performed for the grant-free uplink transmissions. For example, if the data 154 in the initial grant-free uplink transmission is not successfully decoded by the base station 100, then a retransmission may be performed by the UE. The retransmission may include a retransmission of the initial data and/or further information for decoding the initial data. For example, the retransmission data may include some or all of the original data and/or parity information. The base station 100 may perform HARQ combining as follows: instead of discarding unsuccessfully decoded initial data, the unsuccessfully decoded initial data may be stored at the base station 100 in memory and combined with received retransmission data to try to successfully decode the initial data. When HARQ combining is performed, the retransmission data from the UE may not need to be a complete retransmission of the initial data. The retransmission may carry less data, such as some or all of the parity bits associated with the initial data. One type of HARQ combining that may be used is soft combining, such as chase combining or incremental redundancy.

Initial transmissions and retransmissions may use different redundancy versions (RVs). When data is encoded in the grant-free message generator 214, the encoded bits may be partitioned into different sets (that possibly overlap with each other). Each set is a different RV. For example, some RVs may have more parity bits than other RVs. Each RV is identified by an RV index (e.g. RV 0, RV 1, RV 2, . . . etc.). When an uplink transmission is sent using a particular RV, then only the encoded bits corresponding to that RV are transmitted. Different channel codes may be used to generate the encoded bits, e.g. turbo codes, low-density parity-check (LDPC) codes, polar codes, etc. An error control coder (not illustrated) in the grant-free message generator 214 in the UE 102a may perform the channel coding.

In one embodiment, the channel coding results in an encoded bit stream comprising three bit streams: a systematic bit stream and two parity bit streams. Rate matching may be performed, and a circular buffer (not illustrated) may store the systematic and parity bits. The bits may be read from the circular buffer and modulated for transmission in the grant-free uplink message. The circular buffer has different RVs associated with it, e.g. four redundancy versions (RVs): RV0, RV1, RV2, and RV3. Each RV indicates a starting location from which the coded bits are to be read from the circular buffer. Therefore, each RV transmits a different set of the encoded bits. Data may initially be transmitted using RV 0, but a retransmission may sometimes use a higher RV, e.g., RV 2 for the first retransmission, RV 3 for a second retransmission, etc.

The base station 100 uses knowledge of the RV to perform decoding. For chase combining, the RV of the initial and retransmissions may be the same, e.g. RV 0. For incremental redundancy, the retransmissions may use a higher RV that may follow a fixed pattern, e.g. RV 0 for the initial transmission, RV 2 for the first retransmission, RV 3 for the second retransmission, and RV 1 for the third retransmission. Therefore, in order to decode the data, it may be necessary for the base station 100 to know the RV index of the data being received in a grant-free uplink transmission, unless there is only one predefined RV.

As part of the HARQ procedure for a grant-free uplink transmission, an ACK may be sent by the base station 100 when the base station 100 successfully decodes the data of the grant-free uplink transmission. In some embodiments, a NACK may be sent by the base station 100 when the data is not successfully decoded. However, a NACK may not always be sent, e.g. in "NACK-less" HARQ schemes in which the absence of an ACK within a predetermined period of time is interpreted as a NACK. In some embodiments, an ACK may be associated with a UE ID that identifies the UE the ACK is meant for. If the MA signature and uplink grant-free resource region used can together uniquely identify the UE, then the ACK may instead be associated with an index identifying the MA signature. The UE knows the ACK is meant for it based on a matching MA signature index. A NACK, if sent, may be associated with a UE ID when the UE ID is successfully decoded by the base station. Alternatively, the NACK may be associated with an index identifying the MA signature corresponding to the uplink transmission being NACK'd, assuming successful activity detection by the base station. Otherwise, the NACK may not be associated with a UE ID or a MA signature.

Retransmissions and Mapping to MA Signatures

If the data in the initial grant-free uplink transmission is not successfully decoded by the base station, then a retransmission may be performed by the UE. In some embodiments, the MA signature used in the grant-free uplink transmission may identify whether the transmission is an initial transmission or a retransmission. In some embodiments, the MA signature may also or instead be used to identify the UE that send the transmission.

Figure 4:
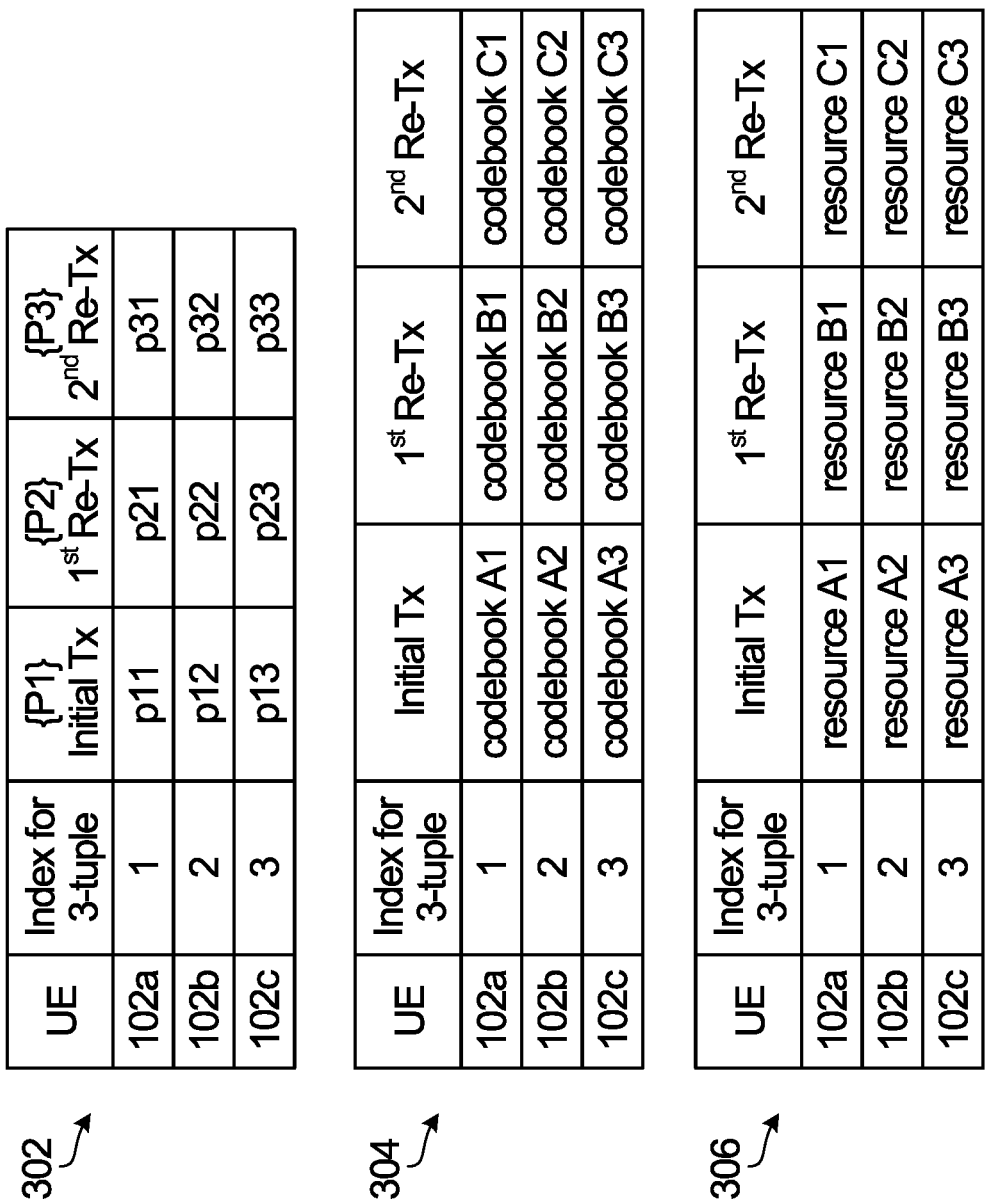

As a first example, FIG. 4 illustrates three tables 302, 304, and 306, showing different mappings. In table 302, the MA signature is a reference signal. A pool {P} of nine reference signals (i.e. nine MA signatures) are partitioned into three sets {P1}, {P2}, and {P3}. The reference signals may be pilots. Each row in table 302 represents a 3-tuple. In this example, the pool {P} is divided into three exclusive sets {P1}, {P2}, and {P3}, such that each set has three of the nine reference signals. Specifically, {P1} includes reference signals p11, p12, and p13, {P2} includes reference signals p21, p22, and p23, and {P3} includes reference signals p31, p32, and p33. Three of the nine reference signals are designated as initial reference signals, another three of the nine reference signals are designated as first retransmission reference signals, and the last three of the nine reference signals are designated as second retransmission reference signals. The specific mapping in table 302 is only an example, and the mapping may change over time and/or may only be for a particular grant-free uplink resource partition (e.g. there may be a different mapping in a different MA physical resource). In the example in table 302, UE 102a is assigned tuple index 1, UE 102b is assigned tuple index 2, and UE 102c is assigned tuple index 3. Therefore, when the base station 100 performs successful activity detection (i.e. successfully decodes the reference signal), then the base station 100 uses the reference signal sequence to determine which UE sent the grant-free uplink transmission. In the example in table 302, each reference signal sequence also indicates to the base station 100 whether the grant-free uplink transmission is an initial transmission, a first retransmission, or a second retransmission. In the example of table 302, the reference signal can be used to identify both the initial and retransmission as well as the UE identity. For example, reference signal p11, p21 or p31 may indicate the grant-free packets are transmitted by UE 102a. In alternative embodiments, there may still be a unique mapping between reference signals and UEs, but the reference signals may only be mapped to the identity of the UE and not mapped to initial transmissions or retransmission. For example, reference signal p11 may be assigned to a first UE, reference signal p12 may be assigned to a second UE, . . . , and reference signal p33 may be assigned to a ninth UE. Each of the nine UEs may then use their same assigned reference signal for their initial transmissions and retransmissions.

Table 304 is the same as table 302, except that the MA signature is a sparse code multiple access (SCMA) codebook. Nine SCMA codebooks {A1, A2, A3, B1, B2, B3, C1, C2, and C3} are partitioned into initial and retransmission sets and assigned to each one of UEs 102a-c. For example, the use of codebook A1 indicates to the base station 100 that UE 102a sent the transmission, and that the transmission is an initial data transmission. In some embodiments, there may also be a fixed, semi-persistent, or dynamic association between certain reference signals and SCMA codebooks. In such embodiments, the reference signal sequence or the SCMA codebook may be used to identify the UE and/or whether the transmission is an initial transmission, a first retransmission, or a second retransmission. In some embodiments, one SCMA codebook may be associated with multiple reference signals. In such embodiments, identifying the reference signal sequence reveals the SCMA codebook used. In some embodiments, the SCMA codebook may have a one-to-one association with the reference signal. In such embodiments, identifying the reference signal sequence reveals the SCMA codebook used and vice versa.

Table 306 is also the same as table 302, except instead of MA signatures, there is an assigned mapping between physical uplink resources used for the grant-free transmissions and initial transmissions and retransmissions and UEs. Nine different time-frequency locations {A1, A2, A3, B1, B2, B3, C1, C2, and C3} are partitioned into initial and retransmission sets and assigned to each one of UEs 102a-c. For example, the receipt, by base station 100, of a grant-free uplink transmission on physical uplink resources A1 indicates to the base station 100 that UE 102a sent the transmission, and that the transmission is an initial data transmission.

In each table shown in FIG. 4, there happens to be a unique mapping between MA signatures tuples or physical resources tuples and the UEs. However, in some embodiments there does not have to be any unique mapping to UEs. The base station does not have to assign UEs to particular tuples. More generally, the mapping relationship between the different MA signatures or physical resources, i.e. the tuples in the tables in FIG. 4, may be used to identify that the initial transmission and the retransmissions belong to the same packet. For example, UE 102a may randomly select index tuple 1 in table 302 (p11, p21, p31) for a first data packet being transmitted to the base station 100, and UE 102a may randomly select index tuple 2 (p12, p22, p32) for a second data packet being transmitted to the base station 100. In some embodiments, a UE may choose or be configured to use different tuples for different packets. In some embodiments, two UEs may choose the same tuple, e.g. if they randomly select MA signatures for the initial transmission, which may occur in mMTC applications.

In some embodiments, there may be a first MA signature used for an initial transmission of a packet, and a second MA signature used for all K retransmissions of that packet, where K is greater than or equal to one. For example, table 308 in FIG. 5 illustrates an example in which the MA signatures are reference signals. A pool {P} of eight reference signals are partitioned into two sets {P1} and {P2}. The reference signals may be pilots. Each row in table 308 represents a 2-tuple. The 2-tuples are not uniquely assigned to particular UEs, rather each UE of a group of UEs may randomly select which 2-tuple to use. {P1} is a pool of initial transmission reference signals and includes reference signals p11, p12, p13, and p14. {P2} is a pool of retransmission reference signals and includes reference signals p21, p22, p23, and p24. When a UE is to transmit a packet using a grant-free uplink transmission, the UE uses one of the four 2-tuples. The 2-tuple used indicates which reference signal is used for the initial transmission and which reference signal is used for any and all K retransmissions. For example, if UE 102a uses the 2-tuple indicated by index 2 for transmitting a packet, then the reference signal used for the initial transmission of the packet is p12, and the reference signal used for any and all retransmissions of the packet is p22.

In the embodiment described above in relation to FIG. 5, the MA signature used identifies whether the grant-free uplink transmission is an initial transmission of data or a retransmission of the data. However, if K>1, then the retransmission MA signature does not reveal whether it is a first retransmission, second retransmission, etc. since the same MA signature is used for all retransmissions of the data.

Redundancy Version Identification

In some embodiments, there may be a mapping between MA signatures and RVs that may allow the base station 100 to determine the RV of the grant-free uplink transmission, so that the RV does not have to be explicitly signalled.

As an example, it may be preconfigured that each grant-free uplink transmission can use only one of two RVs (e.g. RV 0 or RV 1). A first MA signature is mapped to a first RV, such that when the base station receives the first MA signature, the base station knows that the data of the grant-free uplink transmission has the first RV. A second MA signature is mapped to a second RV, such that when the base station receives the second MA signature, the base station knows that the data of the grant-free uplink transmission has the second RV.

As a more specific example: each grant-free uplink transmission can use only one of two RVs; when a UE is to transmit a packet using a grant-free uplink transmission, the UE uses one of the four 2-tuples of FIG. 5; the reference signal in the 2-tuple that is used for the initial transmission is mapped to the first RV, and the reference signal in the 2-tuple that is used for the retransmission(s) is mapped to the second RV. Then, when the base station 100 receives a grant-free uplink transmission, the base station 100 knows from the MA signature used whether the grant-free uplink transmission is an initial transmission or retransmission of the data, and what the RV is for the data in the grant-free uplink transmission.

In some embodiments, there may be first MA signature used for an initial transmission of data and a second MA signature used for all retransmissions of that data, e.g. as in FIG. 5, but there may be more than two possible RV values that may be used. In such embodiments, the MA signature may still be used to determine whether the grant-free uplink transmission is an initial transmission or a retransmission. The RV may then be identified based on this information, as well as based on a resource hopping pattern.

As an example, the receipt of a grant-free uplink transmission having a first MA signature reveals to the base station 100 that the grant-free uplink transmission is an initial transmission of data. The grant-free uplink resource used to send the grant-free uplink transmission reveals to the base station 100 that the UE that sent the grant-free uplink transmission is using a particular resource hopping pattern known in advance to the UE and base station. The resource hopping pattern specifies the resources used for the initial transmission and any retransmissions, and there is also a known mapping between the resource hopping pattern and the RV used for the initial transmission and each retransmission. Therefore, the base station can obtain from the mapping the RV of the initial grant-free uplink transmission and the RV of all future grant-free uplink retransmissions of that data.

As another example, the receipt of a grant-free uplink transmission having a second MA signature reveals to the base station 100 that the grant-free uplink transmission is a retransmission of data. The base station 100 has no record of a previous retransmission of the data, or even an initial transmission of the data. The base station 100 decides that activity detection of the initial transmission must have failed and assumes that the received transmission is a first retransmission of the data. The grant-free uplink resource used to send the first retransmission reveals to the base station 100 that the UE is using a particular resource hopping pattern known in advance to the UE and base station. The resource hopping pattern specifies the resources used for the initial transmission and any retransmissions, and there is also a known mapping between the resource hopping pattern and the RV used for the initial transmission and each retransmission. Therefore, the base station can obtain from the mapping the RV of the first retransmission and the RV of all future grant-free uplink retransmissions of that data.

As another example, the time slot used by the UE to send the grant-free uplink transmission may correspond to a respective RV based on a mapping known to both the UE and the base station. As a result, the duration of time during which the grant-free uplink transmission is received by the base station therefore reveals to the base station the RV used in the transmission. For example, it may be configured in advance that when sending a grant-free uplink transmission in an odd time slot, the UE uses RV 0, and when sending a grant-free uplink transmission in an even time slot, the UE uses RV 1.

FIG. 6 is a method performed by base station 100, according to one embodiment. In step 402, the base station receives a grant-free uplink transmission from UE 102a. The grant-free uplink transmission utilizes an MA signature. In step 404, the base station 100 determines the RV of data in the grant-free uplink transmission using the MA signature. In step 406, the base station 100 attempts to decode the data in the grant-free uplink transmission based on the RV.

Step 404 may include using the MA signature to determine whether the grant-free uplink transmission is an initial transmission of the data or a retransmission of the data, and then obtaining the RV based on both the grant-free uplink resource used by the UE and the determination of whether the grant-free uplink transmission is an initial transmission of the data or a retransmission of the data.

Signaling ACK/NACK

There are many different possibilities for signaling an ACK or a NACK (when used) to a UE that has sent a grant-free uplink transmission. Different options are described below. A combination of two or more of the options described below may be used. Also, some of the options described below assume that the base station has first uniquely identified the UE that sent the grant-free uplink transmission. Different ways in which the UE may be uniquely identified are described earlier, e.g. using the UE ID (which may be an index), or using the UE ID in combination with other information, such as the grant-free uplink resource used, or using the MA signature in combination with the grant-free uplink resource used, etc. Note that the ACK/NACK described herein may not always be explicitly indicated, but may include an ACK/NACK that is implicitly indicated by a scheduling grant. For example, sometimes the HARQ feedback is a scheduling grant that is scheduling a retransmission of the same transport block (TB) of the grant-free transmission, which may implicitly indicate that the previous grant-free transmission of the TB is not successful (i.e. a NACK). In another example, the base station may send HARQ feedback to the UE that contains a scheduling grant of a new TB using the same HARQ process number as the grant-free transmission, in which case, it may be considered that the grant includes an implicit ACK for the grant-free transmission of the TB sharing the same HARQ process.

One Option—Dedicated Downlink Acknowledgement Channel

In some embodiments, the base station 100 may transmit ACKs and/or NACKs for grant-free uplink transmissions on a dedicated downlink acknowledgement channel. In some embodiments, the dedicated downlink acknowledgement channel may be implemented in a similar way to the physical HARQ indicator channel (PHICH) in LTE, in which case the dedicated downlink acknowledgment channel may be called a "PHICH-like" channel.

In some embodiments, the feedback timing on the dedicated downlink acknowledgement channel has a fixed relationship with the grant-free resource access timing. For example, if a UE sends a grant-free uplink transmission in subframe (or TTI) w, then the ACK/NACK for that grant-free uplink transmission is sent on the dedicated downlink acknowledgement channel in subframe (or TTI) w+k. Ideally k is small, e.g. k=2. For example, if the UE is to automatically send retransmissions until an ACK is received, then having k be a small value will hopefully result in earlier termination of the automatic retransmissions. In some embodiments, the value of k is predefined and known to the UE and the base station. For example, the value of k may be configured in the system information. In some other embodiments, the value of k may be configured for each UE or UE group, and the configuration may be done through signalling, e.g. RRC signalling.

In some embodiments, the ACK/NACK feedback for a particular UE is sent on the dedicated downlink acknowledgement channel using a particular orthogonal sequence. As an example, the ACK/NACK feedback for a UE may be one bit that is repeated (to add redundancy) and then modulated using binary phase shift keying (BPSK) to result in a group of symbols. The group of symbols are then multiplied using a particular orthogonal sequence. The output of those belonging to the same resource groups or time-frequency locations are multiplexed together. A cell-specific scrambling may then be applied, followed by mapping to multiple resource elements. The UE requires knowledge of which orthogonal sequence was used in order to properly decode the ACK/NACK feedback. For example, the UE may perform a correlation of the orthogonal sequence with the received feedback signal to decode the ACK/NACK feedback. The orthogonal sequence is sometimes called an orthogonal code.

In some embodiments, there is a known mapping between (i) the MA signature and/or the grant-free resources used by a UE to send the grant-free uplink transmission, and (ii) the orthogonal sequence used by the base station to send the ACK/NACK feedback and/or the time-frequency location in the dedicated downlink acknowledgement channel at which the ACK/NACK feedback is sent. The mapping may be predetermined in advance and may be stored in the form of a look-up table in the memory of the UEs and base station.

In some embodiments, the combination of the particular MA signature used by the UE and the particular uplink grant-free resource region used by the UE is indexed by (m, n), where m identifies the particular MA signature used by the UE, and n identifies the particular uplink grant-free resource region used by the UE. The value (m, n) is mapped to a particular orthogonal sequence used for the ACK/NACK feedback and a particular time-frequency location of the ACK/NACK feedback in the dedicated downlink acknowledgement channel. In some embodiments, the particular time-frequency location of the ACK/NACK feedback in the dedicated downlink acknowledgement channel is called the "PHICH-like resource group".

As one example, table 420 in FIG. 7 illustrates an example mapping between (i) the MA signature (m) and the grant-free access region (n) used by the UE, and (ii) the orthogonal sequence used for the ACK/NACK feedback for that UE and the time-frequency location of that ACK/NACK feedback. In this example, there are four possible MA signatures that may be used by a UE for sending grant-free uplink transmissions, which are indexed using values m=1, . . . 4. There are also four possible time-frequency regions that may be used by the UE for sending the grant-free uplink transmission, which are indexed using values n=1, . . . 4. The combination of MA signature used by the UE (m) and grant-free region used by the UE (n) maps to a specific orthogonal code and time-frequency location in the dedicated downlink acknowledgement channel. For example, if UE 102a uses the MA signature identified by index value m=3 and UE 102a send its grant-free uplink transmission using the region of grant-free resources identified by index value n=1, then the UE knows from table 420 that the orthogonal sequence used for its ACK/NACK feedback in the dedicated downlink acknowledgement channel is orthogonal sequence C, and the time-frequency location of its ACK/NACK feedback in the dedicated downlink acknowledgement channel is time-frequency location i.

The orthogonal sequence and the time-frequency location in the dedicated downlink acknowledgement channel may also be identified by an index. For example, in table 420, each (m, n) maps to a particular (x, y) where x identifies the orthogonal sequence and x is A, B, C, or D, and where y identifies the time-frequency location and y is i, ii, iii, or iv. x may be referred to as the orthogonal sequence index, and y may be referred to as the resource group index (or PHICH-like resource group index). The index (x, y) is used by the UE to derive the orthogonal sequence to use to decode the feedback and the time-frequency location of the feedback.

Therefore, in operation, the UE may perform the following operations to receive and decode its ACK/NACK feedback for a particular grant-free uplink transmission sent by the UE. The UE first determines which subframe or TTI the downlink acknowledgment channel carrying its feedback is located based on the subframe or TTI used by the UE to send the grant-free uplink transmission (i.e. the w+k mentioned earlier). The UE then maps the combination of its MA signature used (m) and grant-free region used (n) to index (x, y), e.g. as in table 420 of FIG. 7. Index (x, y) informs the UE of which orthogonal sequence to use to decode the feedback and the time-frequency location of the feedback in the dedicated downlink acknowledgement channel.

Table 420 in FIG. 7 is just an example. In some embodiments, a combination of m and n are needed to uniquely determine the orthogonal sequence used for the ACK/NACK feedback and the time-frequency location of the ACK/NACK feedback. In other embodiments, as in table 420 in FIG. 7, the value m uniquely maps to the orthogonal sequence used for the ACK/NACK feedback and the value n uniquely maps to the time-frequency location of the ACK/NACK feedback, or vice versa. In some embodiments, there may only be one possible grant-free region that may be used by the UEs in a particular TTI, subframe or frame, in which case n always equals 1, and the MA signature index m may be uniquely mapped to a combination of orthogonal sequence and the time-frequency location in the dedicated downlink acknowledgement channel.

In some embodiments, the MA signature index m is a reference signal index. In other embodiments, the MA signature index m maps to a combination of reference signal index and MA codebook/signature/spreading sequence used. In some embodiments, the grant-free access region index n may be represented by the first or last physical resource block (PRB) index.

In some embodiments, the reference signal index may be mapped to the orthogonal sequence index, and the combination of grant-free region index and MA codebook/signature/spreading sequence index may be mapped to the resource group index or the time-frequency location of the dedicated DL acknowledge channel.

In some embodiments, if the UE identity can be determined by the activity detection (e.g. the MA signature uniquely identifies the UE on the grant-free uplink resources), then a UE index m may be used in place of the MA signature index m. The UE index m may be an identifier uniquely associated with a UE for the grant-free access region. For example, if only 25 UEs can access the particular grant-free uplink resources, then each one of the 25 UEs may be assigned a respective UE index between "1" and "25". The UE index is known to both the UE and the base station. The UE index may be predefined or semi-statically configured. The UE index may be assigned as part of the radio resource control (RRC) signaling. If the UEs can only access one grant-free uplink region in the particular frame, subframe, or TTI, then each UE index may be mapped to a unique index value (x, y). If the UEs can access multiple grant-free regions in the particular frame, subframe, or TTI, then the UE index along with the grant-free region index together may be mapped to a unique index value (x, y).

In some embodiments, the feedback sent on the dedicated downlink acknowledgement channel for a grant-free uplink transmission may be two bits (e.g. using QPSK). One of the bits may be used to indicate whether activity detection was successful, and the other one of the bits may be used to indicate whether decoding of the data was successful. In some embodiments, the two bits may be sent on different resources in the downlink acknowledgment channel and/or using different orthogonal sequences. For example, a grant-free uplink transmission having a particular (m, n) may be mapped to two index values (x, y), where each one of the two index values (x, y) corresponds to a respective resource location/orthogonal sequence conveying one of the two feedback bits.

Possible benefits of embodiments that use the dedicated downlink acknowledgement channel (e.g. a PHICH-like channel) are as follows. Only one bit of feedback is sent before coding ('1'=ACK, '0', NACK or vice versa), which means possible savings in overhead. Also, there is no need to completely identify the UE, e.g. there is no need to identify the UE (Radio Network Temporary Identifier) RNTI, to send an ACK/NACK. Instead, the base station just needs to perform successful activity detection to obtain the MA signature (index m). The base station would know the uplink resources used (index n) for the grant-free uplink transmission based on the time-frequency location on which the uplink transmission was received. Possible disadvantages of embodiments that use the dedicated downlink acknowledgement channel (e.g. a PHICH-like channel) are as follows. It may be harder to add additional information on top of the 1-bit ACK/NACK feedback, the method may only work well for synchronous feedback, and reliability may be reduced due to not using a CRC.

Figure 8:
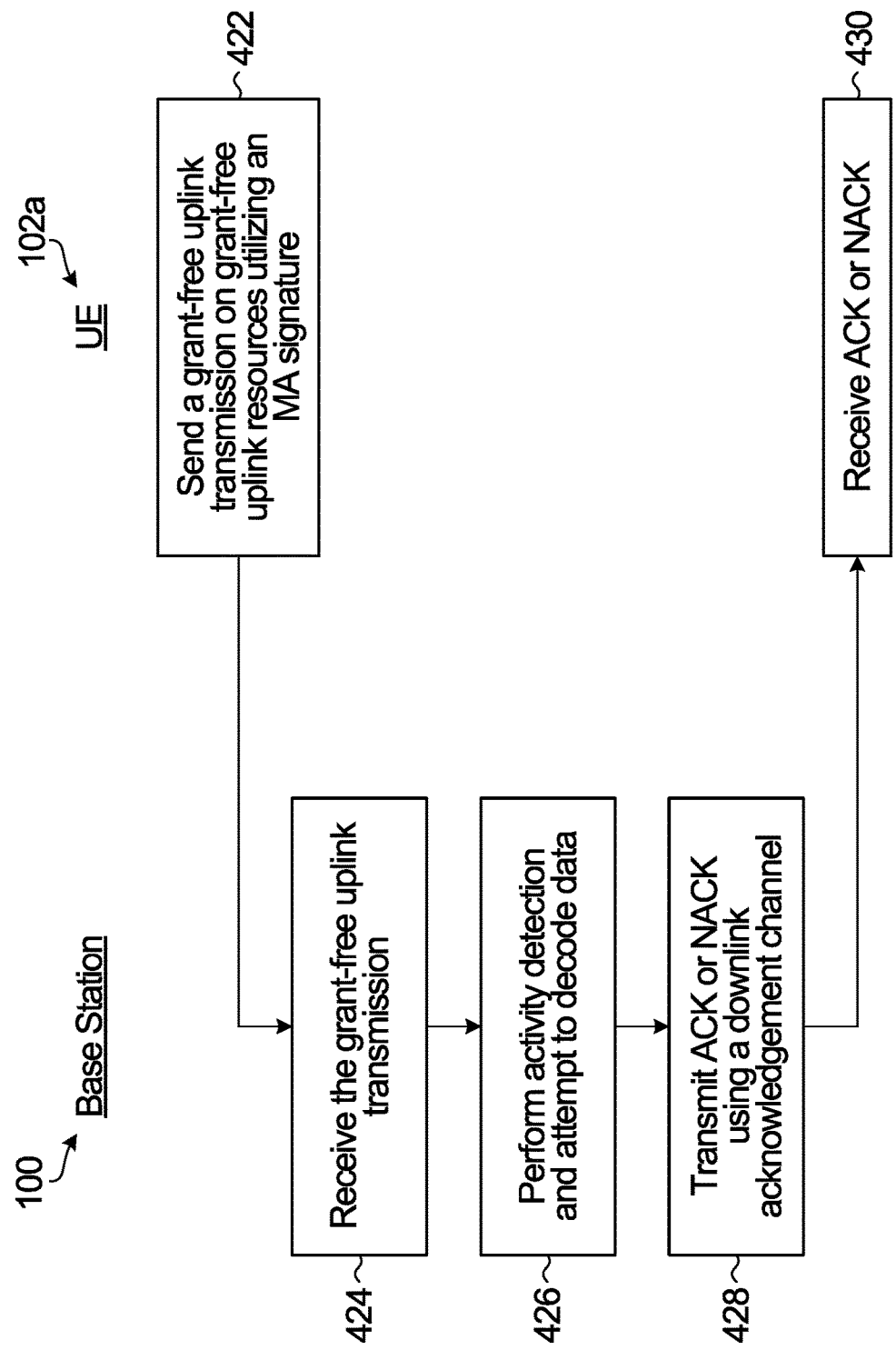
FIG. 8 is a method performed by a UE and base station, according to one embodiment.

FIG. 8 is a method performed by base station 100 and UE 102a, according to one embodiment. In step 422, the UE 102a transmits a grant-free uplink transmission to the base station 100 on grant-free uplink resources. The grant-free uplink transmission utilizes an MA signature. In step 424, the base station 100 receives the grant-free uplink transmission. In step 426, the base station performs activity detection to obtain the MA signature, and then attempts to decode data in the grant-free uplink transmission. In step 428, the base station 100 transmits, in a downlink acknowledgement channel, feedback relating to the grant-free uplink transmission comprising an ACK or a NACK. An orthogonal sequence used to convey the feedback and/or a time-frequency location of the feedback is based on at least one of the MA signature and the grant-free uplink resources. In step 430 the ACK or NACK is received by UE 102a on the downlink acknowledgement channel.

Another Option—Individual ACK/NACK Feedback

In some embodiments, the base station 100 may transmit ACKs and/or NACKs for grant-free uplink transmissions for each individual UE. In some embodiments, the ACK/NACK feedback for an individual UE may be transmitted through downlink control information (DCI). Multiple DCIs would be transmitted separately when ACK/NACK feedback is being transmitted to multiple UEs, i.e. each UE would have its own individual DCI.

For example, the ACK or NACK for a particular UE may be included in DCI for that UE that has a CRC field which is masked with the UE ID. The UE ID may be the RNTI for the UE (e.g. the cell RNTI (C_RNTI)), although this is not a necessity. If the UE ID is the RNTI for the UE, then the RNTI may be signalled through the RRC channel. The DCI may be transmitted at a location within the search space defined by the UE ID (e.g. defined by the C_RNTI). When monitoring the potential DCI command, the UE may attempt to decode all the possible locations of DCIs within its search space. If the CRC checks with the assigned UE ID, then the control channel is declared as valid and the UE processes the information inside the DCI.

In some embodiments, the RNTI used for retransmission of a grant-free transmission and the RNTI used for grant-based transmission or retransmission of a grant-based transmission are different. We may call the RNTI used for grant-free transmission as grant-free RNTI (GF-RNTI) or grant-free C-RNTI (GF C-RNTI), and the RNTI used for grant-based transmission as grant-based C-RNTI (GB C-RNTI). For example, GB C-RNTI can be used for at least masking the CRC of a PDCCH used for a scheduling grant for grant-based transmission. The GF C-RNTI may be configured in UE specific RRC signaling. The GB C-RNTI may be configured in UE specific RRC signaling or other UE specific signaling.

The search space location in the control channel (DCI) may be defined for UEs operating in grant-free mode. In some embodiments, the search space location may be indicated by the index of potential CCEs (control channel elements) in each subframe/TTI. The index may have a predefined relationship derived from the grant free UE ID (such as the C_RNTI) or the grant free group ID (such as a group_RNTI) assigned to the UE. The grant-free UE ID used to define the search space for the PDCCH can be the GF C-RNTI or the GB C-RNTI. This method is similar to the definition of PDCCH search space in LTE.

Another way to determine the search space is to explicitly signal the search space locations of DCI. The format provided may be a time-frequency region, within which the grant free UE should search for all CCEs. This explicit signaling may be carried out in RRC signaling. This is similar to ePDCCH search space defined in LTE, e.g., defined in ePDCCH_Config in RRC signaling. In one embodiment, if an ACK/NACK is to be sent to UE 102a, then the ACK/NACK is included in the DCI for UE 102a. The encoder 210 in the base station 100 masks at least a portion of the DCI with the UE ID of UE 102a. The masking may involve modifying at least some of the information in the DCI using the UE ID of UE 102a. As an example, the CRC of the DCI may be masked by scrambling the CRC with the UE ID of UE 102a. The location in the downlink control channel at which the UE 102a is to search for its DCI may be known by UE 102a based on the UE ID of 102a and/or based on the grant-free uplink resources used by UE 102a to send the grant-free uplink transmission. The UE 102a searches the appropriate area of the downlink control channel for its DCI. Assuming the UE 102a does not know the exact time-frequency partition carrying its control information, then the decoder 218 of UE 102a blindly decodes the control information in its search area and tries to unscramble the CRC using the ID of UE 102a. An incorrect CRC is interpreted by the UE 102a as an indication that that particular control information in the downlink control channel is not meant for UE 102a. A correct CRC indicates to UE 102a that its DCI has been correctly decoded. The UE 102a can then retrieve the ACK or NACK from the decoded DCI. The UE ID can be in the payload of the DCI. The UE ID can be a RNTI or a higher layer ID, the higher layer ID does not need to be tied to a specific cell and known by the base station and the UE.

The DCI decoded by UE 102a may have different formats and may include different information. As one example, the DCI may include a grant for a retransmission, indicating to the UE 102a that the base station did not successfully decode the initial grant-free uplink transmission. In such instances, a NACK may not be explicitly included in the DCI since a NACK is implicit by virtue of the fact that the DCI includes a grant for a retransmission. The grant may switch the grant-free transmission to a grant-based retransmission.

In some embodiments, the DCI has a relatively simple format, e.g. does not include information for a grant. As an example, the DCI could be as simple a one bit: '0' for ACK and '1' for NACK, or vice versa. In some embodiments, the DCI may include the identity of the UE if an ACK is being sent to the UE, and/or the DCI may contain the UE ID or (if the UE ID is not known to the base station) the MA signature index corresponding to the MA signature in the uplink transmission if a NACK is being sent to the UE. In some embodiments, a particular UE may have several grant-free uplink transmissions, in which case there may be multiple HARQ processes.

In some embodiments, the DCI or the individual feedback channel that carries the ACK/NACK may also or instead include the HARQ process ID (or HARQ process number) for the packet being ACK'd/NACK'd. The ACK/NACK may contain a HARQ process number (or HARQ process ID, or any attributes that identify the HARQ process number or transport block (TB) index, e.g., MA signature index or grant-free access region index or combination of the two) explicitly or implicitly, which is used to identify which TB the ACK/NACK is used for if there are multiple TBs transmitted. The HARQ process ID may be implicitly or explicitly signalled to the base station in the grant-free uplink transmission. An example of implicit signaling is if the HARQ process ID is identifiable to the base station based on the MA signature used by the UE. The MA signature can be a reference signal or a codebook/signature/sequence or used for a multiple access (MA) scheme or any other attributes described earlier. For example, if a MA scheme uses two different codebooks to transmit two TBs (corresponding to two HARQ processes). The base station identifies the codebook through activity detection. Then the base station may indicate the codebook index or the corresponding HARQ process index in the ACK/NACK, which identifies the TB that the ACK/NACK is for. In some embodiments, the HARQ process ID may be able to be implicitly identified through different grant-free access regions. For example, if a UE is configured to be able to access two grant-free access regions in one time slot. The UE may transmit two TBs that correspond to two different HARQ processes. In the ACK/NACK feedback, the grant access region index or HARQ process ID may be indicated implicitly or explicitly such that the UE can identify which TB the ACK/NACK feedback is for. An example of explicit signaling is to have a field in the grant-free uplink message that indicates the HARQ process ID. The HARQ ID may be protected more robustly such that the base station can identify it even if it may not be able to successfully decode the data.

In some embodiments, the individual DCI may be transmitted together with other information for the UE, e.g. additional data to be transmitted to the UE and/or a grant to send a retransmission of a current transport block (TB) or new transmission of a new TB.

In general, the DCI used for HARQ feedback (ACK/NACK or grant) with respect to a grant-free transmission may be associated with the GF C-RNTI or GB C-RNTI. In some embodiments, the UE ID used for the DCI used for the grant of a retransmission of a grant-free initial transmission is the GF C-RNTI. In some other embodiments, the UE ID used for the DCI used for the grant of a retransmission of a grant-free initial transmission is the GB C-RNTI. The GF C-RNTI is used at least to mask the CRC of the DCI used for the retransmission of the grant-free initial transmission. Whether the DCI is used for the retransmission may be identified by a new data indicator (NDI) field in the DCI. NDI may be a 1 bit field, which can be either 0 or 1. If the UE detects a DCI grant with a CRC masked by GB C-RNTI, the UE may consider the grant a retransmission grant if NDI is not toggled with respect to the last grant of the same HARQ process. On the other hand, if there is a DCI grant with a CRC masked by GB C-RNTI, and the NDI is toggled with respect to the last grant of the same HARQ process, the UE may consider the grant a scheduling grant of a new TB. In grant-free transmission, there is no scheduling grant for the initial grant-free transmission. Whether the DCI grant is for retransmission is determined by the fixed value of NDI field in the grant. For example, if after grant-free initial transmission, the UE detects a DCI with CRC masked by GF C-RNTI and the NDI field in the DCI equals to 1, UE may consider the DCI a retransmission grant of the initial grant-free transmission. Which TB the retransmission is for can be identified by the UE using the HARQ process ID included in the DCI. Note that there may be a configured or predefined mapping between grant-free resources and the HARQ process ID, so that the UE knows which TB the HARQ ID corresponds to. On the other hand, if the UE detects a DCI with CRC masked by GF C-RNTI and the NDI field in the DCI equals to 0, the UE may consider the DCI an ACK of the grant-free transmission. Which TB of the grant-free transmission the ACK corresponds to may be identified by the HARQ process ID or number included in the DCI. Note that in some embodiments, there is no explicit bit of ACK/NACK in the DCI. The UE can consider the DCI an ACK of the TB associated with the HARQ process ID in the DCI if the DCI is associated with the GF C-RNTI and NDI=0. In some embodiments, if UE detects a DCI with CRC masked by GF C-RNTI, the UE may consider it as a retransmission grant of the corresponding HARQ process regardless of the value of NDI, i.e., NDI here is not used to determine whether the grant is a retransmission grant. In some embodiments, the DCI used for indicating an ACK of a grant-free TB may mask the CRC with the GB C-RNTI. If the UE detects a DCI associated with the GB C-RNTI and the previous transmission of the TB with the same HARQ process (identified by the HARQ process ID in the DCI) is a grant-free transmission, the UE may consider the DCI an ACK of the grant-free TB associated with the HARQ process ID regardless of the NDI value. In some other embodiments, the UE only considers the DCI associated with GB C-RNTI an ACK of the grant-free transmission if NDI=0. If the DCI associated with GB C-RNTI is used to indicate an ACK, the UE may also consider it as including a scheduling grant of a new TB with the included HARQ process ID. If the UE has data to transmit, the UE may transmit a new TB using the resource configured in the DCI associated with GB C-RNTI. In some embodiments, if the DCI associated with GF C-RNTI is used to indicate an ACK, the UE may not consider it as a scheduling grant of a new TB and may not transmit a new TB based on the grant. In some other embodiments, if the DCI associated with GF C-RNTI is used to indicate an ACK, the UE may also consider it as including a scheduling grant of a new TB with the included HARQ process ID. If the UE has data to transmit, the UE may transmit a new TB using the resource configured in the DCI associated with GF C-RNTI.

Sending individual DCI typically requires the base station to uniquely determine the identity of the UE. In some embodiments, the base station may obtain the UE ID through decoding the data in the grant-free uplink transmission. In embodiments in which, for a given region of grant-free uplink resources, the MA signature uniquely identifies the UE, then detection of the MA signature by the base station allows the base station to uniquely identify the UE. The base station can then obtain the UE ID for the UE, e.g. using a mapping between the MA signature and the UE ID.

In some embodiments, the DCI may be used for termination of a continuous repetition/retransmission. In some embodiments, the DCI format may be similar to a current DCI format, such as DCI format 0 in LTE for uplink scheduling. The HARQ-ACK message may be implicitly implied. For example, the DCI format that conveys a HARQ-ACK for termination of a continuous repetition/retransmission may be similar to the DCI format used for LTE semi-persistent scheduling (SPS) release PDCCH validation. In some embodiments, the DCI may be a new format that is used for ACK/NACK without a full grant.

In some embodiments, the DCI may contain a scheduling grant for a retransmission that switches the grant-free transmission to a grant-based retransmission. In some embodiments, the DCI may contain a scheduling grant for a new transmission of the UE that switches the new packet of the grant-free UE to a grant-based transmission. The explicit grant may implicitly imply an NACK feedback.

In some embodiments, the DCI may contain a scheduling grant for a transmission of a new TB, in which case, it may implicitly imply an ACK of a previous TB.

In some embodiments, the feedback channel may be transmitted through a control channel or data channel (and may not be in the format of DCI). The time-frequency location of the feedback channel may have a fixed relationship with the time slot or subframe number or with the grant-free transmission resource or with the combination of grant-free transmission resource and MA signature used. The content inside the feedback channel may be the UE ID being acknowledged or any content described earlier for the individual DCI.

In some embodiments, the location of the ACK/NACK for a UE in the individual DCI may have a fixed timing relationship with the grant-free uplink resources used to send the grant-free uplink transmission being ACK'd/NACK'd. For example, if a UE sends a grant-free uplink transmissions in subframe (or TTI) w, then the ACK/NACK for that grant-free uplink transmission is sent in the DCI of subframe (or TTI) w+k. However, in some embodiments, the ACK/NACK may not necessarily have a fixed timing relationship with the grant-free resources. In embodiments in which the HARQ process ID or any similar indication is included in the individual DCI for a UE, then the UE may be able to identify which transport block (or packet) is acknowledged by using the HARQ process ID instead of the timing of the DCI. In some embodiments, the ACK/NACK sent on the individual DCI may be used for termination of a continuous repetition. In this case, supporting individual DCI transmitted at an arbitrary timing may be beneficial.

Finally, as mentioned earlier in some embodiments, the individual ACK/NACK for a UE does not have to be sent in DCI. Instead, for example, an ACK/NACK for a UE may be sent in a data channel, e.g. a PDSCH. The location of the ACK/NACK in the data channel may be sent in the DCI. The DCI indicating the location of the ACK/NACK may still be scrambled by the UE ID in some embodiments. The HARQ feedback may be a UE specific DCI with CRC masked by the GF C-RNTI. The DCI may contain a scheduling grant that schedules a PDSCH transmission. The actual ACK/NACK or HARQ feedback content may be transmitted in that data channel (PDSCH).

In some embodiments, the individual ACK/NACK may be sent in a feedback channel at a time-frequency location that has a fixed mapping relationship with the combination of or one of the grant-free region index and MA signature index. In this scenario, the UE knows where to search for the feedback. The content of the feedback can be similar to the case of sending ACK/NACK in the DCI, but it may not be in a format of DCI. It may contain a CRC, but the CRC may or may not be masked by the UE ID.

In some embodiments, the individual ACK/NACK channel may contain at least one or some of, but not limited to:
  a. The MA signature index that is identified through activity detection or a combination of the MA signature index and the grant-free access region index.
  b. A UE ID if the UE is identified.
  c. A HARQ process number that identifies which TB the feedback corresponds to. Sometimes an attributes that identifies the HARQ process number (e.g. a MA signature index, a codebook index which identifies the HARQ process number) is included instead. Sometimes, the HARQ process number may not be explicitly included but can be derived from other attributes. The timing advanced (TA) signal or timing information used to adjust uplink timing for uplink synchronization if TA is estimated in the initial grant-free transmission (e.g. using a preamble or a RS for TA estimation).
  d. A temporary identity, e.g., a TC-RNTI similar to the one assigned in a LTE RAR message, used for further communications between the UE and the network.
  e. A scheduling grant, indicating the resource, including time-frequency resource, MCS, reference signal, MA signature, etc. that the UE will use for the following transmissions or retransmissions.
  f. Resource hopping pattern and/or RV hopping pattern, and/or MA signature hopping pattern for the following transmissions/retransmissions.
  g. An explicit or implicit signal to indicate whether it is ACK or NACK and optionally a signal to indicate whether the activity detection successfully detects the MA signature.

Figure 9:
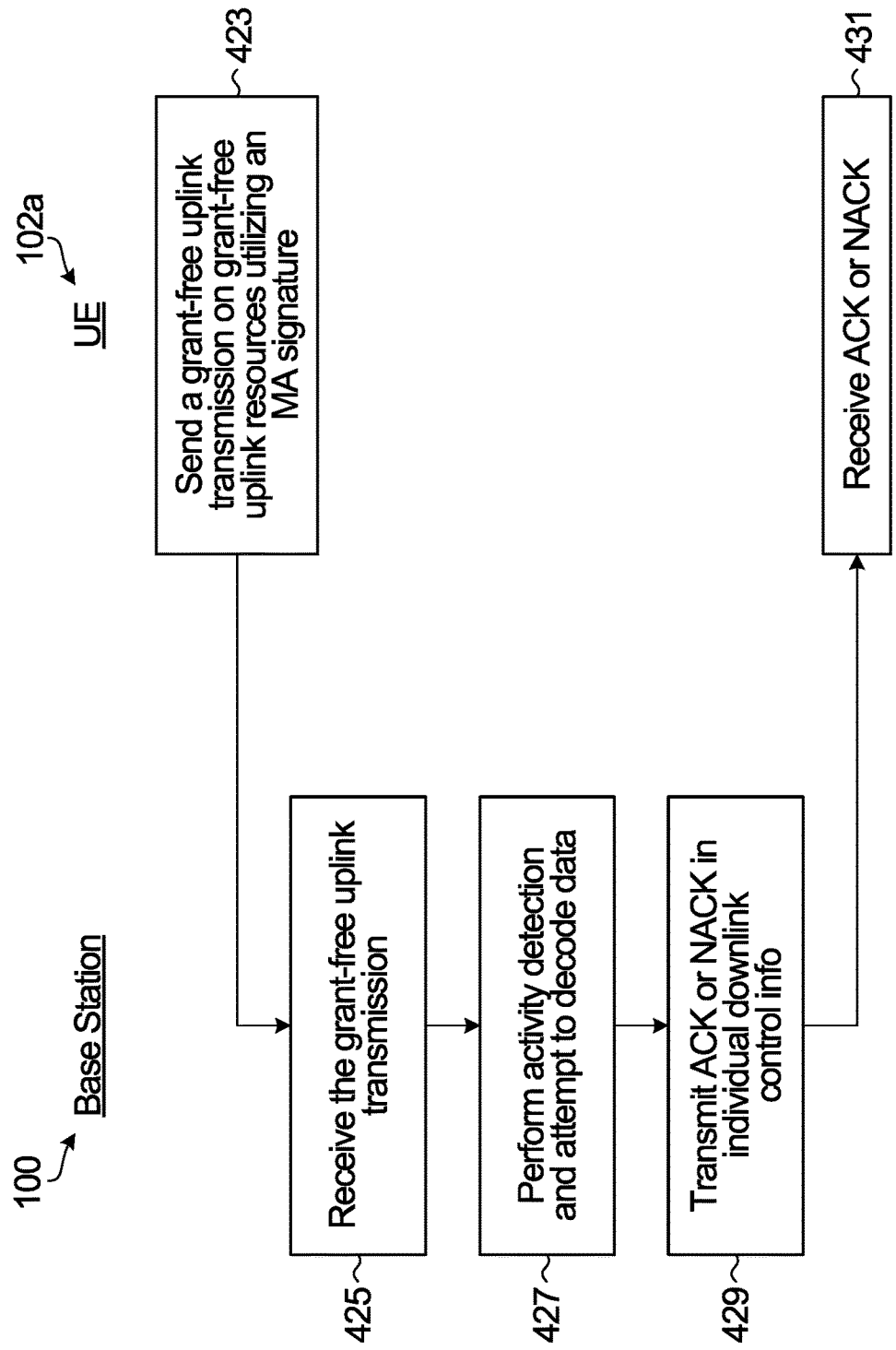
FIG. 9 is a method performed by a UE and base station, according to another embodiment.

FIG. 9 illustrates a method performed by base station 100 and UE 102*a*, according to another embodiment. In step 423, the UE 102*a* transmits a grant-free uplink transmission to the base station 100 on grant-free uplink resources. The grant-free uplink transmission utilizes an MA signature. In step 425, the base station 100 receives the grant-free uplink transmission. In step 427, the base station performs activity detection to obtain the MA signature, and then attempts to decode data in the grant-free uplink transmission. If the data is decoded, then the base station 100 can obtain the UE ID (e.g. RNTI) of the UE 102a. In step 429, the base station 100 transmits, in individual downlink control information, feedback relating to the grant-free uplink transmission comprising an ACK or a NACK. If an ACK is sent, the base station 100 masks the feedback using the UE ID, e.g. by scrambling the CRC of the feedback with the UE ID. If a NACK is sent, the base station 100 only masks the feedback using the UE ID if the UE ID is known by the base station, e.g. if the MA signature uniquely identifies UE 102a on the grant-free uplink resources. In step 431, the ACK or NACK is received by UE 102a, e.g. if the CRC is scrambled with the ID of UE 102a, then the UE 102a receives the ACK or NACK by unscrambling the CRC using the ID of UE 102a.

Another Option—ACK/NACK in the Data Channel

In some embodiments, ACKs/NACKs are transmitted by the base station in a downlink data channel, e.g. in a physical downlink shared channel (PDSCH). A UE that sent a grant-free uplink transmission searches for DCI that indicates where in the data channel the ACK/NACK can be found. The DCI may be individual DCI, as above, in which case the DCI may be masked using the UE ID (e.g. GF C-RNTI). Alternatively, the base station 100 may transmit ACKs/NACKs for multiple UEs in the same resource partition of the downlink data channel. Every UE that sent a grant-free uplink transmission that is to be ACK/NACK'd searches for the same DCI, which indicates the location of the resource partition having the ACKs/NACKs. The DCI may contain a scheduling grant that schedules a downlink transmission in a data channel (e.g. a PDSCH). The actual ACK/NACK or HARQ feedback content may be transmitted in that data channel (PDSCH). The same DCI means it can be a group-common DCI as described later in the disclosure. The DCI may be masked using a common ID value, e.g. a common RNTI, such as "GF_Common_RNTI". The common ID value is known to each UE sending a grant-free uplink transmission and is used to decode the DCI. The common ID value may be predefined or indicated using RRC signaling. The common ID can be the same group RNTI (e.g. "GF_group_RNTI") as described later in the group ACK/NACK of this disclosure.

The search space for the DCI in the downlink control channel may be based on the grant-free uplink resources used.

As one example, ten UEs are configured to be able to send any grant-free uplink transmission they may have on a first set of grant-free uplink resources. The ten UEs are informed of the GF_Common_RNTI for the first set of grant-free uplink resources. The ten UEs know to search a particular area of the downlink control channel based on the location of the first set of grant-free uplink resources. The ten UEs each use the GF_Common_RNTI to decode the DCI. The DCI indicates where in the downlink data channel the ACKs/NACKs for the ten UEs are located.

When ACKs/NACKs for multiple UEs are located in a common resource partition in the downlink data channel, e.g. as in the example in the paragraph above, then each ACK/NACK is associated with information identifying the UE to which the ACK/NACK belongs. The information may be the UE ID, or an index identifying the MA signature transmitted in the grant-free uplink transmission. In some embodiments, there may also be additional information associated with an ACK/NACK. For example, a NACK for a particular UE may have a grant associated with it that schedules a grant for a retransmission. Or the NACK may indicate that to the UE that any retransmission is to be performed using a grant-free uplink transmission, possibly using a particular resource hopping pattern and/or RV hopping pattern, and/or MA signature hopping pattern.

Another Option—Group ACK/NACK

In some embodiments, a single ACK/NACK payload may acknowledge more than one UE. Such an ACK/NACK will be referred to as a "group ACK/NACK".

The UEs are divided into the different groups by the base station. The grouping may be based on which UEs are most likely to access the same grant-free time-frequency uplink resources. In some embodiments, there may only be one group, e.g. when there are only a small number of UEs that can send grant-free uplink transmissions. The groups may be updated over time. Each group has a respective group ID, e.g. "GF_group_RNTI", which distinguishes the group from other groups. In embodiments in which there is only one group, the group ID may be predefined, or may not be necessary. In some embodiments, the group ID "GF_group_RNTI" may not be explicitly signalled to the UE. The GF_group_RNTI may be predefined as a function of at least one of the subframe or time slot number and frame number and known to both the UE and the base station. In some embodiments, each grant-free access region may have its own respective group ID, which may be known in advance. Grant-free access region can refer to time-frequency resources that the UE can access to perform grant-free transmission. Different grant-free resource regions can refer to different time-frequency locations. Different frequency locations can refer to different frequency partitions, different bands or sub-bands, different carriers or sub-carriers, different bandwidth parts (BWP), different resource blocks (RBs) or resource block groups (RBGs) or in general any different frequency unit or different frequency regions assigned to the UE. Each UE in each group is assigned a position index, e.g. "GF_ack_index". The position index identifies the UE from other UEs in the group. For example, if there are four UEs in a group, then one UE may be assigned position index '1', another UE is assigned position index '2', another UE is assigned position index '3', and the remaining UE is assigned position index '4'. In some embodiments, the UE position index may be semi-statically configured, e.g. in RRC signaling.

In some embodiments, higher layer signalling (such as RRC signalling) is used to assign UEs to groups, signal the group ID for each group, and assign a position index to each UE in each group. In some embodiments, the RRC signaling may also indicate to each UE how many other UEs are in the same group.

In some embodiments, the UE position index may be replaced by a combination of grant-free access region index (sometimes the index is only for the index within a time slot or a subframe) and MA signature index, in which case the index of the UE may not need to be signalled to the UE in advance since the UE will know its index based on the MA signature it uses and the grant-free resources it uses to send the grant-free uplink transmission. In some embodiments, the grant-free access region index can be an index of different frequency partitions, different bands or sub-bands, different carriers or sub-carriers, different bandwidth parts (BWP), different resource blocks (RBs) or resource block groups (RBGs) or in general index of different frequency unit or different frequency regions assigned to the UE.

Once the groups are configured, a group ACK/NACK is used for each group to acknowledge and/or negative acknowledge grant-free uplink transmissions for UEs in that group. In some embodiments, the group ACK/NACK may ACK all received packets that are successfully decoded in one TTI or one time slot or one subframe.

In some embodiments, the group ACK/NACK is sent in a downlink control channel that is common to multiple UEs or addressed to a group of UEs. In such embodiments, the group ACK/NACK may be said to be sent via group-common DCI.

In some embodiments, the group-common DCI is sent at one of the search spaces defined by the group ID ("GF_group_RNTI"). The definition of search space is similar to the individual DCI. In some embodiments, the search space of the group-common DCI may be among common search spaces of the downlink control channel. In some scenarios, the search space may be fixed for a group-common DCI such that no blind detection is necessary. When monitoring the potential DCI command, the UE may attempt to decode all the possible locations of DCIs within its search space. If the CRC checks with the assigned or derived group RNTI (GF_group_RNTI), the control channel is declared as valid and the UE processes the information inside the group-common DCI to obtain the group ACK/NACK.

In some embodiments, the location of the group ACK/NACK is based on the location of the time-frequency resources used to send the grant-free uplink transmissions. There may be multiple group ACK/NACKs for each time slot (time slot can mean a time slot, a subframe, a TTi or a general time unit) with each group defined for each grant-free resource. For example, each time slot may contains 5 grant-free access regions at different frequency locations, then all UEs that access the same grant-free access region may form a group. In this case, the group ID (GF_group_RNTI) and UE position index may not need to be pre-configured or signalled in advance. Each group may have a predefined group ID (e.g. GF_group_RNTI) that is a function of the grant-free access region resources as well as the time slot index and frame number and known to both the UE and base station. In other words, the group ID (GF_group_RNTI) may be derived as a function of the time unit as well as frequency locations of the grant-free transmission resources used for the grant-free transmission. In an example, there may be 5 grant-free groups with 5 different GF_group_RNTIs corresponding to the 5 different grant-free access regions inside the time slot. In this case, the gNB may send 5 separate group ACK/NACK through group DCI that is configured by its corresponding group ID (GF_group_RNTI). The group DCI may be sent at a search space defined by the corresponding group RNTI and the CRC for the group DCI may be masked by the same group ID (GF_group_RNTI). If a group of UEs send grant-free uplink transmissions at time-frequency location A, then search space B in the DCI is searched using the group ID associated with the grant-free access regions (resources) to obtain the group ACK/NACK for those grant-free uplink transmissions. In some embodiments, search space B of the DCI may be a common search space for sending group-common DCI, which may or may not depend on the group ID. Each UE that sent a grant-free uplink transmission in the group of UEs blindly decodes the control information in search area B and tries to unscramble the CRC using the group ID associated with the grant-free resources. An incorrect CRC is interpreted by the UE as an indication that that particular control information in the downlink control channel is not the group ACK/NACK. A correct CRC indicates to UE that its DCI has been correctly decoded. The UE 102a can then retrieve the group ACK/NACK from the decoded DCI. In some embodiments, blind detection may not be needed, e.g. instead of search area B, the time-frequency resources used to send the grant-free uplink transmissions map to a specific known time-frequency location in the DCI to decode the group ACK/NACK. In some embodiments, the group ID is not used to scramble the CRC of the DCI.

As more specific example of the group ID (group RNTI) as a function of the time unit and/or frequency locations of the grant-free transmission resources will now be explained. The group ID may be a function of a time resource index and frequency resource index, e.g.

GF_group_RNTI=f(t_index, f_index)

As a more specific example

GF_group_RNTI=A*t_index+B*f_index+C; where A, B, C are constants and * represents multiplication.

The frequency resource index/information f_index information may include at least one of an index of different frequency partitions (e.g. frequency partition index), different bands or sub-bands (e.g. band index or sub-band index), different carriers or sub-carriers (e.g. carrier index or sub-carrier index), different bandwidth parts (BWP) (e.g. BWP index), different resource blocks (RBs) or resource block groups (RBGs) (e.g. RB index or RBG index) or in general index of different frequency units or different frequency regions (e.g. frequency unit index or frequency region index).

The time resource index/information (t_index) may include at least one of a system frame index, a sub-frame index, a slot index, a mini-slot index, a symbol index. The grant-free resource information that is used to calculate the group ID can be configured for the UE via broadcast signaling, RRC signaling, DCI signaling or any combination of the above through grant-free resource configuration. In the example above, there are 5 grant-free groups with 5 different GF_group_RNTIs corresponding to the 5 different grant-free access regions inside the time slot. The 5 grant-free access regions can be 5 different frequency partitions, the frequency partition can be 5 sub-bands with each containing a sub-band index or simply frequency partition index known to the UE by the grant-free resource partition. Each UE and base station may derive the same group RNTI as a function of the time index (e.g. the slot index) and the frequency location index (e.g. the subband or frequency partition index). UEs that are accessing the same frequency partition (or the same grant-free access region) then share the same group RNTI or group ID. The derived group ID is then used to mask the CRC of the group ACK/NACK, which may be transmitted in group-common DCI. If the base station sends a group-common DCI for each group, then there can be five different group-common DCI for the same slot. In some embodiments, the frequency location index can be a RB index. However, if multiple RBs are used/defined for the grant-free transmission, the frequency index used to calculate the group ID may be the starting or ending RB index.

In some embodiments, if a separate group ID and group ACK/NACK are used for different grant-free access regions in a time slot, then the UE position index used in the group ACK/NACK may have a predefined mapping relationship with the MA signature index.

In some embodiments, all of the UEs accessing the grant-free resource regions in one time slot are sent feedback using one group ACK/NACK feedback. A group ID GF_group_RNTI is defined for the group ACK/NACK feedback. The GF_group_RNTI may be defined similarly as RA-RNTI defined for random access in LTE. In some embodiments, the group ID (GF_group_RNTI) and the UE position index associated with the group can be signalled to UE in advance (e.g. in RRC like described earlier). In some other embodiments, the group ID (GF_group_RNTI) may be predefined and known by all the grant-free UEs and the base station 100. The GF_group_RNTI may be a function of time slot number and frame number, but still known by both the grant free UEs and the base station 100. In this scenario, the group ACK/NACK may be sent in one group-common DCI configured by this GF_group_RNTI. The DCI may be sent in a search space defined by the GF_group_RNTI and with a CRC masked by the GF_group_RNTI. Since the group ACK/NACK may contain ACK/NACK feedback for UEs accessing multiple grant-free access regions for the time slot, the UE position index, if not configured in advance, may have a predefined mapping with the combination of the grant-free access region index and MA signature index. The grant-free access region index can be any frequency location index, such as band or sub-band index, RB or RBG index, BWP index, carrier or sub-carrier index, frequency partition index etc. as described earlier In some embodiments, the group ACK/NACK may be a message having k fields (e.g. k bits), where each field is associated with a particular UE position index and provides an indication of whether or not the grant-free uplink transmission from that UE is acknowledged. As one example, a group may have k UEs and the group ACK/NACK may be a word having k bits. Each bit in the word maps to a respective one of the k UEs. An example is illustrated in FIG. 10 at 434. A bit value of '1' means that a grant-free uplink transmission from the corresponding UE was successfully received and decoded, i.e., an ACK. A bit value of '0' means NACK. If there is no ACK or NACK from a particular UE, then the bit corresponding to that UE is set to '0'. Therefore, if a UE in the group sends a grant-free uplink transmission and its position index in the word 434 is '0', then that UE does not know whether activity detection was successful.

In some embodiments, the UE position index is preconfigured for the defined group (GF_group_RNTI) in higher layer signalling (e.g. RRC signalling), as described earlier. In some embodiments, the UE position index has a predefined mapping with the combination of the grant-free access region index and MA signature index and known by both the UEs and gNB.

FIG. 11 illustrates a variation of FIG. 10 in which two bits b1 and b2 are associated with each UE position index in word 436. Bit b1 indicates whether or not activity detection was successful for the UE (e.g. '1'='yes'), and bit b2 indicates whether or not the data was successfully decoded (e.g. '1'='data successfully decoded'). The UE can use the additional information to decide what to do next. For example, if the word 436 indicates that activity detection was not even successful for the UE, then the UE may re-send the same initial transmission with the same RV, whereas if the word 436 indicates that activity detection was successful but the data was not successfully decoded for the UE, then the UE may send a retransmission using another RV (e.g. a higher RV).

In FIGS. 10 and 11, the UE position index may be based on an MA signature index instead, or a combination of an MA signature index and an index indicating which grant-free uplink resources were used to send the grant-free uplink transmission.

In some embodiments, a particular UE may have several grant-free uplink transmissions, in which case there may be multiple HARQ processes, each HARQ process may indicate a TB. The HARQ process ID may be implicitly or explicitly signaled to the base station in the grant-free uplink transmission. An example of implicit signaling is if the HARQ process ID is identifiable to the base station based on the MA signature used by the UE. An example of explicit signaling is to have a field in the grant-free uplink message that indicates the HARQ process ID.

Figure 12:
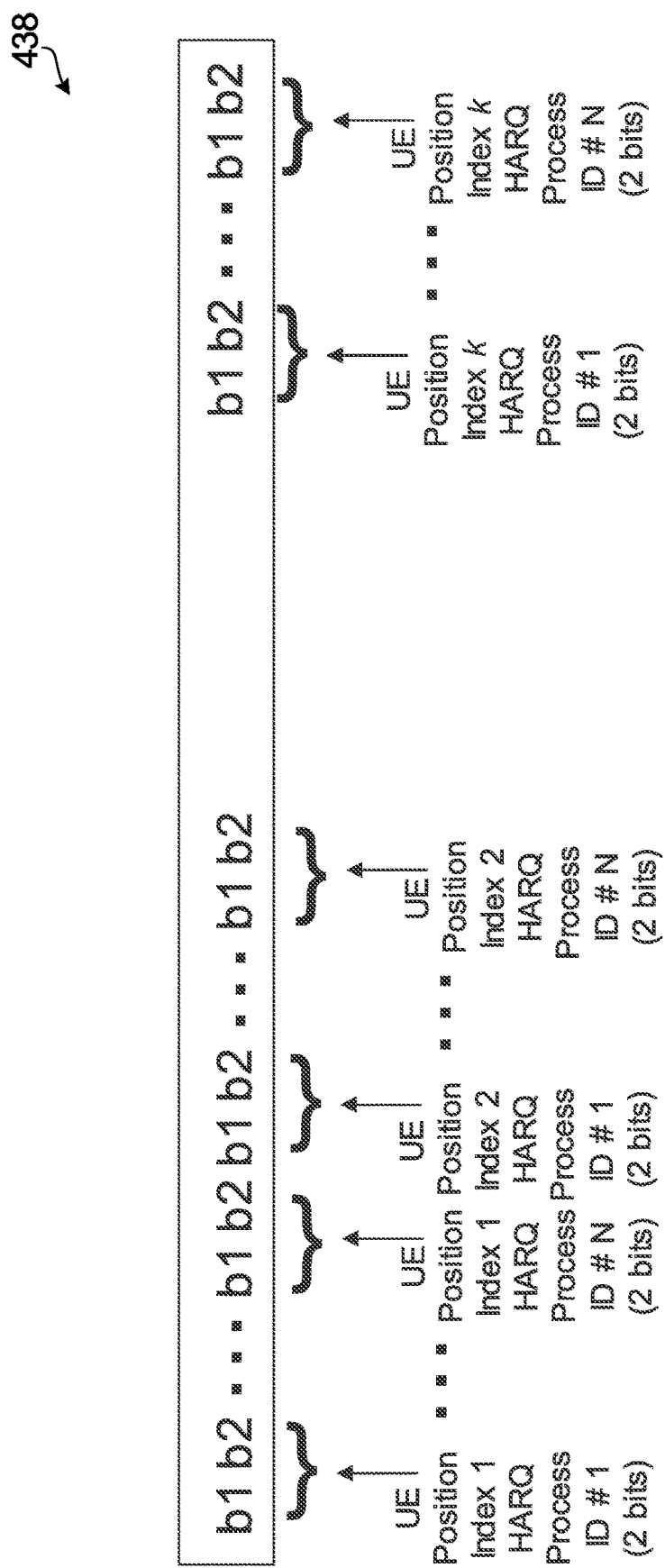

The position index may additionally include the HARQ process ID. FIG. 12 illustrates an example of a group ACK/NACK that is the same as that in FIG. 11, but each HARQ process ID of each UE has its own set of bits b1 and b2. There are N different possible HARQ process IDs for a UE. The UE knows where to look in word 438 based on its position index and its HARQ process ID.

In other embodiments, one UE may be assigned multiple position indices, e.g. if the UE is using multiple MA signatures and/or if the UE has multiple HARQ process IDs. The UE would know which position index is associated with the particular MA signature and/or particular HARQ process ID corresponding to the UE's grant-free uplink transmission.

In some embodiments, the group ACK/NACK includes the UE ID for each UE that the group ACK/NACK is acknowledging. In some embodiments, the presence of the UE ID in the group ACK indicates to the UE that its grant-free uplink transmission was successfully received and decoded by the base station. The absence of the UE ID indicates to the UE that its grant-free uplink transmission was not successfully decoded by the base station, i.e., an implicit NACK. In some embodiments, instead of including the UE ID, the group ACK includes, for each grant-free uplink transmission that is being acknowledged, an index corresponding to the MA signature and grant-free uplink resource that was used.

Figure 13:
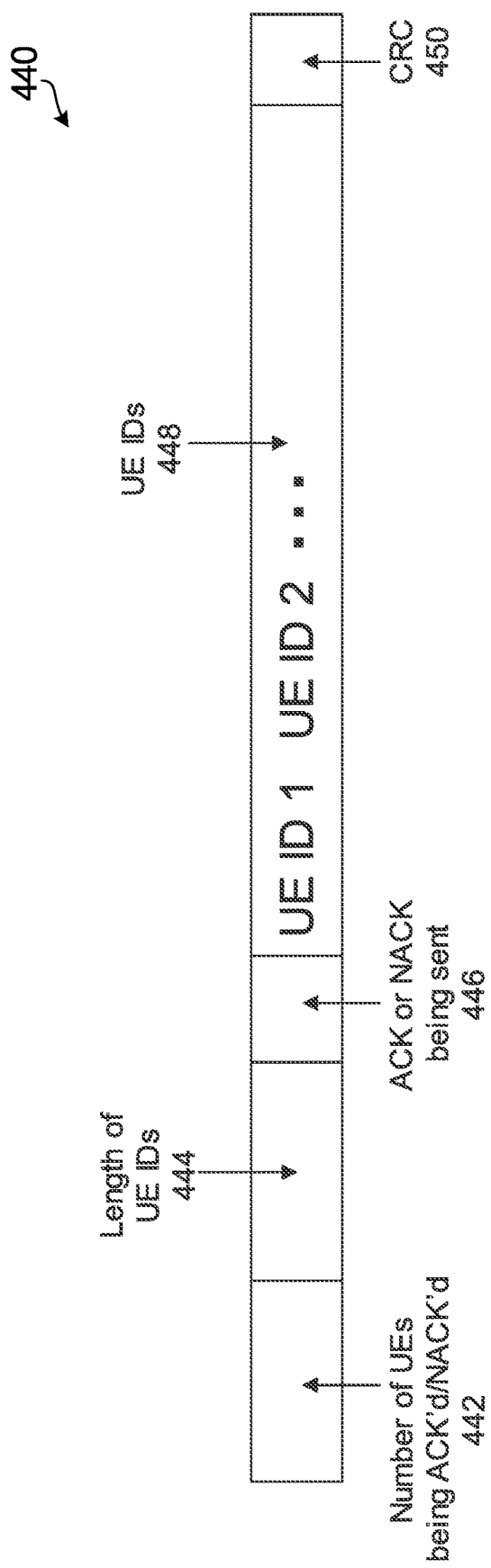

FIG. 13 illustrates a group ACK/NACK 440, according to another embodiment. The group ACK/NACK 440 includes a field 442 indicating the number of UEs being ACK'd or NACK'd in the group ACK/NACK 440. Another field 444 indicates the length of each UE ID. Another field 446 indicates whether the UEs identified in the group ACK/NACK 440 are being ACK'd or NACK'd (e.g. '1'=ACK and '0'=NACK). The UE ID of each UE being ACK'd or NACK'd is then present in field 448. The group ACK/NACK is encoded as one payload and a CRC 450 is added. If the group ACK/NACK 440 is sent through group-common DCI, the CRC 450 may be scrambled by a group ID that is known by both the UE and base station.

Fields 442, 444, and 446 are optional. None or only some of fields 442, 444, and 446 are included depending upon the implementation. For example, field 444 may be omitted if the UE ID is always a fixed length known in advance to the UEs and base station, e.g. a fixed length UE ID obtained through activity detection and data decoding. As another example, field 446 may be omitted if the presence of a UE ID always means that UE is being ACK'd. Also, in some embodiments, CRC 450 may not be present. Also, in some embodiments, each UE ID of some or all of the UE IDs in field 448 may be replaced with: (i) an index identifying the MA signature used by the UE sending the grant-free uplink transmission being ACK'd/NACK'd; or (ii) a combination of an index identifying the MA signature used by the UE and another index identifying the grant-free uplink resources used by the UE.

In some embodiments, two separate group ACK/NACKs having the format of FIG. 13 may be transmitted: one group ACK/NACK acknowledging transmissions, and another group ACK/NACK negative acknowledging transmissions. In other embodiments, a single group ACK/NACK may include both ACKs and NACKs. For example, fields 446 and 448 may be present twice: once acknowledging transmissions, and again to negative acknowledge transmissions. In any case, if NACKs are being sent, the base station may not have been able to identify the UEs being NACK'd, in which case a UE ID may be replaced with an MA signature index of the uplink transmission being NACK'd, or a combination of MA signature index and an index identifying the grant-free uplink resource used by the uplink transmission being NACK'd. When there is both an ACK and a NACK field, then a UE that sent a grant-free uplink transmission and that does not see an ACK or a NACK in the group ACK/NACK knows that activity detection of its grant-free uplink transmission was not even successfully performed by the base station.

A group ACK/NACK that includes the UE ID for each UE being ACK'd/NACK'd (e.g. as in FIG. 13) may be shorter than a group ACK/NACK comprising a bitmap (e.g. as in FIGS. 10 to 12) if there are a large number of UEs that could potentially be ACK'd/NACK'd, but only a small subset of the large number of UEs is actually being ACK'd/NACK'd in the group ACK/NACK.

For all the formats described above (e.g. FIGS. 10 to 13), the group ACK/NACK may be transmitted in a downlink data channel (e.g. a PDSCH), in downlink control information (DCI), or in a feedback channel at a known location that may not have the format of DCI.

In the embodiments in which the group ACK/NACK is transmitted in the group-common DCI, a group ID is predefined or signalled and the DCI is transmitted in the search space defined by the group ID (GF_group_RNTI). GF_group_RNTI can be configured in advance or predefined for a time slot or a grant-free region as described earlier. The CRC field in the DCI is also usually masked with the group ID. More details of transmitting in the DCI format are described earlier.

In the embodiments in which the group ACK/NACK is transmitted in a downlink shared channel (e.g. a PDSCH) instead of in downlink control information (DCI), then the group ACK/NACK may still have any of the formats discussed above, e.g. in relation to FIGS. 10 to 13. In some embodiments, a downlink control channel (e.g. PDCCH) may indicate the location of the group ACK/NACK in the downlink shared channel. This indication may have the same format as a scheduling grant, but informing the UEs in the group where to look for the group ACK/NACK in the downlink data channel, what modulation was used for the group ACK/NACK, etc. In some embodiments, the indication may be in a DCI format and sent in a search space defined by the group ID (GF_group_RNTI) and with a CRC masked or scrambled using the group ID. In some embodiments, the indication may be at a fixed location in the downlink control channel that is known to the UEs in the group, in which case the UEs in the group do not have to search a search area in the downlink control channel using the group ID.

In some embodiments, the group ACK/NACK in the downlink data channel may include other information for the UEs in the group, e.g. downlink data to be transmitted to one or more of the UEs in the group.

In some embodiments, the group ACK/NACK may be transmitted in a fixed time-frequency location with respect to the time slot (subframe) or the grant-free transmission resources or a combination of the two. The group ACK/NACK may still have any of the formats discussed above, e.g. in relation to FIGS. 10 to 13. The feedback channel carrying the feedback information may not necessarily be in DCI. It may not be necessary to have a search space defined by a group ID, and a CRC may or may not need to be masked by the group ID.

In some embodiments, the group ACK/NACK transmitted through the group-common DCI may have a fixed timing relationship with the timing of the grant-free uplink resources used to send the grant-free uplink transmissions being ACK'd/NACK'd, similar to the case of the PHICH-like channel. For example, if a group of UEs send grant-free uplink transmissions in subframe (or TTI) w, then the group ACK/NACK for that grant-free uplink transmission is sent in the DCI of subframe (or TTI) w+k. However, in some embodiments, the group ACK/NACK may not necessarily have a fixed timing relationship with the grant-free resources. In embodiments in which the HARQ process ID or any similar indication is included in the DCI, then the UE may be able to identify which transport block (or packet) is acknowledged by using the HARQ process ID instead of the timing of the DCI. In some embodiments, the group ACK/NACK using group-common DCI may be used for termination of a continuous repetition. In this case, supporting DCI transmitted at an arbitrary timing may be beneficial.

In some embodiments, the group ACK/NACK may contain a HARQ process number (or HARQ process ID, or any attributes that identifies the HARQ process number or transport block (TB) index, e.g., MA signature index or grant-free access region index or combination of the two) explicitly or implicitly, which is used to identify which TB the group ACK/NACK is used for if there are multiple TBs transmitted. Some of the formats that include the HARQ ID have been described earlier. The HARQ process ID may be implicitly or explicitly signalled to the base station in the grant-free uplink transmission. An example of implicit signaling is if the HARQ process ID is identifiable to the base station based on the MA signature used by the UE. The MA signature can be a reference signal or a codebook/signature/sequence or used for a multiple access (MA) scheme or any other attributes described earlier. For example, if a MA scheme uses two different codebooks to transmit two TBs (corresponding to two HARQ processes). The base station identifies the codebook through activity detection. Then the base station may indicate the codebook index or the corresponding HARQ process index in the group ACK/NACK, which identifies the TB that the group ACK/NACK is for. In some embodiments, the HARQ process ID may be able to be implicitly identified through different grant-free access regions. For example, if a UE is configured to be able to access two grant-free access regions in one time slot. The UE may transmit two TBs that correspond to two different HARQ processes. In the group ACK/NACK feedback, the grant access region index or HARQ process ID may be indicated implicitly or explicitly such that the UE can identify which TB the group ACK/NACK feedback is for. An example of explicit signaling is to have a field in the grant-free uplink message that indicates the HARQ process ID. The HARQ ID may be protected more robustly such that the base station can identify it even if it may not be able to successfully decode the data.

In some scenarios, the group ACK/NACK may only contain an ACK/NACK for one UE. In this case, all the group ACK/NACK signalling methods and formats described in this disclosure may be applicable for individual ACK/NACK when the number of UEs in the group is one or the ACK/NACK is targeting one UE. As an example, if the number of UEs in the group is one, the HARQ feedback may be sent in a UE specific DCI as opposed to a group-common DCI. The group RNTI can become the GF C-RNTI, and is used to mask the DCI for the HARQ feedback and can be configured in UE-specific RRC signaling or derived based on the grant-free transmission resources, e.g. at least the time and frequency resource of the grant-free transmission. The UE specific DCI may contain ACK/NACK bits corresponding to each HARQ process, but for only one UE. In this case, the UE specific DCI may contain a bit map, with each bit indicating an ACK or NACK for a respective HARQ process of the UE. The location/position of each bit may have a predefined mapping with respect to a corresponding HARQ process (or HARQ process ID).

In some embodiments, the group ACK/NACK may comprise a single ACK/NACK payload protected by a CRC. The payload may include an aggregation of all UE IDs or MA signatures corresponding to uplink transmissions that are being ACK/NACK'd. Each UE that sent a grant-free uplink transmission then decodes the group ACK/NACK to see if matching UE ID or MA signatures can be found in the group ACK/NACK payload and whether its grant-free uplink transmission was acknowledged. In some embodiments, a group ACK/NACK may be associated with a temporal group ID. The group ID may be derived from the grant-free resources. For example, if a group of UEs all use uplink resources C to respectively send a grant-free uplink transmission, then that group of UEs may be associated with a group ID corresponding to uplink resources C. In some embodiments, there may be a specific 1-bit field indicating that the ACK/NACK is a group ACK/NACK, and the location of time and frequency resources of the ACK/NACK is directly linked to the grant free transmission resources and a group ID may not be necessary. In some embodiments, there may be a reserved field (e.g. time-frequency location) in the downlink for sending a group ACK/NACK. The time-frequency location of the reserved field may be determined based on the location of the uplink resources used for the grant-free uplink transmissions. For example, if a group of UEs each send their grant-free uplink transmission within time-frequency region A, then the reserved field for the group ACK/NACK may be at time-frequency location B.

In all of the group ACK/NACK and individual ACK/NACK described in this disclosure (transmitted in a downlink control channel or downlink shared channel or any feedback channel in general), there may be additional information transmitted in the feedback. The feedback content may be similar to the random access response (RAR) message used for LTE random access. In the group ACK/NACK, there may be multiple entries with each entry corresponding to the feedback for a UE and either indexed by the MA signature index or explicitly includes the MA signature index. If the group ACK/NACK corresponds to the feedback of multiple grant-free access regions, the entry may be indexed by a combination of the grant-free access region index and MA signature index. Each entry may contains at least one or some of, but not limited to:

a. The MA signature index that is identified through activity detection or a combination of the MA signature index and the grant-free access region index.
b. A UE ID if the UE is identified.
c. A HARQ process number that identifies which TB the feedback corresponds to. Sometimes, an attribute that identifies the HARQ process number (e.g. a MA signature index, a codebook index which identifies the HARQ process number) is included instead. Sometimes, the HARQ process number may not be explicitly included but can be derived from other attributes.

d. The timing advanced (TA) signal or timing information used to adjust uplink timing for uplink synchronization if TA is estimated in the initial grant-free transmission (e.g. using a preamble or a RS for TA estimation).
e. A temporary identity, e.g., a TC-RNTI similar to the one assigned in a LTE RAR message, used for further communications between the UE and the network.
f. A scheduling grant, indicating the resource, including time-frequency resource, MCS, reference signal, MA signature, etc. that the UE will use for the following transmissions or retransmissions.
g. Resource hopping pattern and/or RV hopping pattern, and/or MA signature hopping pattern for the following transmissions/retransmissions.
h. An explicit or implicit signal to indicate whether it is ACK or NACK and optionally a signal to indicate whether the activity detection successfully detects the MA signature.

The above additional information may also be used for individual ACK/NACK through individual DCI, individual control channel or individual downlink shared channel (PDSCH).

Figure 14:
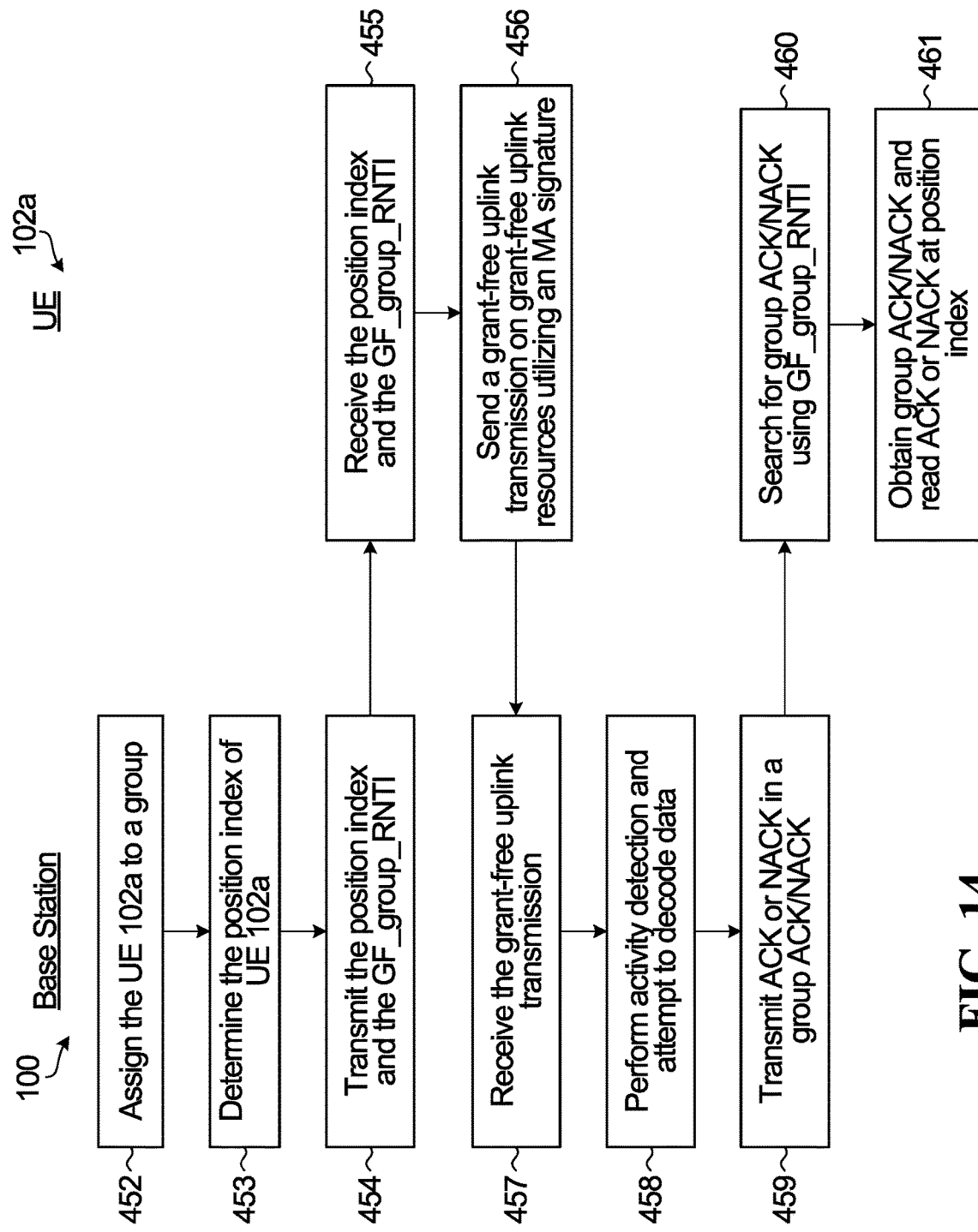
FIG. 14 is a method performed by a UE and base station, according to another embodiment.

FIG. 14 illustrates a method performed by base station 100 and UE 102a, according to one embodiment. In step 452, the base station 100 assigns the UE 102a to a group, which has a corresponding GF_group_RNTI that distinguishes the group from other groups. In step 453, the base station 100 determines the position index of UE 102a in the group. In step 454, the base station 100 transmits to UE 102a the GF_group_RNTI and the position index assigned to UE 102a, which is received by the UE 102a in step 455. In step 456, the UE 102a transmits a grant-free uplink message utilizing an MA signature, which is received by the base station 100 in step 457. In step 458, the base station performs activity detection and attempts to decode the data. In step 459, the base station 100 sends an ACK or a NACK for the UE 102a in a group ACK/NACK. The group ACK/NACK is sent on DCI. In step 460, the UE 102a searches for the group ACK/NACK in the search space defined by the GF_group_RNTI. In step 461, the UE 102a obtains the group ACK/NACK and reads its ACK or NACK at the position index of UE 102a.

Figure 15:
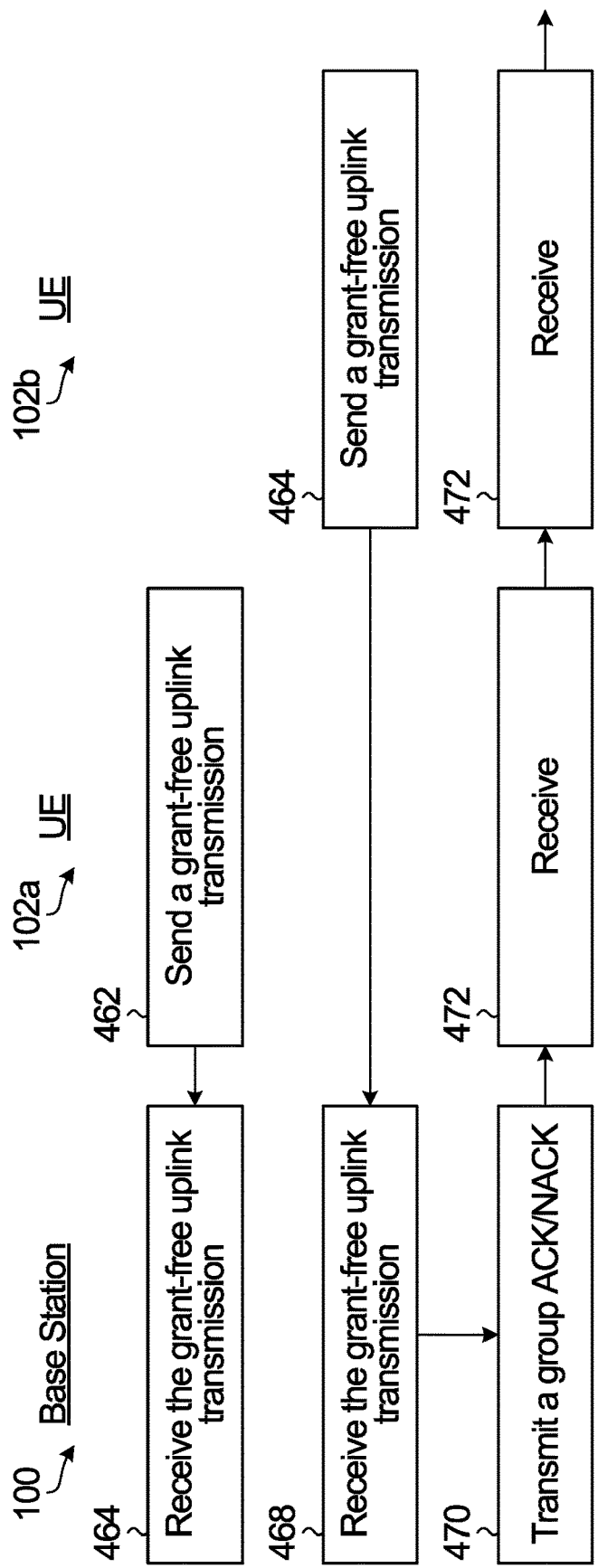
FIG. 15 is a method performed by two UEs and a base station, according to one embodiment.

FIG. 15 is a method performed by base station 100 and UEs 102a and 102b, according to one embodiment. In step 462, the UE 102a transmits a grant-free uplink transmission to the base station 100, which is received by the base station 100 at step 464. In step 466, the UE 102b also transmits a grant-free uplink transmission to the base station 100, which is received at step 468. Steps 462 and 464 may happen in parallel to steps 466 and 468. In step 470, the base station 100 transmits to UEs 102a and 102b a group ACK/NACK, which may have any one of the formats discussed above. The group ACK/NACK is received by both UE 102a and 102b at step 472. In some embodiments, the group ACK/NACK may acknowledge all UE packets received within a certain time window spanning a block of time slots, TTIs, or subframes. Such a group ACK/NACK will be referred to as an "asynchronous" group ACK/NACK. The asynchronous group ACK/NACK may be in a predefined location, or defined in a system information block (SIB), or configured using RRC.

Since an asynchronous group ACK/NACK may be acknowledging multiple packets sent by the same UE (e.g. in different TTIs), each ACK in the group ACK/NACK is identified using both the UE ID (or MA signature if it uniquely identifies the UE) and other information that identifies the specific packet being acknowledged. The other information may include, but is not limited to: the packet ID;

and/or the packet arrival time; and/or an indication of the location of the packet, such as the subframe or resource block that the packet was sent on; and/or a HARQ process ID included in the packet. The asynchronous group ACK/NACK may be present in a control channel, data channel, or dedicated acknowledgement channel.

The asynchronous group ACK/NACK may have a similar format to that described for the group ACK/NACK in FIGS. 10 to 13. In the bit map format of FIGS. 10 to 12, the addition of packet ID, packet arrival time, subframe number, grant-free resource index, and/or HARQ ID can be added to the UE position index. In the format of aggregated UE ID in FIG. 13, the packet ID, packet arrival time, subframe number, and/or grant-free resource index can be added as a field alone or as a field on top of each UE ID or as a group index. For example, the asynchronous group ACK/NACK may contain a number of groups, each group containing the group ACK/NACK for each time slot.

In some embodiments, an asynchronous group ACK/NACK may acknowledge all the UE packets that arrived since the previous asynchronous group ACK/NACK was sent.

In some embodiments, the payload of the group ACK/NACK (asynchronous or not) is encoded using a forward error correction (FEC) code and/or a CRC.

As mentioned above, a group ACK/NACK includes UE identify information (e.g. UE ID or MA signature) and/or packet identify information (e.g. packet ID or packet arrival time), for each uplink transmission being acknowledged. In some embodiments, the UE identify information and/or the packet identity information may be transmitted separately or aggregated and protected together. For example, as mentioned above, the group ACK/NACK may be a single payload protected by a CRC. The UEs know where to look for the group ACK/NACK. For example, there may be a dedicated channel for the group ACK/NACK, which is known to the UEs. The group ACK/NACK location may be preconfigured, semi-persistently configured, or dynamically changed using a control channel.

Figure 16:
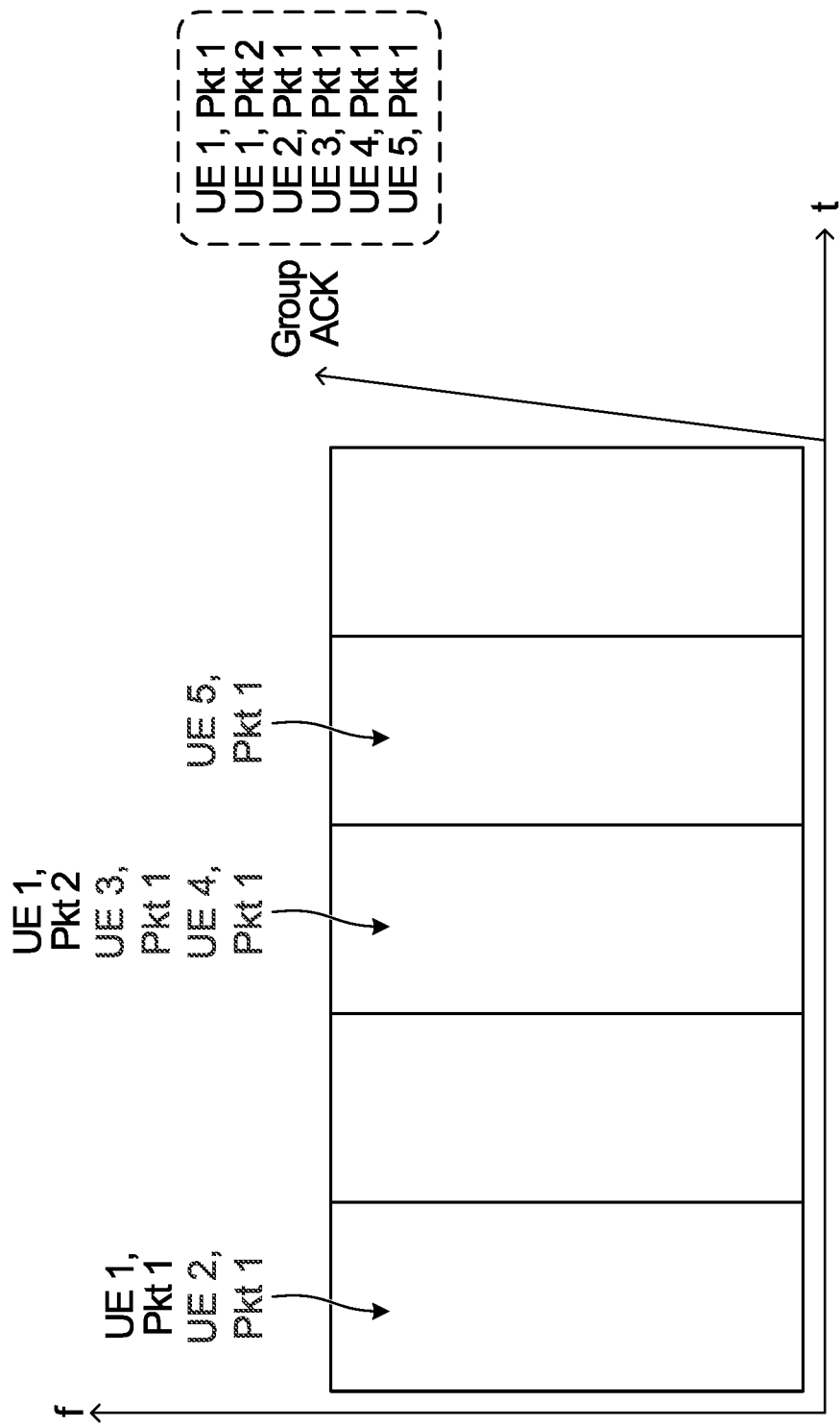
FIG. 16 is a time-frequency resource partition showing a group acknowledgement for packets sent during five previous time slots.

FIG. 16 illustrates an example of an asynchronous group ACK/NACK. A time-frequency partition is separated into five time slots. In the first time slot, UE 1 sends a first packet and UE 2 also sends a first packet, both via a respective grant-free uplink transmission. In a third slot, UE 1 transmits a second packet, UE 3 transmits a first packet, and UE 4 transmits a first packet, each via a respective grant-free uplink transmission. In a fourth time slot, UE 5 transmits a first packet in a grant-free uplink transmission. Then, after the end of the fifth time slot, the base station sends an asynchronous group ACK/NACK for the packets sent during the five time slots.

In some embodiments, the group ACK/NACK may also carry NACKs. In situations in which the group ACK/NACK is only carrying NACKs (e.g. no UEs had their data successfully decoded), then the group ACK may be interchangeably called a group NACK.

In some embodiments, the group ACK/NACK may be linked to the grant free resources used. That is, if a group of UEs use a particular time/frequency region or location A, then that group of UEs know where to look for the group ACK/NACK, e.g. the group ACK/NACK is at time-frequency location B in a downlink acknowledgement channel.

In some embodiments, the group ACK/NACK may have a fixed association with the time of UE uplink transmission. For example, all UEs that send a grant-free uplink transmission at time A may have their transmissions ACK/NACK'd in the group ACK/NACK.

In some embodiments, the asynchronous group ACK/NACK may also be transmitted through a group-common DCI. In this case, there may be a group ID (e.g. GF_group_RNTI) predefined. The group ID may change at different predefined locations (e.g., as a function of frame number and subframe or time slot number), but known to both the UEs sending the grant-free uplink transmissions and the base station. The group-common DCI may be sent at a search space defined by the group ID, and the CRC may be masked using the group ID. In some embodiment, the asynchronous group ACK/NACK may be transmitted in a data channel indicated by a PDCCH that is configured by the GF_group_RNTI.

Example Method of Signaling ACK/NACK

Figure 17:
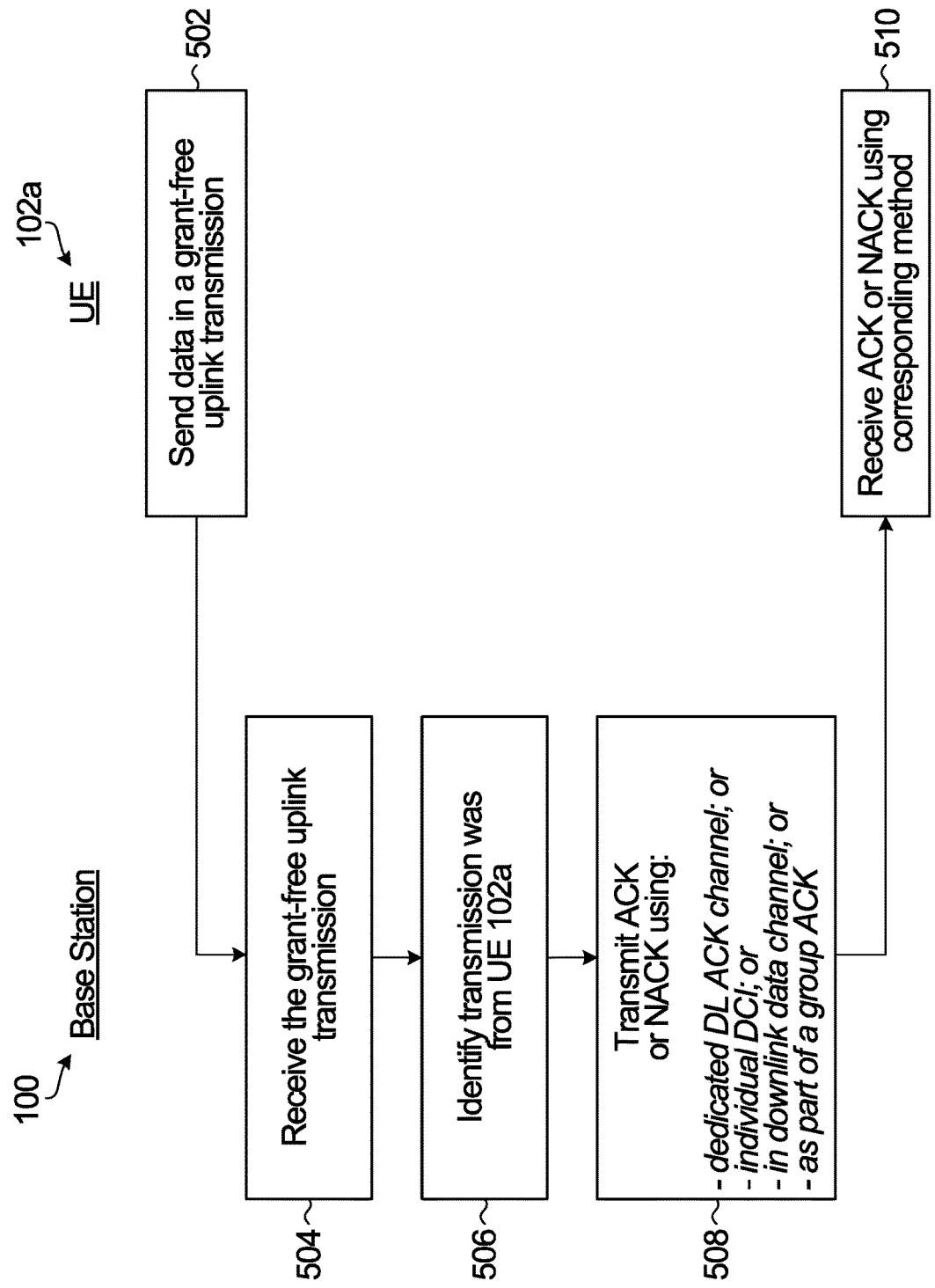
FIG. 17 is a method performed by a UE and base station, according to another embodiment.

FIG. 17 is a method performed by the UE 102*a* and the base station 100, according to one embodiment.

In step 502, the UE 102*a* sends data to the base station in a grant-free uplink transmission.

In step 504, the base station receives the grant-free uplink transmission.

In step 506, the base station processes the grant-free uplink transmission to determine the identity of UE 102*a*. Step 506 may comprise obtaining the UE ID for UE 102*a* from the decoded data. Step 506 may instead comprise obtaining the MA signature utilized by the grant-free uplink transmission, after activity detection.

In step 508, the base station 100 transmits an ACK or NACK to UE 102*a* using one of the following methods: transmitting the ACK/NACK on a dedicated downlink acknowledgement channel, or transmitting the ACK/NACK in individual DCI for the UE 102*a*, or transmitting the ACK/NACK at a resource partition in a downlink data channel that is indicated via DCI, or transmitting the ACK/NACK as part of a group ACK/NACK. The details of each method are described above.

In step 510, the UE receives the ACK/NACK using a method corresponding to the method used by the base station 100 to send the ACK/NACK. For example, if the ACK/NACK was sent by the base station on a dedicated downlink acknowledgement channel, then the UE 102*a* obtains the ACK/NACK from the dedicated downlink acknowledgement channel.

Configuration of UE for Grant-Free Uplink Transmissions

A UE may be configured by the network (via the base station) for grant-free uplink transmission. The configuration may change semi-statically.

In one embodiment, the configuration is performed using RRC signaling and may include (but is not limited to) setting one, some, or all of the following parameters:

(1) Whether the UE needs to monitor a downlink control channel. In grant-based uplink communications, a UE may regularly monitor a downlink control channel for DCI being communicated to the UE, e.g. to receive a scheduling grant for the UE. However, when the UE is configured to perform grant-free uplink transmissions, the UE may not need to monitor the downlink control channel as frequently, or the UE may not need to monitor the downlink control channel at all. How often (if at all) the UE performing grant-free uplink transmissions needs to monitor the downlink control channel may be set by the network. For example, the UE performing grant free uplink transmissions may be configured to monitor the downlink control channel once every T subframes, where T is a parameter configured by the network.

(2) The maximum number of retransmissions that may be performed by the UE. For example, the UE may be configured to keep sending retransmissions until an ACK is received, but only up to a maximum of K retransmissions. If K retransmissions have been sent and an ACK is still not received, then the UE no longer sends any retransmissions and considers the data not to have been received and correctly decoded by the base station.

(3) The resources that may be accessed by the UE for grant-free uplink transmissions and retransmissions, e.g. the resource hopping pattern used by the UE. In some embodiment, multiple resource hopping patterns or multiple grant-free time-frequency resources in a time slot are assigned to the same UE. In the case, when UE has multiple packets to transmit or needs multiple TBs to transmit data, the UE may choose to transmit the multiple TBs over different time-frequency resources. For example, if two grant-free time-frequency regions in one time slot are assigned to the same UE, the UE may use one grant-free region to transmit one packet associated with one TB and the other region to transmit another TB. Each TB may correspond to a different HARQ process. Each TB can be a transmission or retransmission of its corresponding TB independently.

(4) The MA signature tuples that are to be used, or that may be used, by the UE for sending transmissions and retransmissions. For example, the UE may be assigned to a particular 3-tuple in table 302 of FIG. 4, or a particular 2-tuple in table 308 of FIG. 5. The assignment may also or instead include an MA signature hopping pattern, e.g. a pattern indicating which reference signal is to be used for the initial transmission, the first retransmission, the second retransmission, etc.

(5) The MCS used by the UE for the grant-free uplink transmissions, and whether (or by how much) the MCS is to be reduced after the initial transmission. For example, an MCS hopping pattern may be assigned to the UE for the grant-free uplink transmission. An initial transmission may have a high MCS, a first retransmission may have a lower MCS, a second retransmission may have an even lower MCS, etc.

(6) Whether the UE needs to monitor for ACKs and/or NACKs after the initial transmission, and whether a dedicated acknowledgement channel needs to be monitored. The frequency of monitoring the acknowledgement channel may also be configured. Also, or instead, the UE may be informed of which of the various options described earlier will be used for communicating the ACK/NACK, e.g. dedicated downlink acknowledgement channel, individual DCI, downlink data channel, as part of a group ACK, and any relevant details.

Alternatively, some or all of the parameters above may be indicated via DCI information instead of using the higher layer RRC signaling. The UE would then be configured to check for the DCI. The DCI may include the resource configuration that enables the UE to perform the grant-free uplink transmission, e.g. an assignment of which resources to use.

Another parameter not mentioned in (1) to (6) above, but that may be configured via the DCI, is:

(7) The resource in the subframe used for the grant-free uplink transmission. As one example, the DCI may indicate the first resource block location in a subframe that the UE is permitted to send a grant-free uplink transmission. In some embodiments, knowledge of the first resource block location in the subframe may allow the UE to determine the resource hopping pattern for future retransmissions relating to the packet, e.g. if there is a known mapping between a resource used for a grant-free uplink transmission and a corresponding hopping pattern having that resource.

Grant-Free Repetitions and Grant-Free to Grant-Based Switch

There may be situations in which it is beneficial for a UE to switch between grant-free uplink transmissions and grant-based uplink transmissions.

Scheduling an uplink transmission for a UE in response to receiving a grant-free uplink transmission may be referred to as a "grant-free to grant-based switch", i.e. a grant-free uplink transmission is received from a UE, and in response a grant-based uplink transmission is scheduled for that UE by the base station. A grant-free to grant-based switch may be performed by sending a scheduling grant to the UE that sent the grant-free uplink transmission.

In some embodiments, the base station 100 may perform a grant-free to grant-based switch based on certain conditions. Any one condition, or any combination of conditions, may be used by the base station 100 to determine whether to perform a grant-free to grant-based switch. Example conditions include:

(A) The grant-free message includes a buffer status report indicating that the UE has data (or more data) to send. In response, the base station 100 may perform a grant-free to grant-based switch.

and/or (B) The data in the grant-free message is unsuccessfully decoded. In response, the base station 100 may perform a grant-free to grant-based switch.

and/or (C) Latency requirement. If a UE is close to its latency bound, then the base station 100 may perform a grant-free to grant-based switch. Otherwise, the base station 100 may not perform the switch, in which case the base station 100 may just send an ACK or NACK without a scheduling grant, or the base station 100 may not send anything. Any subsequent transmissions (or retransmissions) by the UE may then be sent via grant-free uplink transmissions. More generally, regardless of latency requirement, if the base station 100 determines that a grant-free to grant-based switch for a UE is not to be performed, then that UE may continue grant-free transmissions/retransmissions.

and/or (D) Number of transmissions. For example, if a UE has sent several (e.g. three) retransmissions of data via grant-free uplink transmission, and decoding of the data by the base station still fails, then the base station may perform a grant-free to grant-based switch by sending a scheduling grant for the next retransmission. In some embodiments, the number of retransmissions may be determined by a reference signal identification (e.g. the reference signal used in the retransmission) or by a separate indicator sent by the UE in the grant-free uplink transmission.

and/or (E) The UE may send an indicator that indicates whether the UE desires to switch to grant-based uplink transmission, based on the UE's known circumstances or requirements (e.g., the UE's latency requirement, traffic load, channel conditions, etc.). The base station 100 may perform a grant-free to grant-based switch if the UE indicates a desire to switch to grant-based uplink transmission.

and/or (F) The traffic load of grant-free UEs, e.g. the number of grant-free UEs that arrive in a current or recent subframe(s). If the number of grant-free uplink transmissions and/or the number of UEs permitted to send grant-free uplink transmissions exceeds a certain threshold, then in response a grant-free to grant-based switch may be performed for one or more UEs.

and/or (G) If there is a potential future collision from a currently detected UE operating in grant-free transmission mode, then a grant-free to grant-based switch may be performed to try to avoid the potential future collision.

and/or (H) Quality of Service (QoS) requirements. Depending upon the QoS requirements of a UE sending a grant-free uplink transmission, a grant-free to grant-based switch may be performed for that UE.

In some embodiments, the DCI and/or scheduling information for the grant-free to grant-based switch may also include some or all of the following information:

(i) An indicator indicating whether, after the granted uplink transmission, the UE is to send further uplink transmissions/retransmissions via grant-free uplink transmissions, or whether the UE is to continue in grant-based mode, i.e. wait for future grants before sending further uplink transmissions/retransmissions. In one embodiment, the indicator may be a value that is "true" by default. A value of "true" indicates to the UE that any retransmissions sent after the granted uplink transmission are to be sent via grant-free uplink transmissions and are to continue without waiting for an ACK/NACK, until an ACK is received (or until the maximum number K of retransmissions has been reached). A value of "false" indicates to the UE that any retransmissions sent after the granted uplink transmission are to be sent via grant-based uplink transmissions.

and/or (ii) An indicator indicating whether the grant is for a single granted uplink transmission, or whether the UE is granted to perform multiple transmissions, e.g. multiple retransmissions. If the UE is granted to perform multiple transmissions, then the indicator may indicate one, some, or all of the following: (a) the maximum number of retransmissions K (e.g. item (2) above); and/or (b) the resource block assignment for the first transmission (e.g. item (7) above) and/or the resource hopping pattern; and/or (c) the MA signature for the first transmission and/or the MA signature hopping pattern (e.g. item (4) above); and/or (d) the MCS for the initial transmission or an MCS hopping pattern (e.g. item (5) above).

Items (i) and/or (ii) may also be included in the DCI and/or scheduling information for a granted uplink communication that is not a grant-free to grant-based switch. For example, a UE may be operating in grant-based mode, but the indicators in (i) and (ii) above may also be included in the DCI and/or scheduling information for some or all of the granted uplink communications to configure a UE for follow-up behaviour.

In some embodiments, UE 102a may be configured to send an initial transmission of a transport block (TB) (e.g. of a packet), and then automatically perform retransmissions of the TB via subsequent grant-free uplink transmissions. The automatic grant-free retransmissions may be referred to as performing continuous repetitions of the TB. That is, an initial uplink transmission of the TB may be performed, followed by continuous repetition of the TB using subsequent grant-free uplink transmissions. The initial transmission may be grant-free or granted.

In some embodiments, the repetitions of the TB may use different redundancy versions, e.g. RV 1 for the first repetition, RV 2 for the second repetition, etc. However, the redundancy versions do not have to be different. In some embodiments, repetitions of the TB may use different MCS, e.g. the initial transmission may have a high MCS, the first repetition may have a lower MCS, the second repetition may have an even lower MCS, etc. However, the MCS of different repetitions do not have to be different.

In some embodiments, the repetition may be performed on preconfigured resources or preconfigured hopping patterns. For example, based on the grant-free resources used by UE 102a to send the initial transmission, there may be fixed future resources predetermined in advance for sending any repetitions related to the initial transmission. For example, if the initial grant-free transmission uses time-frequency location A in a first TTI, then the first repetition is to be sent at time-frequency location B in the next TTI, and the second repetition is to be sent at time-frequency location C in the following TTI, etc.

The continuous repetitions may be performed by UE 102a until at least one of the following conditions is met:

(1) A message is received from the base station 100 indicating that the base station 100 has successfully received and decoded the TB. The message may be an ACK, or at least will be called an "ACK" herein since the message acknowledges the TB has been successfully decoded. The ACK may have any one of the formats described earlier (e.g. sent in a dedicated downlink acknowledgement cannel, sent as individual DCI, sent in a data channel, sent as part of a group ACK/NACK having any of the formats of FIGS. 10-13, etc.). In some embodiments, the ACK may include a grant for UE 102a to send one or more additional TBs. If a grant is included as part of the ACK, then the ACK does not actually have to be explicitly included. That is, if UE 102a sends a first TB in a grant-free uplink transmission, and in response receives a grant for the UE 102a to send one or more additional TBs, then the UE 102a assumes that the first TB was successfully decoded by the base station 100. The ACK is implicit by virtue of the fact that the UE 102a received the grant to send more TBs. In some embodiments, the acknowledgment/indication of successful receipt of the TB is in an UL grant from the base station. As described earlier, the ACK feedback may contain a HARQ process number (or HARQ process ID, or any attributes that identify the HARQ process number or TB index, e.g., MA signature index or grant-free access region index or combination of the two) which is used to identify which TB the ACK is meant for if there are multiple TBs transmitted. The HARQ process ID may be implicitly or explicitly signalled to the base station in the grant-free uplink transmission. An example of implicit signaling is if the HARQ process ID is identifiable to the base station based on the MA signature used by the UE. The MA signature can be a reference signal or a codebook/signature/sequence used for a multiple access (MA) scheme or any other attributes described earlier. For example, if a MA scheme uses two different codebooks to transmit two TBs (corresponding to two HARQ processes). The base station identifies the codebook through activity detection. Then the base station may indicate the codebook index or the corresponding HARQ process index in the grant, which identifies the TB that the ACK is for. In some embodiments, the HARQ process ID may be able to be implicitly identified through different grant-free access regions. For example, if a UE is configured to be able to access two grant-free access regions in one time slot. The UE may transmit two TBs that correspond to two different HARQ process. In the UL grant, the grant access region index or HARQ process ID may be indicated implicitly or explicitly such that the UE can identify which TB the ACK is for. An example of explicit signaling is to have a field in the grant-free uplink message that indicates the HARQ process ID. The HARQ ID may be protected more robustly such that the base station can identify it even if it may not be able to successfully decode the data.

and/or (2) The number of repetitions for the TB reaches K. That is, if the UE 102a has performed K retransmissions and an ACK is still not received from the base station 100, then the UE 102a gives up trying to send the TB to the base station 100. In some embodiments, K is semi-statically configured by the base station 100, such that the base station 100/network can adjust K over time.

and/or (3) A grant is received from the base station performing a grant-free to grant-based switch, i.e. the base station 100 sends a grant to UE 102a to perform one or more of the retransmissions. If an uplink grant is successfully received for a slot/mini-slot for the TB, the uplink grant allocation overrides the grant-free allocation for that slot/mini-slot for that TB, and the UE's transmission/retransmission follows the uplink grant for that slot/mini-slot for that TB. As described earlier, the grant may contain a HARQ process number (or HARQ process ID, or any attributes that identifies the HARQ process number or TB index, e.g., MA signature index or grant-free access region index or combination of the two) which is used to identify which TB the grant is meant for if there are multiple TBs transmitted. The HARQ process ID may be implicitly or explicitly signalled to the base station in the grant-free uplink transmission. An example of implicit signaling is if the HARQ process ID is identifiable to the base station based on the MA signature used by the UE. The MA signature can be a RS or a codebook/signature/sequence used for a multiple access (MA) scheme or any other attributes described earlier. For example, if a MA scheme uses two different codebooks to transmit two TBs (corresponding to two HARQ processes). The base station identifies the codebook through activity detection. Then the base station may indicate the codebook index or the corresponding HARQ process index in the grant, which identifies the TB that the grant is for. In some embodiments, the HARQ process ID may be able to be implicitly identified through different grant-free access regions. For example, if a UE is configured to be able to access two grant-free access regions in one time slot. The UE may transmit two TBs that correspond to two different HARQ process. In the UL grant, the grant access region index or HARQ process ID may be indicated implicitly or explicitly such that the UE can identify which TB the grant is for. An example of explicit signaling is to have a field in the grant-free uplink message that indicates the HARQ process ID. The HARQ ID may be protected more robustly such that the base station can identify it even if it may not be able to successfully decode the data. Note that this does not assume that the uplink grant is scheduled based on the slot where grant free allocation is based on mini-slot (vice versa).

As mentioned above, in some embodiments a grant-free to grant-based switch may occur to grant a retransmission after an initial transmission is sent via a grant-free uplink transmission. For example, the UE 102a may send an initial transmission, and in response the base station 100 may perform successful activity detection but not successfully decode the data in the initial transmission. The base station 100 therefore sends a grant to UE 102a to send one or more retransmissions.

In some embodiments, if the uplink grant for the retransmission is received at time slot n, and the grant indicates a grant of retransmission at time slot n+k (where k≥0), then UE 102a has two options:

(1) In case in which k>1, the UE 102a performs continuous grant-free repetition from slot n+1 to slot n+k−1, and then switches to the grant-based retransmission on slot n+k. If k=1 then the UE 102a would perform the grant-based retransmission in the next slot, n+1.

or (2) In case in which k>1, the UE 102a stops performing grant-free repetitions after slot n (i.e., does not perform grant-free repetition at time slot n+1 or any subsequent time slots), and UE 102a waits until slot n+k to perform the grant-based retransmission according to the grant. If k=1 then the UE 102a would perform the grant-based retransmission in the next slot, n+1.

Figure 18:
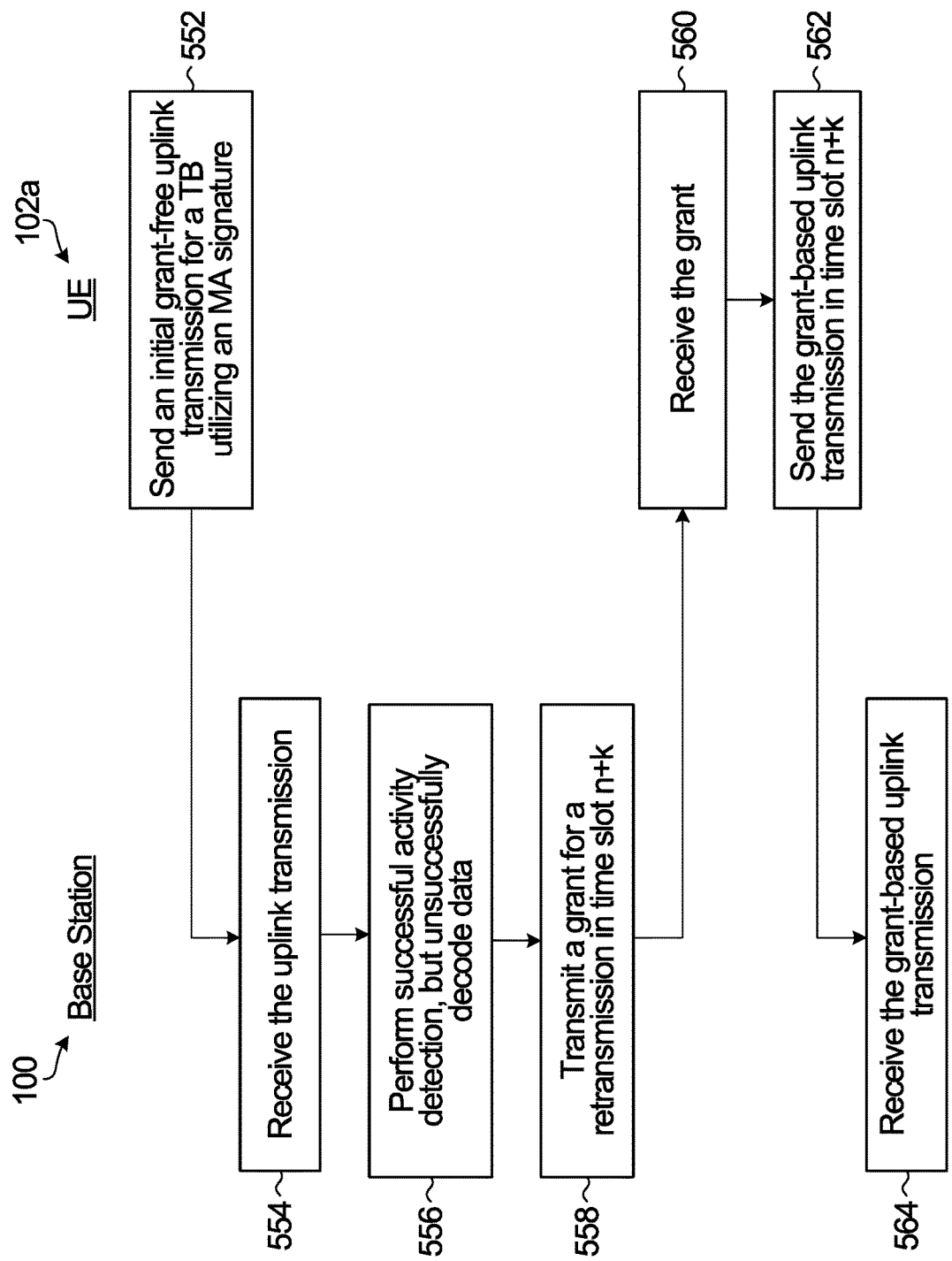
FIG. 18 is a method performed by a UE and base station, according to another embodiment.

FIG. 18 is a method performed by base station 100 and UE 102a, according to one embodiment. In step 552, UE 102a sends an initial grant-free transmission of a TB on a grant-free uplink resource, and utilizing an MA signature. In step 554, the base station 100 receives the uplink transmission. In step 556, the base station 100 successfully performs activity detection to identify the MA signature, but the base station 100 is unable to successfully decode the data in the TB. In step 558, the base station 100 therefore sends a grant to the UE 102a. The grant schedules a retransmission of the TB in later time slot n+k. In step 560, the grant is received by UE 102a at time slot n. In step 562, the UE 102a sends the granted retransmission, which is received by the base station 100 in step 564. In one embodiment, between steps 560 and 562 the UE 102a performs continuous grant-free repetition for the TB, e.g. from slot n+1 to slot n+k−1. In another embodiment, after step 560 the UE 102a does not send any grant-free repetitions of the TB, but instead waits and only sends the granted retransmission in step 562.

Figure 19:
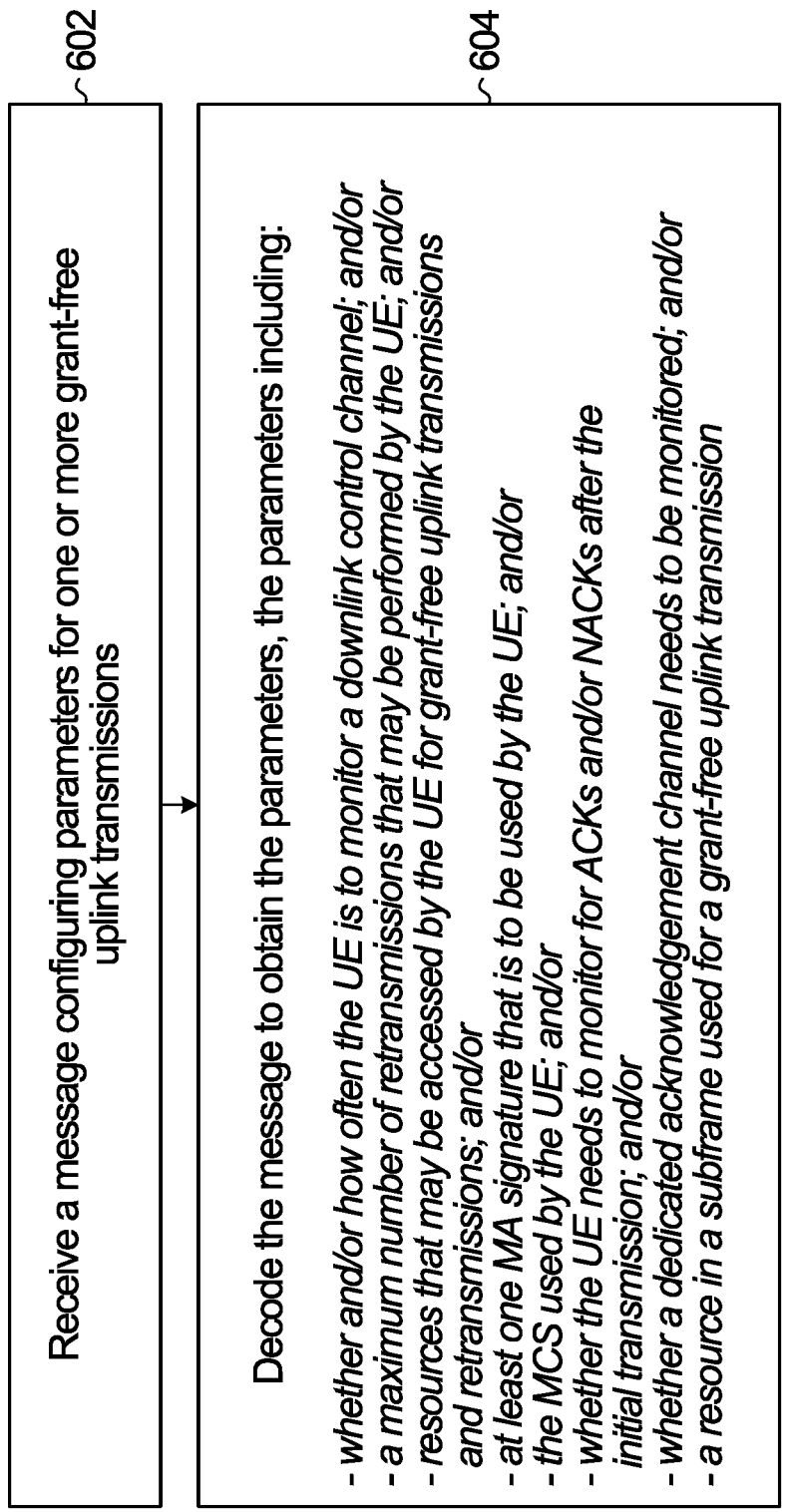
FIG. 19 is a method performed by a UE, according to one embodiment.

FIG. 19 is a method performed by UE 102a, according to one embodiment.

In step 602, the UE 102a receives from base station 100 a message configuring parameters for one or more grant-free uplink communications.

In step 604, the UE 102a decodes the message to obtain the parameters. The parameters include: whether and/or how often the UE is to monitor a downlink control channel; and/or a maximum number of retransmissions that may be performed by the UE; and/or resources that may be accessed by the UE for grant-free uplink transmissions and retransmissions; and/or at least one MA signature that is to be used by the UE; and/or the MCS used by the UE; and/or whether the UE needs to monitor for ACKs and/or NACKs after the initial transmission, and/or whether a dedicated acknowledgement channel needs to be monitored; and/or a resource in a subframe used for a grant-free uplink transmission.

HARQ Feedback

Many different HARQ feedback scenarios are provided above for grant-free uplink transmissions. The following applies to all of the scenarios above, whether there is continued repetition or not, or whether the grant-free uplink transmission is an initial transmission or a retransmission.

A TB is sent from the UE 102a to the base station 100 using a grant-free uplink transmission. In response, HARQ feedback (e.g. an ACK/NACK, a grant, etc.) for the grant-free uplink transmission is provided by the base station 100 to the UE 102a. In some embodiments, an acknowledgment/indication of successful receipt of the TB (e.g. an ACK) is in the form of an uplink grant from the base station 100. As described earlier, in some embodiments the ACK/NACK feedback may contain a HARQ process number (or HARQ process ID, or any attributes that identify the HARQ process number or TB index, e.g., MA signature index or grant-free access region index or combination of the two), which is used to identify which TB the ACK/NACK is meant for if there are multiple TBs transmitted. The HARQ process ID may be implicitly or explicitly signalled to the base station 100 in the grant-free uplink transmission from UE 102a. An example of implicit signaling is if the HARQ process ID is identifiable to the base station 100 based on the MA signature used by the UE 102a in the grant-free uplink transmission. The MA signature may be a reference signal or a codebook/signature/sequence used for a multiple access (MA) scheme, or any other attributes described earlier. For example, if a MA scheme uses two different codebooks to transmit two TBs (corresponding to two HARQ processes). The base station 100 identifies the codebook through activity detection. Then, the base station 100 may indicate the codebook index or the corresponding HARQ process index in its grant, which identifies the TB that the ACK is for. In some embodiments, the HARQ process ID may be able to be implicitly identified by the base station 100 through different grant-free access regions. For example, if a UE 102a is configured to be able to access two grant-free access regions in one time slot. The UE 102a may transmit two TBs that correspond to two different HARQ processes. In the uplink grant from the base station 100, the grant access region index or HARQ process ID may be indicated implicitly or explicitly, such that the UE 102a can identify which TB the ACK is for. An example of explicit signaling is to have a field in the grant-free uplink message that indicates the HARQ process ID. The HARQ ID may be protected more robustly such that the base station 100 can identify it even if it may not be able to successfully decode the data.

For all the HARQ feedback (ACK/NACK and/or grant) signaling, a UE's continuous grant-free repetitions may be optionally stopped early by a grant or optionally stopped early by an ACK before finishing the K repetitions. For example, if the UE received an ACK during the K repetitions, the UE may stop further repetitions if the number of repetitions has not reached K. In some other scenarios, the UE may perform continuous repetition until either the repetition reaches K or an uplink grant is received. The ACK can be in any of the signaling formats described in this disclosure (e.g. it can be a group-common DCI or UE specific DCI). If a scheduling grant is received during or after K repetitions, which schedules a retransmission of the same TB, then the UE will switch to grant-based retransmission of the TB in the resource configured in the scheduling grant.

In some embodiments, if the UE finishes K repetitions of a TB, and the UE has not received HARQ feedback (e.g. an ACK/NACK or grant) yet, the UE may wait for HARQ feedback (ACK/NACK or grant). If the UE does not receive an ACK or grant from the base station within a predefined window T1 after the K repetitions are transmitted, then the UE may assume NACK and perform grant-free retransmissions of the TB. Grant-free retransmissions may be done on configured grant-free resources. Grant-free retransmissions may include another set of K repetitions. In some other embodiments, if the UE does not receive a NACK or grant from the base station within the predefined/configured window T1 after the K repetitions, the UE may assume ACK and not to perform any further retransmissions until being further scheduled. In some other embodiments, it is up to UE's implementation whether to perform further grant-free retransmissions if no HARQ feedback is received within the predefined time window after the K repetitions. There may be another predefined/configured time window T2 (starting from the time of initial grant-free transmission) or maximum number of grant-free retransmissions N a UE can perform such that if the time window is reached or the maximum number of grant-free retransmissions are performed by the UE, then the UE should not perform any more grant-free retransmission/repetition without feedback from the base station. The parameters T1, T2 or N can be predefined or configured in UE specific RRC signaling.

In some embodiments, the UE may flush the buffer of the TB immediately if an ACK is received for the TB during or after the K repetitions. The ACK can be in any of the signaling forms described in the disclosure. In some other embodiments, the UE may simply hold off further repetition/retransmission of the same TB when an ACK is received. The UE may only flush the HARQ buffer of the TB of a grant-free transmission if an uplink grant is received that schedules a new TB that is using the same HARQ process (or HARQ process ID) of the TB. In some embodiments, if the UE does not receive a NACK or grant from the base station within the predefined/configured window T1 after finishing transmission of the K repetitions, the UE may assume ACK and flush the buffer of the TB, or the UE may assume ACK and not flush the buffer and not perform any further retransmission until being further scheduled.

If grant-free retransmission is to be performed by the UE after not receiving any feedback within a window of K repetitions, the UE may perform the grant-free retransmission on any of the grant-free resources regardless of the corresponding HARQ process ID. In some other embodiments, the UE may only be permitted to perform grant-free retransmission on a grant-free resource that is mapped to the same HARQ process ID of the grant-free initial transmission. The described procedure also works for the case where K=1.

In one uplink grant-free transmission mode, the UE can perform grant-free transmission after RRC signaling without DCI signaling/activation. The UE first performs an initial access process. The base station then selects the grant-free transmission resource for the UE and configures the UE via indicating the grant-free transmission resource through RRC signaling. The resource may include, but is not limited to, time, frequency resource, reference signal information, MCS/TBS information, power control parameters, periodicity and offset of the resource, grant-free RNTI, repetition number K (K>=1) etc. After RRC signaling, the UE has obtained the uplink transmission resources and can then perform uplink transmission without any DCI signaling. After the first batch of data arrives at the UE, the UE can then perform initial grant-free transmission of the first batch of data using the assigned grant-free transmission resources. In some embodiments, the UE operating in grant-free mode ("a grant-free UE") may not monitor the DCI before performing an initial grant-free transmission as it does not require a DCI activation to be able to perform grant-free transmission. A UE performing the initial grant-free transmission of the data at time n may only start monitoring DCI at time n+t_a, where t_a is the time the UE starts monitoring DCI after initial transmission. The unit of the time can be a slot, a subframe, a mini-slot or any time unit measure. t_a can be a predefined value or it can be configured by the network and sent to the UE, e.g., via UE specific RRC signaling. If t_a is predefined, it can be set as the earliest time that the UE is expected to receive a DCI feedback after the initial grant-free transmission. In some embodiments, t_a=0 or 1, i.e., the UE may immediately check the DCI after the initial grant-free transmission or check the DCI in the next slot. The DCI can be UE specific and/or group-common DCI and can be used to transmit ACK/NACK and/or an uplink grant. In some embodiments, the UE only monitors DCI or only monitors ACK/NACK after the K repetition is finished. Assume the K repetitions of the grant-free transmission is finished at time m and the UE may only start to monitor DCI or monitor ACK/NACK at time m+t_b, where t_b can also be predefined or configured in RRC signaling. The UE may optionally stop monitoring DCI at a time window after K repetition finishes, e.g., if the K repetition finishes at time m, the UE may stop monitoring the DCI at time m+t_c, where t_c can be predefined or configured in RRC signaling.

If a UE assumes an ACK after not receiving any HARQ feedback or grant within a window T1 after K repetitions, the UE may stop further repetition/retransmission until further signaling. In some embodiments, t_c is the same as T1, i.e., the UE stops monitoring DCI at time m+T1, so only one of them is predefined or configured in RRC signaling. In some other embodiments, the UE assumes NACK after not receiving any HARQ feedback or grant within a window T1 and starts to perform autonomous retransmission/repetition of the TB until an ACK or grant is received or until a maximum number of retransmissions N or maximum retransmission time T2 (starting from initial grant-free transmission time n) is received as described earlier. The UE may stop monitoring DCI after n+T2 is reached or at time t_c after the maximum number of retransmissions N is reached. After stopping monitoring DCI for the transmission, the UE may monitor the DCI again after t_a time of the next initial grant-free transmission.

In some embodiments, the UE may monitor DCI all the time before or after initial grant-free transmission as there may be other functions (e.g. supported grant-based transmission) that requires DCI signaling. In some embodiments, the UE does not monitor DCI every TTi, but instead the UE may only monitor DCI every T_m TTi, where T_m can be predefined or configured in RRC signaling. This can also apply to the case where the UE only starts monitoring DCI at time t_a after the initial grant-free transmission. In general, the time and whether to monitor DCI can be configured for each UE, e.g. through RRC signaling.

EXAMPLES

In view of, and in addition to the above, the following examples are disclosed.

Example 1

A method performed by a base station comprising: receiving a grant-free uplink transmission from a user equipment (UE) on uplink resources; performing activity detection to obtain the MA signature used by the UE in the grant-free uplink transmission; attempting to decode data in the grant-free uplink transmission; transmitting, in a downlink acknowledgement channel, feedback comprising an ACK or a NACK; wherein an orthogonal sequence used to convey the feedback and/or a time-frequency location of the feedback is based on at least one of the MA signature and the uplink resources.

Example 2

The method of example 1, wherein the downlink acknowledgement channel is a PHICH-like channel.

Example 3

The method of example 1 or example 2, wherein the orthogonal sequence used to convey the feedback is based on the MA signature, and the time-frequency location of the feedback is based on the uplink resources.

Example 4

The method of any one of examples 1 to 3, wherein feedback timing on the downlink acknowledgement channel has a fixed relationship with grant-free resource access timing used to send the grant-free uplink transmission.

Example 5

The method of any one of examples 1 to 4, further comprising generating the feedback by performing operations comprising: obtaining one bit representing the ACK or the NACK; repeating the bit to obtain a plurality of bits; modulating the plurality of bits to obtain symbols; and multiplying the symbols by the orthogonal sequence.

Example 6

A base station comprising: a processor; and a computer readable storage medium storing programming for execution by the processor, the programming including instructions to perform steps in accordance with a method in any one of examples 1 to 5.

Example 7

A base station comprising: at least one antenna to receive a grant-free uplink transmission from a user equipment (UE) on uplink resources; a grant-free transmission module to: (i) perform activity detection to obtain the MA signature used by the UE in the grant-free uplink transmission; (ii) attempt to decode data in the grant-free uplink transmission; and (iii) cause transmission of feedback comprising an ACK or a NACK, in a downlink acknowledgement channel; wherein an orthogonal sequence used to convey the feedback and/or a time-frequency location of the feedback is based on at least one of the MA signature and the uplink resources.

Example 8

A method performed by a user equipment (UE) comprising: transmitting a grant-free uplink transmission to a base station on uplink resources, the grant-free uplink transmission utilizing an MA signature; receiving feedback comprising an ACK or a NACK on a downlink acknowledgement channel; wherein an orthogonal sequence used to convey the feedback and/or a time-frequency location of the feedback is based on at least one of the MA signature and the uplink resources.

Example 9

The method of example 8, wherein the downlink acknowledgement channel is a PHICH-like channel.

Example 10

The method of example 8 or example 9, wherein the orthogonal sequence used to convey the feedback is based on the MA signature, and the time-frequency location of the feedback is based on the uplink resources.

Example 11

The method of any one of examples 8 to 10, wherein feedback timing on the downlink acknowledgement channel has a fixed relationship with grant-free resource access timing used to send the grant-free uplink transmission.

Example 12

A user equipment (UE) comprising: a processor; and a computer readable storage medium storing programming for execution by the processor, the programming including instructions to perform steps in accordance with a method in any one of examples 8 to 11.

Example 13

A user equipment (UE) comprising: at least one antenna to transmit a grant-free uplink transmission to a base station on uplink resources, the grant-free uplink transmission utilizing an MA signature; a decoder to decode feedback corresponding to the grant-free uplink transmission and received on a downlink acknowledgement channel, the feedback comprising an ACK or a NACK; wherein an orthogonal sequence used to convey the feedback and/or a time-frequency location of the feedback is based on at least one of the MA signature and the uplink resources.

Example 14

A method performed by a base station comprising: receiving a first grant-free uplink transmission from a first user equipment (UE); receiving a second grant-free uplink transmission from a second UE; transmitting a group ACK/NACK message having a payload that includes at least an ACK or a NACK for the first grant-free uplink transmission and an ACK or a NACK for the second grant-free uplink transmission.

Example 15

The method of example 14, wherein the payload is a word comprising one bit indicating the ACK or the NACK for the first grant-free uplink transmission and another bit indicating the ACK or the NACK for the second grant-free uplink transmission.

Example 16

The method of example 14, wherein the payload is a word comprising a first pair of bits corresponding to the first grant-free uplink transmission and a second pair of bits corresponding to the second grant-free uplink transmission, wherein each pair of bits includes a bit indicating whether activity detection was successful and another bit indicating whether data decoding was successful.

Example 17

The method of any one of examples 14 to 16, wherein one position index in the payload corresponds to the first UE, and another position index in the payload corresponds to the second UE.

Example 18

The method of example 14, wherein the payload comprises a plurality of UE IDs, and wherein the presence of a UE ID in the payload indicates an ACK for a UE corresponding to that UE ID.

Example 19

The method of any one of examples 14 to 18, wherein the payload includes ACKs/NACKs for multiple HARQ process IDs.

Example 20

The method of any one of examples 14 to 19, wherein the payload is sent in a downlink control channel and is scrambled by a group ID.

Example 21

The method of any one of examples 14 to 19, wherein the payload is sent in a downlink data channel.

Example 22

A base station comprising: a processor; and a computer readable storage medium storing programming for execution by the processor, the programming including instructions to perform steps in accordance with a method in any one of examples 14 to 21.

Example 23

A base station comprising: at least one antenna to receive a first grant-free uplink transmission from a first user equipment (UE) and receive a second grant-free uplink transmission from a second UE; a grant-free transmission module to generate a group ACK/NACK message having a payload that includes at least an ACK or a NACK for the first grant-free uplink transmission and an ACK or a NACK for the second grant-free uplink transmission.

Example 24

A method performed by a first user equipment (UE) comprising: sending a first grant-free uplink transmission to a base station; receiving a group ACK/NACK message having a payload that includes at least an ACK or a NACK for the first grant-free uplink transmission and an ACK or a NACK for a second grant-free uplink transmission from a second UE.

Example 25

The method of example 24, wherein the payload is a word comprising one bit indicating the ACK or the NACK for the first grant-free uplink transmission and another bit indicating the ACK or the NACK for the second grant-free uplink transmission.

Example 26

The method of example 24, wherein the payload is a word comprising a first pair of bits corresponding to the first grant-free uplink transmission and a second pair of bits corresponding to the second grant-free uplink transmission, wherein each pair of bits includes a bit indicating whether activity detection was successful and another bit indicating whether data decoding was successful.

Example 27

The method of any one of examples 24 to 26, wherein one position index in the payload corresponds to the first UE, and another position index in the payload corresponds to the second UE.

Example 28

The method of example 24, wherein the payload comprises a plurality of UE IDs, and wherein the presence of a UE ID in the payload indicates an ACK for a UE corresponding to that UE ID.

Example 29

The method of any one of examples 24 to 28, wherein the payload includes ACKs/NACKs for multiple HARQ process IDs.

Example 30

The method of any one of examples 24 to 29, wherein the payload is received in a downlink control channel and is scrambled by a group ID.

Example 31

The method of any one of examples 24 to 29, wherein the payload is received in a downlink data channel.

Example 32

A user equipment (UE) comprising: a processor; and a computer readable storage medium storing programming for execution by the processor, the programming including instructions to perform steps in accordance with a method in any one of examples 24 to 31.

Example 33

A first user equipment (UE) comprising: at least one antenna to transmit a first grant-free uplink transmission to a base station; a decoder to decode a group ACK/NACK message having a payload that includes at least an ACK or a NACK for the first grant-free uplink transmission and an ACK or a NACK for a second grant-free uplink transmission from a second UE.

Example 34

A method performed by a base station comprising: receiving a first grant-free uplink transmission from a first user equipment (UE); receiving a second grant-free uplink transmission from a second UE; transmitting, to the first UE and to the second UE, a group ACK/NACK message having a payload that indicates an ACK or a NACK corresponding to the first grant-free uplink transmission and an ACK or a NACK corresponding to the second grant-free uplink transmission.

Example 35

The method of example 34, wherein prior to transmitting the group ACK/NACK message, the base station attempts to decode first data in the first grant-free uplink transmission and second data in the second grant-free uplink transmission.

Example 36

The method of example 34 or 35, wherein the group ACK/NACK includes a grant that grants an uplink transmission to the first UE.

Example 37

The method of example 36, wherein the grant grants a retransmission of data sent in the first grant-free uplink transmission.

Example 38

The method of example 36, wherein the grant implicitly indicates the NACK corresponding to the first grant-free uplink transmission by scheduling a retransmission of data sent in the first grant-free uplink transmission.

Example 39

The method of example 36, wherein the grant implicitly indicates the ACK corresponding to the first grant-free uplink transmission by scheduling a transmission of new data.

Example 40

The method of any one of examples 34 to 39, wherein the first UE and the second UE are in a group having a group identifier (ID), and wherein the group ACK/NACK is associated with the group ID.

Example 41

The method of example 40, wherein the group ID is a radio network temporary identifier (RNTI).

Example 42

The method of example 40 or 41, wherein the group ID is a function of grant-free resources at which the first grant-free uplink transmission was sent.

Example 43

The method of example 42, wherein the group ID is a function of a time unit at which the first grant-free uplink transmission was sent.

Example 44

The method of example 43, wherein the time unit is a time slot.

Example 45

The method of example 43, wherein the group ID is also a function of the frame number at which the first grant-free uplink transmission was sent.

Example 46

The method of example 42, wherein the group ID is a function of a frequency location at which the first grant-free uplink transmission was sent.

Example 47

The method of example 42, wherein the group ID is a function of at least one of a time unit and frequency location at which the first grant-free uplink transmission was sent.

Example 48

The method of example 42, wherein the group ID is a function of at least one of a subframe, slot number, and frame number at which the first grant-free uplink transmission was sent.

Example 49

The method of example 48, wherein the slot is a time slot.

Example 50

The method of any one of examples 40 to 49, wherein the group ID is configured in higher layer signaling.

Example 51

The method of example 50, further comprising signaling the group ID to the first UE and to the second UE in radio resource control (RRC) signaling.

Example 52

The method of any one of examples 40 to 50, wherein the group ACK/NACK is transmitted in group-common downlink control information (DCI).

Example 53

The method of example 52, wherein the group-common DCI is sent in a downlink control channel in a search space defined by the group ID.

Example 54

The method of example 52 or 53, wherein a cyclic redundancy check (CRC) of the group-common DCI is masked by the group ID.

Example 55

The method of example 54, comprising the base station scrambling the CRC of the group-common DCI using the group ID.

Example 56

The method of any one of examples 34 to 55, wherein the payload is a word comprising one bit indicating the ACK or the NACK corresponding to the first grant-free uplink transmission and another bit indicating the ACK or the NACK corresponding to the second grant-free uplink transmission.

Example 57

The method of any one of examples 34 to 55, wherein the payload is a word comprising a first pair of bits corresponding to the first grant-free uplink transmission and a second pair of bits corresponding to the second grant-free uplink transmission, wherein each pair of bits includes a bit indicating whether activity detection was successful and another bit indicating whether data decoding was successful.

Example 58

The method of any one of examples 34 to 55, wherein one position in the payload corresponds to the first UE, and another position in the payload corresponds to the second UE.

Example 59

The method of example 58, wherein the position corresponding to the first UE is based on an MA signature.

Example 60

The method of example 59, wherein the position corresponding to the first UE is known by the first UE based on the MA signature and grant-free resources used by the first UE to send the first grant-free uplink transmission.

Example 61

The method of example 58, wherein the position corresponding to the first UE is signalled to the first UE prior to the first UE sending the first grant-free uplink transmission.

Example 62

The method of example 61, wherein the position corresponding to the first UE is signalled using higher layering signaling.

Example 63

The method of example 62, wherein the higher layer signaling is RRC signaling.

Example 64

The method of any one of examples 34 to 63, wherein the group ACK/NACK indicates an ACK for all received packets successfully decoded in one TTI or one time slot or one subframe.

Example 65

The method of any one of examples 34 to 63, wherein the payload comprises a plurality of UE IDs, and wherein the presence of a UE ID in the payload indicates an ACK for a UE corresponding to that UE ID.

Example 66

The method of any one of examples 34 to 63, wherein the payload includes ACKs/NACKs for multiple HARQ process IDs.

Example 67

The method of example 66, wherein a HARQ process ID associated with data in the first grant-free uplink transmission is explicitly or implicitly indicated in the first grant-free uplink transmission.

Example 68

The method of example 66, wherein data in the first grant-free uplink transmission is associated with a HARQ process ID, and wherein a position, in the payload, of the ACK or the NACK corresponding to the first grant-free uplink transmission is based on both a position index corresponding to the first UE and the HARQ process ID.

Example 69

The method of example 66, wherein the first UE is assigned multiple positions in the payload, each one of the positions associated with a respective MA signature and/or HARQ process ID.

Example 70

The method of any one of examples 34 to 69, wherein the first grant-free uplink transmission is one of a plurality of uplink repetitions of a transport block, and wherein the group ACK/NACK is used to terminate the uplink repetitions.

Example 71

The method of example 70, wherein the group ACK/NACK indicates an ACK corresponding to the first grant-free uplink transmission in order to terminate the uplink repetitions.

Example 72

The method of any one of examples 34 to 71, wherein there is a fixed timing relationship between: (i) uplink time-frequency resources at which the first grant-free uplink transmission and the second grant-free uplink transmission were sent, and (ii) downlink time-frequency resources on which the group ACK/NACK is sent.

Example 73

The method of any one of examples 34 to 71, wherein there is a fixed timing relationship between: (i) a subframe or time unit during which the first grant-free uplink transmission and the second grant-free uplink transmission were sent, and (ii) a subframe or time unit during which the group ACK/NACK is sent.

Example 74

The method of any one of examples 34 to 71, wherein data in the first grant-free uplink transmission is associated with a HARQ process ID, wherein an indication of the HARQ process ID is present in downlink control information, and wherein the indication of the HARQ process ID is used by the first UE to identify that the data is being acknowledged.

Example 75

The method of example 34, wherein the payload is sent in a downlink data channel.

Example 76

The method of example 75, further comprising transmitting downlink control information that indicates where to find the payload in the downlink data channel.

Example 77

The method of example 34, wherein the payload includes a portion corresponding to the first grant-free uplink transmission, wherein the portion has a location in the payload mapped to an MA signature utilized by the first grant-free uplink transmission, and wherein the portion includes at least one of: a scheduling grant for the first UE; timing advanced (TA) information; a UE ID of the first UE; a temporary identity to be used for further communication between the first UE and the base station; the ACK or the NACK corresponding to the first grant-free uplink transmission.

Example 78

The method of example 57, wherein the first grant-free uplink transmission carries first data, and wherein the method further comprises: when the first pair of bits indicates that activity detection was not successful, then receiving a retransmission of the first data from the first UE, the retransmission at a same redundancy version (RV) as the first grant-free uplink transmission.

Example 79

The method of example 57, wherein the first grant-free uplink transmission carries first data, and wherein the method further comprises: when the first pair of bits indicates that activity detection was successful, but that data decoding was not successful, then receiving a retransmission of the first data from the first UE, the retransmission data at a different RV from the first grant-free uplink transmission.

Example 80

A base station comprising: a receiver to receive a first grant-free uplink transmission from a first user equipment (UE), and to receive a second grant-free uplink transmission from a second UE; a grant-free transmission module to generate a group ACK/NACK message having a payload that indicates an ACK or a NACK corresponding to the first grant-free uplink transmission and an ACK or a NACK corresponding to the second grant-free uplink transmission.

Example 81

A base station comprising: a processor; and a computer readable storage medium storing programming for execution by the processor, the programming including instructions that, when executed by the processor, cause the base station to perform the method of any one of examples 34 to 79.

Example 82

A method performed by a user equipment (UE) comprising: transmitting a first grant-free uplink transmission to a base station; receiving a group ACK/NACK message having a payload that indicates an ACK or a NACK corresponding to the first grant-free uplink transmission and an ACK or a NACK corresponding to a second grant-free uplink transmission from a second UE.

Example 83

The method of example 82, wherein the first UE and the second UE are in a group having a group identifier (ID), and wherein the group ACK/NACK is associated with the group ID.

Example 84

The method of example 83, wherein the group ID is a radio network temporary identifier (RNTI).

Example 85

The method of example 83 or 84, wherein the group ID is a function of grant-free resources at which the first grant-free uplink transmission is sent.

Example 86

The method of example 85, wherein the group ID is a function of a time unit at which the first grant-free uplink transmission is sent.

Example 87

The method of example 86, wherein the time unit is a time slot.

Example 88

The method of example 86 or 87, wherein the group ID is also a function of the frame number at which the first grant-free uplink transmission is sent.

Example 89

The method of example 85, wherein the group ID is a function of a frequency location at which the first grant-free uplink transmission is sent.

Example 90

The method of example 85, wherein the group ID is a function of at least one of a time unit and frequency location at which the first grant-free uplink transmission is sent.

Example 91

The method of example 85, wherein the group ID is a function of at least one of a subframe, slot, and frame number at which the first grant-free uplink transmission is sent.

Example 92

The method of example 91, wherein the slot is a time slot.

Example 93

The method of any one of examples 83 to 92, wherein the group ID is configured in higher layer signaling.

Example 94

The method of example 93, further comprising receiving, from the base station, an indication of the group ID in radio resource control (RRC) signaling.

Example 95

The method of any one of examples 83 to 94, wherein the group ACK/NACK is received in group-common downlink control information (DCI).

Example 96

The method of example 95, wherein the group-common DCI is received in a downlink control channel in a search space defined by the group ID.

Example 97

The method of example 95 or 96, wherein a cyclic redundancy check (CRC) of the group-common DCI is masked by the group ID.

Example 98

The method of example 97, further comprising unscrambling the CRC of the group-common DCI using the group ID.

Example 99

The method of any one of examples 82 to 98, wherein the payload is a word comprising one bit indicating the ACK or the NACK corresponding to the first grant-free uplink transmission and another bit indicating the ACK or the NACK corresponding to the second grant-free uplink transmission.

Example 100

The method of any one of examples 82 to 98, wherein the payload is a word comprising a first pair of bits corresponding to the first grant-free uplink transmission and a second pair of bits corresponding to the second grant-free uplink transmission, wherein each pair of bits includes a bit indicating whether activity detection was successful and another bit indicating whether data decoding was successful.

Example 101

The method of any one of examples 82 to 98, wherein one position in the payload corresponds to the first UE, and another position in the payload corresponds to the second UE.

Example 102

The method of example 101, wherein the position corresponding to the first UE is based on an MA signature.

Example 103

The method of example 102, wherein the position corresponding to the first UE is known by the first UE based on the MA signature and grant-free resources used by the first UE to send the first grant-free uplink transmission.

Example 104

The method of example 101, wherein the position corresponding to the first UE is signalled to the first UE prior to the first UE sending the first grant-free uplink transmission.

Example 105

The method of example 104, wherein the position corresponding to the first UE is signalled using higher layering signaling.

Example 106

The method of example 105, wherein the higher layer signaling is RRC signaling.

Example 107

The method of any one of examples 82 to 106, wherein the group ACK/NACK indicates an ACK for all received packets successfully decoded in one TTI or one time slot or one subframe.

Example 108

The method of any one of examples 82 to 107, wherein the payload comprises a plurality of UE IDs, and wherein the presence of a UE ID in the payload indicates an ACK for a UE corresponding to that UE ID.

Example 109

The method of example 82, wherein the payload includes ACKs/NACKs for multiple HARQ process IDs.

Example 110

The method of example 109, wherein a HARQ process ID is associated with data in the first grant-free uplink transmission, and wherein the HARQ process ID is explicitly or implicitly indicated in the first grant-free uplink transmission.

Example 111

The method of example 109, wherein a HARQ process ID is associated with data in the first grant-free uplink transmission, and wherein a position, in the payload, of the ACK or the NACK corresponding to the first grant-free uplink transmission is based on both a position index corresponding to the first UE and the HARQ process ID.

Example 112

The method of example 109, wherein the first UE is assigned multiple positions in the payload, each one of the positions associated with a respective MA signature and/or HARQ process ID.

Example 113

The method of any one of examples 82 to 112, wherein the first grant-free uplink transmission is one of a plurality of uplink repetitions of a transport block, and wherein the group ACK/NACK is used to terminate the uplink repetitions.

Example 114

The method of example 113, wherein the group ACK/NACK indicates an ACK corresponding to the first grant-free uplink transmission in order to terminate the uplink repetitions.

Example 115

The method of any one of examples 82 to 114, wherein there is a fixed timing relationship between: (i) uplink time-frequency resources at which the first grant-free uplink transmission is sent, and (ii) downlink time-frequency resources on which the group ACK/NACK is received.

Example 116

The method of any one of examples 82 to 114, wherein there is a fixed timing relationship between: (i) a subframe or time unit during which the first grant-free uplink transmission is sent, and (ii) a subframe or time unit during which the group ACK/NACK is received.

Example 117

The method of any one of examples 82 to 116, wherein a HARQ process ID is associated with data in the first grant-free uplink transmission, an indication of the HARQ process ID is present in downlink control information, and the indication of the HARQ process ID is used by the first UE to identify that the data is being acknowledged.

Example 118

The method of any one of examples 82 to 117, wherein the payload is received in a downlink data channel.

Example 119

The method of example 118, further comprising receiving downlink control information that indicates where to find the payload in the downlink data channel.

Example 120

The method of any one of examples 82 to 119, wherein the payload includes a portion corresponding to the first grant-free uplink transmission, wherein the portion has a location in the payload mapped to an MA signature utilized by the first grant-free uplink transmission, and wherein the portion includes at least one of: a scheduling grant for the first UE; timing advanced (TA) information; a UE ID of the first UE; a temporary identity to be used for further communication between the first UE and the base station; the ACK or the NACK corresponding to the first grant-free uplink transmission.

Example 121

The method of example 95, further comprising decoding the group-common DCI, including performing a CRC check using the group ID.

Example 122

The method of example 121, wherein the group ID is a RNTI.

Example 123

The method of example 95, further comprising searching a search space in a downlink control channel using the group ID to obtain the group-common DCI.

Example 124

The method of example 123, wherein the search space that is searched is a function of the uplink resources used to transmit the first grant-free uplink transmission.

Example 125

The method of example 100, further comprising: when the first pair of bits indicates that activity detection was not successful, then retransmitting data from the first grant-free uplink transmission at a same redundancy version (RV) as the first grant-free uplink transmission.

Example 126

The method of example 100, further comprising: when the first pair of bits indicates that activity detection was successful, but that data decoding was not successful, then retransmitting data from the first grant-free uplink transmission at a different RV from the first grant-free uplink transmission.

Example 127

The method of any one of examples 82 to 126, wherein the group ACK/NACK includes a grant that grants an uplink transmission to the UE.

Example 128

The method of example 127, wherein the grant grants a retransmission of data sent in the first grant-free uplink transmission.

Example 129

A user equipment (UE) comprising: a transmitter to transmit a first grant-free uplink transmission to a base station; a receiver to receive a group ACK/NACK message having a payload that indicates an ACK or a NACK corresponding to the first grant-free uplink transmission and an ACK or a NACK corresponding to a second grant-free uplink transmission from a second UE.

Example 130

A UE comprising: a processor; and a computer readable storage medium storing programming for execution by the processor, the programming including instructions that, when executed by the processor, cause the UE to perform the method of any one of examples 82 to 128.

Example 131

A method performed by a base station comprising: receiving a grant-free uplink transmission from a user equipment (UE), the grant-free uplink transmission carrying data corresponding to a first transport block; transmitting a grant to the UE, wherein the grant schedules a retransmission of the first transport block when decoding of the first transport block fails or schedules a transmission of a second transport block when decoding of the first transport block is successful.

Example 132

The method of example 131, wherein the grant does not include an explicit ACK or an explicit NACK for the first transport block.

Example 133

The method of example 131 or 132, wherein the grant is sent in downlink control information (DCI).

Example 134

The method of any one of examples 131 to 133, wherein the grant is sent as part of a group ACK/NACK.

Example 135

The method of any one of examples 131 to 134, wherein prior to transmitting the grant, the base station attempts to decode the first transport block based on the data in the grant-free uplink transmission.

Example 136

The method of any one of examples 131 to 135, wherein the grant implicitly indicates a NACK for the first transport block by scheduling the retransmission of the first transport block.

Example 137

The method of any one of examples 131 to 135, wherein the grant implicitly indicates an ACK for the first transport block by scheduling the transmission of the second transport block.

Example 138

The method of any one of examples 131 to 137, wherein the grant includes a HARQ process ID corresponding to the first transport block.

Example 139

The method of any one of examples 131 to 138, wherein the grant-free uplink transmission is one of a plurality of uplink repetitions of the first transport block, and wherein the grant terminates the uplink repetitions.

Example 140

A base station comprising: a receiver to receive a grant-free uplink transmission from a user equipment (UE), the grant-free uplink transmission carrying data corresponding to a first transport block; a grant-free transmission module to generate a grant for the UE; wherein the grant schedules a retransmission of the first transport block when decoding of the first transport block fails or schedules a transmission of a second transport block when decoding of the first transport block is successful.

Example 141

A base station comprising: a processor; and a computer readable storage medium storing programming for execution by the processor, the programming including instructions that, when executed by the processor, cause the base station to perform the method of any one of examples 131 to 139.

Example 142

A method performed by a user equipment (UE) comprising: transmitting a grant-free uplink transmission to a base station, the grant-free uplink transmission carrying data corresponding to a first transport block; receiving a grant from the base station, wherein the grant schedules a retransmission of the first transport block when decoding of the first transport block failed at the base station or schedules a transmission of a second transport block when decoding of the first transport block was successful at the base station; transmitting an uplink transmission according to the grant.

Example 143

The method of example 142, wherein in response to transmitting the grant-free uplink transmission: an explicit ACK or an explicit NACK for the first transport block is not received by the UE.

Example 144

The method of example 142 or 143, wherein the grant is received in downlink control information (DCI).

Example 145

The method of any one of examples 142 to 144, wherein the grant is received as part of a group ACK/NACK.

Example 146

The method of any one of examples 142 to 145, wherein the grant implicitly indicates a NACK for the first transport block by scheduling the retransmission of the first transport block.

Example 147

The method of any one of examples 142 to 145, wherein the grant implicitly indicates an ACK for the first transport block by scheduling the transmission of the second transport block.

Example 148

The method of any one of examples 142 to 147, wherein the grant includes a HARQ process ID corresponding to the first transport block.

Example 149

The method of any one of examples 142 to 148, wherein the grant-free uplink transmission is one of a plurality of uplink repetitions of the first transport block, and wherein the grant terminates the uplink repetitions.

Example 150

A user equipment (UE) comprising: a grant-free transmission module to generate a message to be transmitted to a base station via a grant-free uplink transmission, the message carrying data corresponding to a first transport block; a receiver to receive a grant from the base station, wherein the grant schedules a retransmission of the first transport block when decoding of the first transport block failed at the base station or schedules a transmission of a second transport block when decoding of the first transport block was successful at the base station; a transmitter to transmit an uplink transmission according to the grant.

Example 151

A UE comprising: a processor; and a computer readable storage medium storing programming for execution by the processor, the programming including instructions that, when executed by the processor, cause the UE to perform the method of any one of examples 142 to 149.

Example 152

A method performed by a base station comprising: receiving a grant-free uplink transmission from a user equipment (UE) on uplink resources; transmitting, in a downlink acknowledgement channel, feedback corresponding to the grant-free uplink transmission, the feedback comprising an ACK or a NACK; wherein an orthogonal sequence used to convey the feedback and/or a time-frequency location of the feedback is based on at least one of the MA signature and the uplink resources.

Example 153

The method of example 152, wherein the orthogonal sequence used to convey the feedback is based on the MA signature, and the time-frequency location of the feedback is based on the uplink resources.

Example 154

The method of example 152 or 153, wherein feedback timing on the downlink acknowledgement channel has a fixed relationship with grant-free resource access timing used to send the grant-free uplink transmission.

Example 155

The method of any one of examples 152 to 154, further comprising generating the feedback by performing operations comprising: obtaining one bit representing the ACK or the NACK repeating the bit to obtain a plurality of bits; modulating the plurality of bits to obtain symbols; and multiplying the symbols by the orthogonal sequence.

Example 156

The method of any one of examples 152 to 155, wherein the downlink acknowledgement channel is a PHICH-like channel.

Example 157

A base station comprising: a receiver to receive a grant-free uplink transmission from a user equipment (UE) on uplink resources; a grant-free transmission module to generate, for transmission in a downlink acknowledgement channel, feedback corresponding to the grant-free uplink transmission, the feedback comprising an ACK or a NACK; wherein an orthogonal sequence used to convey the feedback and/or a time-frequency location of the feedback is based on at least one of the MA signature and the uplink resources.

Example 158

A base station comprising: a processor; and a computer readable storage medium storing programming for execution by the processor, the programming including instructions that, when executed by the processor, cause the base station to perform the method of any one of examples 152 to 156.

Example 159

A method performed by a user equipment (UE) comprising: transmitting a grant-free uplink transmission to a base station on uplink resources, the grant-free uplink transmission utilizing an MA signature; receiving, on a downlink acknowledgement channel, feedback corresponding to the grant-free uplink transmission, the feedback comprising an ACK or a NACK; wherein an orthogonal sequence used to convey the feedback and/or a time-frequency location of the feedback is based on at least one of the MA signature and the uplink resources.

Example 160

The method of example 159, wherein the orthogonal sequence used to convey the feedback is based on the MA signature, and the time-frequency location of the feedback is based on the uplink resources.

Example 161

The method of example 159 or 160, wherein feedback timing on the downlink acknowledgement channel has a fixed relationship with grant-free resource access timing used to send the grant-free uplink transmission.

Example 162

The method of any one of examples 159 to 161, wherein the downlink acknowledgement channel is a PHICH-like channel.

Example 163

A user equipment (UE) comprising: a transmitter to transmit a grant-free uplink transmission to a base station on uplink resources, the grant-free uplink transmission utilizing an MA signature; a decoder to decode feedback corresponding to the grant-free uplink transmission and received on a downlink acknowledgement channel, the feedback comprising an ACK or a NACK; wherein an orthogonal sequence used to convey the feedback and/or a time-frequency location of the feedback is based on at least one of the MA signature and the uplink resources.

Example 164

A UE comprising: a processor; and a computer readable storage medium storing programming for execution by the processor, the programming including instructions that, when executed by the processor, cause the UE to perform the method of any one of examples 159 to 162.

Example 165

A method performed by a base station comprising: receiving, on uplink time-frequency resources, a grant-free uplink transmission from a user equipment (UE); transmitting, in downlink control information (DCI), feedback corresponding to the grant-free uplink transmission; wherein a CRC of the DCI is masked using an ID, and wherein the ID is a function of the uplink time-frequency resources on which the grant-free uplink transmission was received.

Example 166

A base station comprising: a processor; and a computer readable storage medium storing programming for execution by the processor, the programming including instructions that, when executed by the processor, cause the base station to perform the method of example 165.

Example 167

A method performed by UE comprising: transmitting, on uplink time-frequency resources, a grant-free uplink transmission to a base station; receiving, in downlink control information (DCI), feedback corresponding to the grant-free uplink transmission; wherein a CRC of the DCI is masked using an ID, and wherein the ID is a function of the uplink time-frequency resources on which the grant-free uplink transmission was sent.

Example 168

A UE comprising: a processor; and a computer readable storage medium storing programming for execution by the processor, the programming including instructions that, when executed by the processor, cause the UE to perform the method of example 167.

Example 169

A method performed by a base station comprising: transmitting, to a user equipment, an indication of a modulation and coding (MCS) scheme to be used by the UE for a grant-free uplink transmission; receiving the grant-free uplink transmission from the UE, the grant-free uplink transmission carrying data having the MCS.

Example 170

The method of example 169, wherein the indication is transmitted in radio resource control (RRC) signaling.

Example 171

The method of example 169 or 170, wherein the indication indicates an MCS hopping pattern to be used by the UE for a plurality of grant-free uplink transmissions.

Example 172

The method of example 171, wherein the MCS hopping pattern indicates that a first grant-free uplink transmission is to use a first MCS and a second grant-free uplink transmission is to use a second MCS, wherein the second MCS is lower than the first MCS.

Example 173

The method of example 172, wherein the first grant-free uplink transmission is a first repetition of a transport block and the second grant-free uplink transmission is a second repetition of the transport block.

Example 174

A base station comprising: a transmitter to transmit, to a user equipment, an indication of a modulation and coding (MCS) scheme to be used by the UE for a grant-free uplink transmission; a receiver to receive the grant-free uplink transmission from the UE, the grant-free uplink transmission carrying data having the MCS.

Example 175

A base station comprising: a processor; and a computer readable storage medium storing programming for execution by the processor, the programming including instructions that, when executed by the processor, cause the base station to perform the method of any one of examples 169 to 173.

Example 176

A method performed by a user equipment (UE) comprising: receiving, from a base station, an indication of a modulation and coding (MCS) scheme to be used by the UE for a grant-free uplink transmission; transmitting the grant-free uplink transmission to the base station, the grant-free uplink transmission carrying data having the MCS.

Example 177

The method of example 176, wherein the indication is received in radio resource control (RRC) signaling.

Example 178

The method of example 176 or 177, wherein the indication indicates an MCS hopping pattern to be used by the UE for a plurality of grant-free uplink transmissions.

Example 179

The method of example 178, wherein the MCS hopping pattern indicates that a first grant-free uplink transmission is to use a first MCS and a second grant-free uplink transmission is to use a second MCS, wherein the second MCS is lower than the first MCS.

Example 180

The method of example 179, wherein the first grant-free uplink transmission is a first repetition of a transport block and the second grant-free uplink transmission is a second repetition of the transport block.

Example 181

A user equipment (UE) comprising: a receiver to receive, from a base station, an indication of a modulation and coding (MCS) scheme to be used by the UE for a grant-free uplink transmission; a transmitter to transmit the grant-free uplink transmission to the base station, the grant-free uplink transmission carrying data having the MCS.

Example 182

A UE comprising: a processor; and a computer readable storage medium storing programming for execution by the processor, the programming including instructions that, when executed by the processor, cause the UE to perform the method of any one of examples 176 to 180.

Example 183

A method performed by a base station, the method comprising: receiving two uplink transmissions from a user equipment (UE) in a same time slot, the two uplink transmissions comprising a first uplink transmission received on first uplink time-frequency resources and a second uplink transmission received on second uplink time-frequency resources.

Example 184

The method of example 183, wherein the first uplink transmission carries a first transport block corresponding to a first HARQ process, and the second uplink transmission carries a second transport block corresponding to a second HARQ process.

Example 185

The method of example 184, wherein a HARQ process ID of the first HARQ process is implicitly identified by the first uplink time-frequency resources on which the first uplink transmission is received.

Example 186

A base station comprising: a receiver to receive two uplink transmissions from a user equipment (UE) in a same time slot, the two uplink transmissions comprising a first uplink transmission received on first uplink time-frequency resources and a second uplink transmission received on second uplink time-frequency resources.

Example 187

A base station comprising: a processor; and a computer readable storage medium storing programming for execution by the processor, the programming including instructions that, when executed by the processor, cause the base station to perform the method of any one of examples 183 to 185.

Example 188

A method performed by a user equipment (UE), the method comprising: transmitting two uplink transmissions to a base station in a same time slot, the two uplink transmissions comprising a first uplink transmission sent on first uplink time-frequency resources and a second uplink transmission sent on second uplink time-frequency resources.

Example 189

The method of example 188, wherein the first uplink transmission carries a first transport block corresponding to a first HARQ process, and the second uplink transmission carries a second transport block corresponding to a second HARQ process.

Example 190

The method of example 189, wherein a HARQ process ID of the first HARQ process is implicitly identified by the first uplink time-frequency resources on which the first uplink transmission is sent.

Example 191

A user equipment (UE) comprising: a transmitter to transmit two uplink transmissions to a base station in a same time slot, the two uplink transmissions comprising a first uplink transmission sent on first uplink time-frequency resources and a second uplink transmission sent on second uplink time-frequency resources.

Example 192

A UE comprising: a processor; and a computer readable storage medium storing programming for execution by the processor, the programming including instructions that, when executed by the processor, cause the UE to perform the method of any one of examples 188 to 190.

Example 193

A method performed by a base station comprising: receiving a first grant-free uplink transmission from a first user equipment (UE); receiving a second grant-free uplink transmission from a second UE; transmitting, to the first UE and to the second UE, a group ACK/NACK message, wherein the first UE and the second UE are in a group having a group identifier (ID), wherein the group ACK/NACK is associated with the group ID, and wherein the group ID is a function of at least one of a subframe, slot number, and frame number at which the first grant-free uplink transmission was sent.

Example 194

A method performed by a first UE comprising: transmitting a first grant-free uplink transmission to a base station; receiving a group ACK/NACK message directed to the first UE and a second UE, wherein the first UE and the second UE are in a group having a group identifier (ID), wherein the group ACK/NACK is associated with the group ID, and wherein the group ID is a function of at least one of a subframe, slot number, and frame number at which the first grant-free uplink transmission was sent.

Example 195

A method performed by a base station comprising: receiving a first grant-free uplink transmission from a first user equipment (UE); receiving a second grant-free uplink transmission from a second UE; transmitting, to the first UE and to the second UE, a group ACK/NACK message indicating an ACK or a NACK corresponding to the first grant-free uplink transmission and an ACK or a NACK corresponding to the second grant-free uplink transmission.

Example 196

The method of example 195, wherein the first UE and the second UE are in a group having a group identifier (ID), wherein the group ACK/NACK is associated with the group ID, and wherein the group ID is a function of grant-free resources at which the first grant-free uplink transmission was sent.

Example 197

The method of example 195, wherein the first UE and the second UE are in a group having a group ID, wherein the group ACK/NACK is associated with the group ID, wherein the group ACK/NACK is transmitted in group-common downlink control information (DCI), and wherein a cyclic redundancy check (CRC) of the group-common DCI is masked by the group ID.

Example 198

The method of example 197, wherein the group ID is a function of at least one of a time unit and frequency location at which the first grant-free uplink transmission was sent.

Example 199

The method of example 197 or 198, wherein the group ID is a radio network temporary identifier (RNTI) and is signaled to the first UE in radio resource control (RRC) signaling.

Example 200

The method of any one of examples 195 to 199, wherein the group ACK/NACK message has a payload that indicates the ACK or NACK, wherein the payload comprises a first bit corresponding to the first grant-free uplink transmission and a second bit corresponding to the second grant-free uplink transmission, wherein each bit indicates whether activity detection was successful or whether data decoding was successful.

Example 201

The method of example 200, wherein a position of the first and second bits in the payload corresponds to at least one of an MA signature and a HARQ process ID of the first and second grant-free uplink transmissions.

Example 202

The method of example 200, wherein a position of the first bit in the payload is signalled to the first UE, using radio resource control (RRC) signaling, prior to the first UE sending the first grant-free uplink transmission.

Example 203

A base station comprising: a receiver to receive a first grant-free uplink transmission from a first user equipment (UE), and to receive a second grant-free uplink transmission from a second UE; a grant-free transmission module to generate a group ACK/NACK message that indicates an ACK or a NACK corresponding to the first grant-free uplink transmission and an ACK or a NACK corresponding to the second grant-free uplink transmission.

Example 204

The base station of example 203, wherein the first UE and the second UE are in a group having a group identifier (ID), wherein the group ACK/NACK is associated with the group ID, and wherein the group ID is a function of grant-free resources at which the first grant-free uplink transmission was sent.

Example 205

The base station of example 203, wherein the first UE and the second UE are in a group having a group ID, wherein the group ACK/NACK is associated with the group ID, wherein the base station is to transmit the group ACK/NACK in group-common downlink control information (DCI) and to mask a cyclic redundancy check (CRC) of the group-common DCI by the group ID.

Example 206

The base station of example 205, wherein the group ID is a function of at least one of a time unit and frequency location at which the first grant-free uplink transmission was sent.

Example 207

The base station of any one of examples 203 to 206, wherein the group ACK/NACK message has a payload that indicates the ACK or NACK, wherein the payload comprises a first bit corresponding to the first grant-free uplink transmission and a second bit corresponding to the second grant-free uplink transmission, wherein each bit indicates whether activity detection was successful or whether data decoding was successful.

Example 208

The base station of example 207, wherein a position of the first and second bits in the payload corresponds to at least one of an MA signature and a HARQ process ID of the first and second grant-free uplink transmissions.

Example 209

The base station of example 207 or 208, wherein the base station is to signal, to the first UE, a position of the first bit in the payload, using radio resource control (RRC) signaling, prior to the first UE sending the first grant-free uplink transmission.

Example 210

A method performed by a first user equipment (UE) comprising: transmitting a first grant-free uplink transmission to a base station; receiving a group ACK/NACK message indicating an ACK or a NACK corresponding to the first grant-free uplink transmission and an ACK or a NACK corresponding to a second grant-free uplink transmission from a second UE.

Example 211

The method of example 210, wherein the first UE and the second UE are in a group having a group identifier (ID), wherein the group ACK/NACK is associated with the group ID, and wherein the group ID is a function of grant-free resources at which the first grant-free uplink transmission is sent.

Example 212

The method of example 210, wherein the first UE and the second UE are in a group having a group ID, wherein the group ACK/NACK is associated with the group ID, wherein the group ACK/NACK is received in group-common downlink control information (DCI), and wherein a cyclic redundancy check (CRC) of the group-common DCI is masked by the group ID.

Example 213

The method of example 211 or 212, wherein the group ID is a function of at least one of a time unit and frequency location at which the first grant-free uplink transmission is sent.

Example 214

The method of any one of examples 211 to 213, wherein the group ID is a radio network temporary identifier (RNTI) and is signaled to the first UE in radio resource control (RRC) signaling.

Example 215

The method of any one examples 211 to 214, wherein the group ACK/NACK message has a payload that indicates the ACK or NACK, wherein the payload comprises a first bit corresponding to the first grant-free uplink transmission and a second bit corresponding to the second grant-free uplink transmission, wherein each bit indicates whether activity detection was successful or whether data decoding was successful.

Example 216

The method of example 215, wherein a position of the first and second bits in the payload corresponds to at least one of an MA signature and a HARQ process ID of the first and second grant-free uplink transmissions.

Example 217

The method of example 215, wherein a position of the first bit in the payload is signalled to the first UE, using radio resource control (RRC) signaling, prior to the first UE sending the first grant-free uplink transmission.

Example 218

A first user equipment (UE) comprising: a transmitter to transmit a first grant-free uplink transmission to a base station; a receiver to receive a group ACK/NACK message that indicates an ACK or a NACK corresponding to the first grant-free uplink transmission and an ACK or a NACK corresponding to a second grant-free uplink transmission from a second UE.

Example 219

The first UE of example 218, wherein the first UE and the second UE are in a group having a group identifier (ID), wherein the group ACK/NACK is associated with the group ID, and wherein the group ID is a function of grant-free resources at which the first grant-free uplink transmission is sent.

Example 220

The first UE of example 218, wherein the first UE and the second UE are in a group having a group ID, wherein the group ACK/NACK is associated with the group ID, wherein the receiver is to receive the group ACK/NACK in group-common downlink control information (DCI), and wherein a cyclic redundancy check (CRC) of the group-common DCI is masked by the group ID.

Example 221

The first UE of example 219 or 220, wherein the group ID is a function of at least one of a time unit and frequency location at which the first grant-free uplink transmission is sent.

Example 222

The first UE of any one of examples 218 to 221, wherein the group ACK/NACK message has a payload that indicates the ACK or NACK, wherein the payload comprises a first bit corresponding to the first grant-free uplink transmission and a second bit corresponding to the second grant-free uplink transmission, wherein each bit indicates whether activity detection was successful or whether data decoding was successful.

Example 223

The first UE of example 222, wherein a position of the first and second bits in the payload corresponds to at least one of an MA signature and a HARQ process ID of the first and second grant-free uplink transmissions.

Example 224

The first UE of example 222, wherein a position of the first bit in the payload is signalled to the first UE, using radio resource control (RRC) signaling, prior to the first UE sending the first grant-free uplink transmission.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a base station comprising:
receiving a first grant-free uplink transmission from a first user equipment (UE);
receiving a second grant-free uplink transmission from a second UE;
transmitting, to the first UE and to the second UE, a group ACK/NACK message indicating an ACK or a NACK corresponding to the first grant-free uplink transmission and an ACK or a NACK corresponding to the second grant-free uplink transmission;
wherein the first UE and the second UE are in a group having a group ID, wherein the group ACK/NACK is associated with the group ID, wherein the group ACK/NACK is transmitted in group-common downlink control information (DCI), and wherein a cyclic redundancy check (CRC) of the group-common DCI is masked by the group ID.

2. The method of claim 1, wherein the group ID is a function of grant-free resources at which the first grant-free uplink transmission was sent.

3. The method of claim 1, wherein the group ID is a function of at least one of a time unit and frequency location at which the first grant-free uplink transmission was sent.

4. The method of claim 1, wherein the group ID is a radio network temporary identifier (RNTI) and is signaled to the first UE in radio resource control (RRC) signaling.

5. The method of claim 1, wherein the group ACK/NACK message has a payload that indicates the ACK or NACK, wherein the payload comprises a first bit corresponding to the first grant-free uplink transmission and a second bit corresponding to the second grant-free uplink transmission, wherein each bit indicates whether activity detection was successful or whether data decoding was successful.

6. The method of claim 5, wherein a position of the first and second bits in the payload corresponds to at least one of a multiple access (MA) signature and a HARQ process ID of the first and second grant-free uplink transmissions.

7. The method of claim 5, wherein a position of the first bit in the payload is signalled to the first UE, using radio resource control (RRC) signaling, prior to the first UE sending the first grant-free uplink transmission.

8. A base station comprising:
   a receiver to receive a first grant-free uplink transmission from a first user equipment (UE), and to receive a second grant-free uplink transmission from a second UE;
   a grant-free transmission module to generate a group ACK/NACK message that indicates an ACK or a NACK corresponding to the first grant-free uplink transmission and an ACK or a NACK corresponding to the second grant-free uplink transmission;
   wherein the first UE and the second UE are in a group having a group ID, wherein the group ACK/NACK is associated with the group ID, wherein the base station is to transmit the group ACK/NACK in group-common downlink control information (DCI) and to mask a cyclic redundancy check (CRC) of the group-common DCI by the group ID.

9. The base station of claim 8, wherein the group ID is a function of grant-free resources at which the first grant-free uplink transmission was sent.

10. The base station of claim 8, wherein the group ID is a function of at least one of a time unit and frequency location at which the first grant-free uplink transmission was sent.

11. The base station of claim 8, wherein the group ACK/NACK message has a payload that indicates the ACK or NACK, wherein the payload comprises a first bit corresponding to the first grant-free uplink transmission and a second bit corresponding to the second grant-free uplink transmission, wherein each bit indicates whether activity detection was successful or whether data decoding was successful.

12. The base station of claim 11, wherein a position of the first and second bits in the payload corresponds to at least one of a multiple access (MA) signature and a HARQ process ID of the first and second grant-free uplink transmissions.

13. The base station of claim 11, wherein the base station is to signal, to the first UE, a position of the first bit in the payload, using radio resource control (RRC) signaling, prior to the first UE sending the first grant-free uplink transmission.

14. A method performed by a first user equipment (UE) comprising:
   transmitting a first grant-free uplink transmission to a base station;
   receiving a group ACK/NACK message indicating an ACK or a NACK corresponding to the first grant-free uplink transmission and an ACK or a NACK corresponding to a second grant-free uplink transmission from a second UE;
   wherein the first UE shares a group with the second UE, the group having a group ID, wherein the group ACK/NACK is associated with the group ID, wherein the group ACK/NACK is received in group-common downlink control information (DCI), and wherein a cyclic redundancy check (CRC) of the group-common DCI is masked by the group ID.

15. The method of claim 14, wherein the group ID is a function of grant-free resources at which the first grant-free uplink transmission is sent.

16. The method of claim 14, wherein the group ID is a function of at least one of a time unit and frequency location at which the first grant-free uplink transmission is sent.

17. The method of claim 14, wherein the group ID is a radio network temporary identifier (RNTI) and is signaled to the first UE in radio resource control (RRC) signaling.

18. The method of claim 14, wherein the group ACK/NACK message has a payload that indicates the ACK or NACK, wherein the payload comprises a first bit corresponding to the first grant-free uplink transmission and a second bit corresponding to the second grant-free uplink transmission, wherein each bit indicates whether activity detection was successful or whether data decoding was successful.

19. The method of claim 18, wherein a position of the first and second bits in the payload corresponds to at least one of a multiple access (MA) signature and a HARQ process ID of the first and second grant-free uplink transmissions.

20. The method of claim 18, wherein a position of the first bit in the payload is signalled to the first UE, using radio resource control (RRC) signaling, prior to the first UE sending the first grant-free uplink transmission.

21. A first user equipment (UE) comprising:
   a transmitter to transmit a first grant-free uplink transmission to a base station;
   a receiver to receive a group ACK/NACK message that indicates an ACK or a NACK corresponding to the first grant-free uplink transmission and an ACK or a NACK corresponding to a second grant-free uplink transmission from a second UE;
   wherein the first UE shares a group with the second UE, the group having a group ID, wherein the group ACK/NACK is associated with the group ID, wherein the group ACK/NACK is received in group-common downlink control information (DCI), and wherein a cyclic redundancy check (CRC) of the group-common DCI is masked by the group ID.

22. The first UE of claim 21, wherein the group ID is a function of grant-free resources at which the first grant-free uplink transmission is sent.

23. The first UE of claim 21, wherein the group ID is a function of at least one of a time unit and frequency location at which the first grant-free uplink transmission is sent.

24. The first UE of claim 21, wherein the group ACK/NACK message has a payload that indicates the ACK or NACK, wherein the payload comprises a first bit corresponding to the first grant-free uplink transmission and a second bit corresponding to the second grant-free uplink transmission, wherein each bit indicates whether activity detection was successful or whether data decoding was successful.

25. The first UE of claim 24, wherein a position of the first and second bits in the payload corresponds to at least one of a multiple access (MA) signature and a HARQ process ID of the first and second grant-free uplink transmissions.

26. The first UE of claim 24, wherein a position of the first bit in the payload is signalled to the first UE, using radio resource control (RRC) signaling, prior to the first UE sending the first grant-free uplink transmission.

* * * * *